United States Patent [19]

Crooks et al.

[11] Patent Number: 5,930,773
[45] Date of Patent: Jul. 27, 1999

[54] COMPUTERIZED RESOURCE ACCOUNTING METHODS AND SYSTEMS, COMPUTERIZED UTILITY MANAGEMENT METHODS AND SYSTEMS, MULTI-USER UTILITY MANAGEMENT METHODS AND SYSTEMS, AND ENERGY-CONSUMPTION-BASED TRACKING METHODS AND SYSTEMS

[75] Inventors: Gerry Crooks; Ed Arnhold; John Battista, all of Spokane, Wash.; Ken Boni, Hayden Lake; Dan Bowers, Boise, both of Id.; Mark Feichtner, Spokane, Wash.; Blaine French, Spokane, Wash.; Janna Genzberger, Spokane, Wash.; David D. Holmes, Colbert, Wash.; Larry Kippenhan, Greenacres, Wash.; Dave Miller; Shawn Nanto, both of Spokane, Wash.; Teri Orr, Greenacres, Wash.; Ed Schlect, Spokane, Wash.

[73] Assignee: Avista Advantage, Inc., Spokane, Wash.

[21] Appl. No.: 08/992,678

[22] Filed: Dec. 17, 1997

[51] Int. Cl.[6] .................................................. G06F 17/60
[52] U.S. Cl. .............................. 705/30; 705/34; 705/412; 707/104
[58] Field of Search ........................... 395/200.3, 200.33, 395/200.47, 200.48, 200.49; 705/1, 30, 34, 400, 412, 413; 707/104; 709/200, 203, 217, 218, 219

[56] References Cited

U.S. PATENT DOCUMENTS

| | | | |
|---|---|---|---|
| 3,684,951 | 8/1972 | Goldman et al. | 395/188.01 |
| 3,852,571 | 12/1974 | Hall et al. | 235/61.7 B |
| 4,485,300 | 11/1984 | Peirce | 235/380 |
| 4,701,601 | 10/1987 | Francini et al. | 235/449 |
| 4,734,564 | 3/1988 | Boston et al. | 235/380 |
| 4,803,632 | 2/1989 | Frew et al. | 705/412 |

(List continued on next page.)

FOREIGN PATENT DOCUMENTS

0745947A2  12/1996  European Pat. Off. .

*Primary Examiner*—Edward R. Cosimano
*Attorney, Agent, or Firm*—Wells, St. John, Roberts, Gregory & Matkin, P.S.

[57] ABSTRACT

Computerized resource accounting methods and systems, and in particular computerized utility resource management methods and systems, multi-user utility resource management methods and systems, and energy-consumption-based tracking methods and systems are described. In one implementation, a host computer includes a processor, an interface device and a database defined therein for maintaining information pertaining to one or more customers of one or more resources. Resource usage information is received into the host computer pertaining to consumption of one or more of the resources by one or more of the customers at one or more customer site. The resource usage information is processed to provide usage-based, computer-viewable data associated with a respective customer's consumption of one or more of the resources. In a preferred aspect, each customer is provided with computer access to the computer-viewable data through the interface device, wherein the customer can view the data at a location which is remote from the host computer. Preferably, the computer-viewable data comes in the form of a plurality of different graphical reports, including numerical and tabulated reports, which can be selected by a customer. For customers with multiple sites, the viewable data for the various sites can be viewed remotely and in a plurality of different report formats. In a preferred implementation, utility resource usage information, e.g. electricity, gas, water, etc. . . , is tracked, maintained, and made available to facilitate decision making.

106 Claims, 78 Drawing Sheets

U.S. PATENT DOCUMENTS

| | | | |
|---|---|---|---|
| 4,839,504 | 6/1989 | Nakano | 235/379 |
| 4,893,248 | 1/1990 | Pitts et al. | 364/464 |
| 4,949,272 | 8/1990 | Vanourek et al. | 364/464 |
| 5,206,488 | 4/1993 | Teicher | 235/380 |
| 5,220,501 | 6/1993 | Lawlor et al. | 364/408 |
| 5,283,829 | 2/1994 | Anderson | 380/24 |
| 5,287,270 | 2/1994 | Hardy et al. | 364/408 |
| 5,325,290 | 6/1994 | Cauffman et al. | 364/401 |
| 5,326,959 | 7/1994 | Perazza | 235/379 |
| 5,383,113 | 1/1995 | Kight et al. | 364/401 |
| 5,477,038 | 12/1995 | Levine et al. | 235/380 |
| 5,483,445 | 1/1996 | Pickering | 364/406 |
| 5,655,089 | 8/1997 | Bucci | 395/240 |
| 5,664,115 | 9/1997 | Fraser | 705/37 |
| 5,684,965 | 11/1997 | Pickering | 395/234 |
| 5,699,051 | 12/1997 | Billig et al. | 340/657 |
| 5,710,884 | 1/1998 | Dedrick | 395/200.47 |
| 5,717,923 | 2/1998 | Dedrick | 707/102 |
| 5,730,356 | 3/1998 | Mongan | 237/19 |

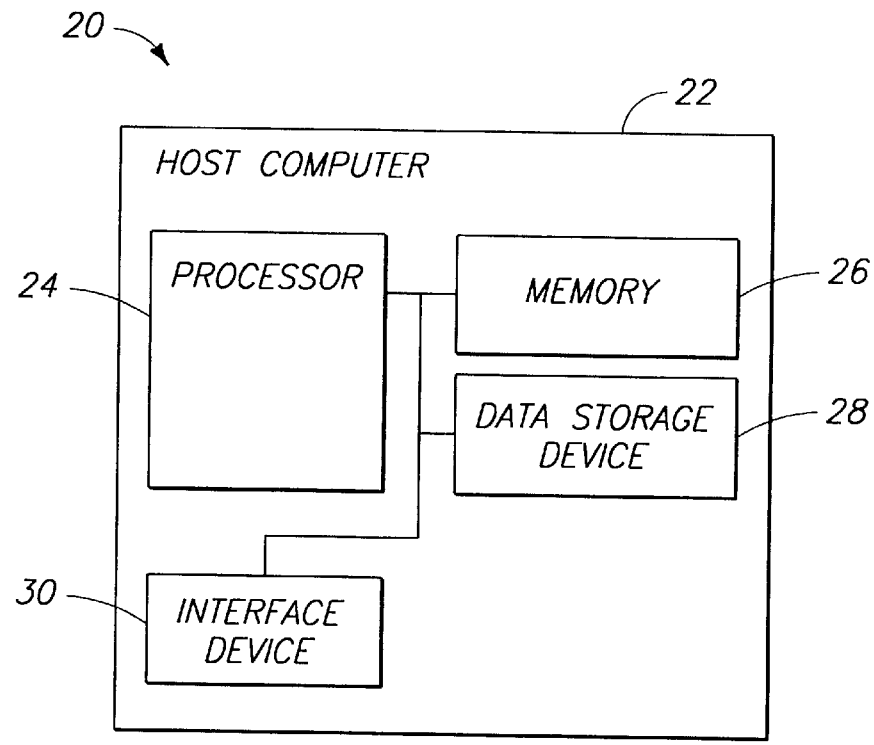
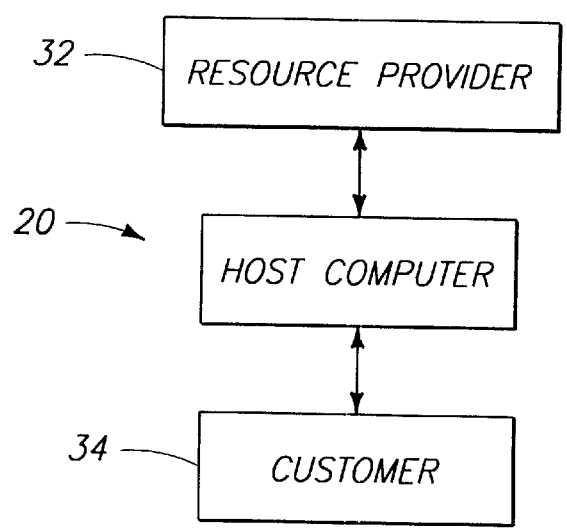

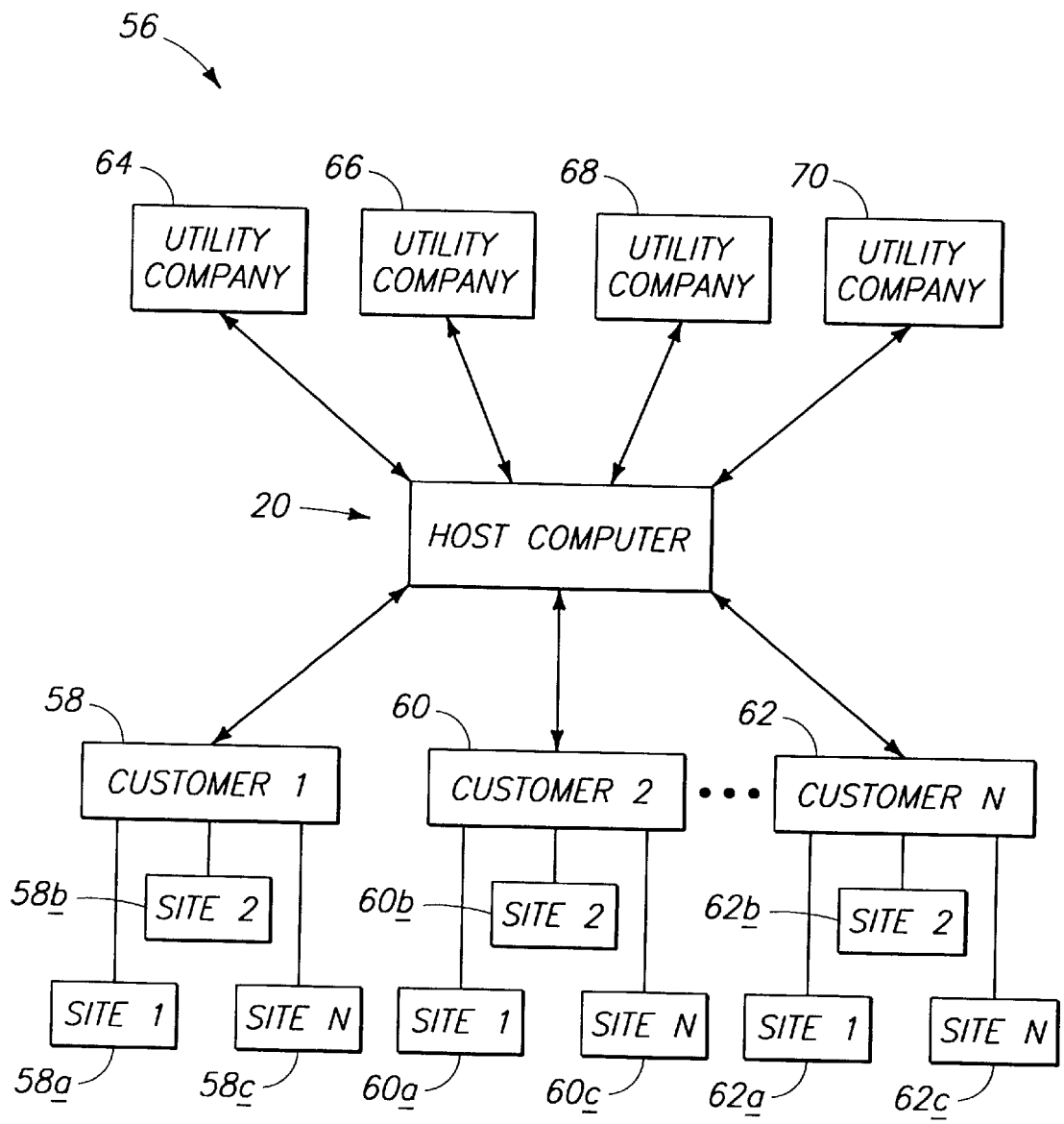

ACIS: Site Setup

File  Edit  View  Go  Favorite  Help

Back  Forward  Stop  Refresh  Home  Search  Favorites  Print  Font  Mail  Edit

Address http://

ACIS

Select Site to Setup: | Austin Chili Suites (250 Lake Austin Way) ▽ |   Ask our staff

108

Site Setup

| Austin Chili Suites (250 Lake Austin Way) ▽ |   Display Setup Information

Site Name (State Number): Austin Chili Suites (600)
Address: 250 Lake Austin Way
Austin, TX 78767

110

Done

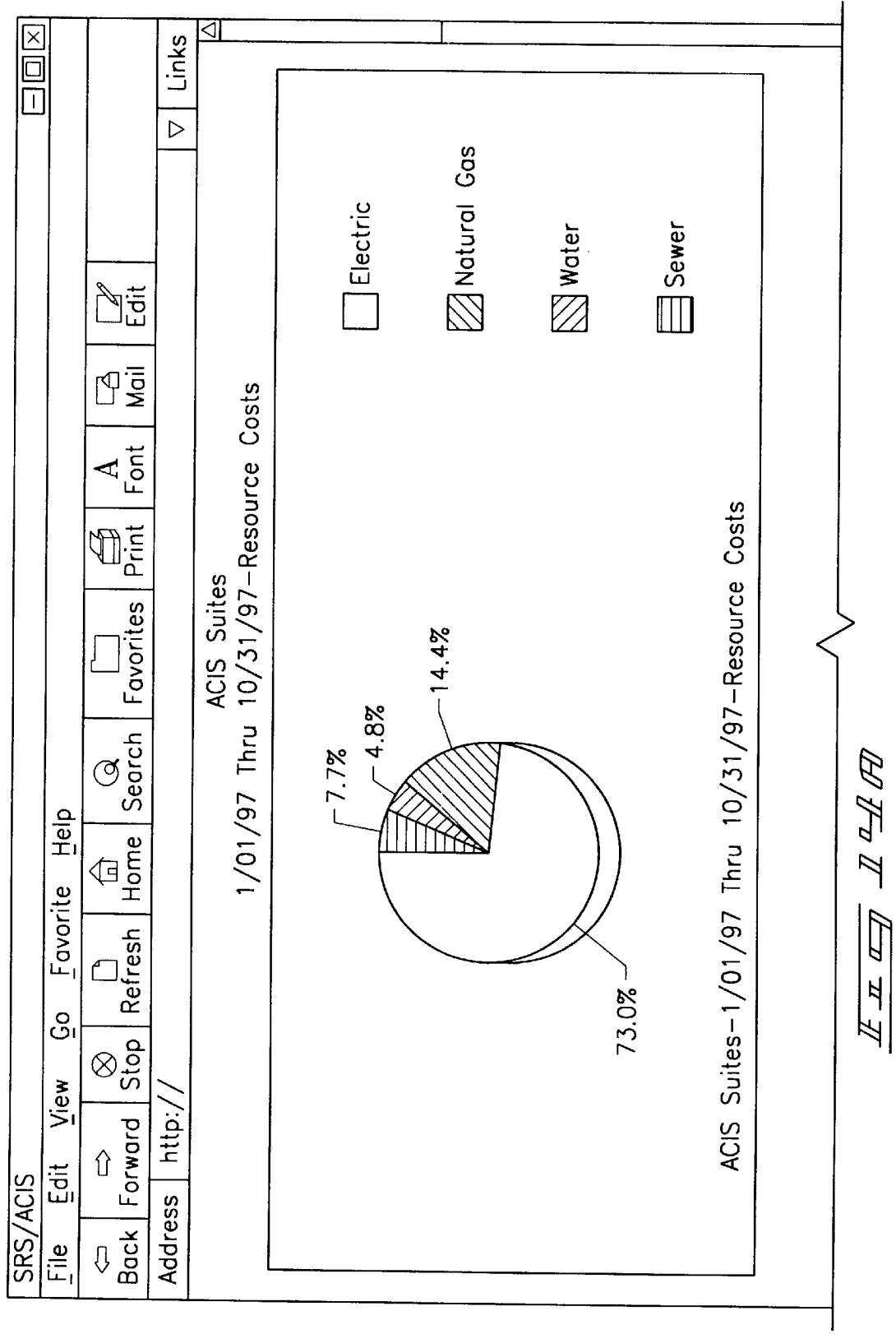

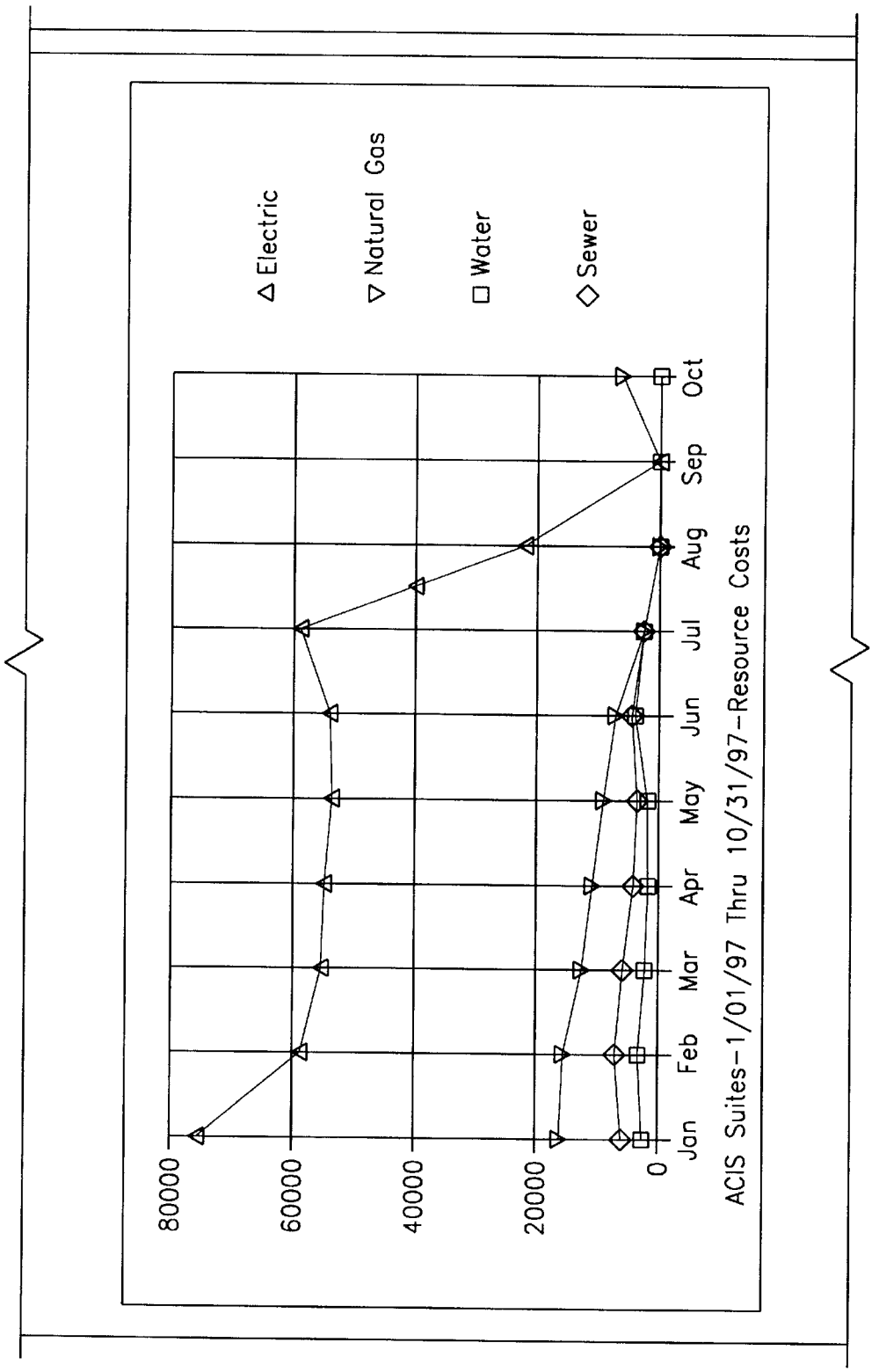

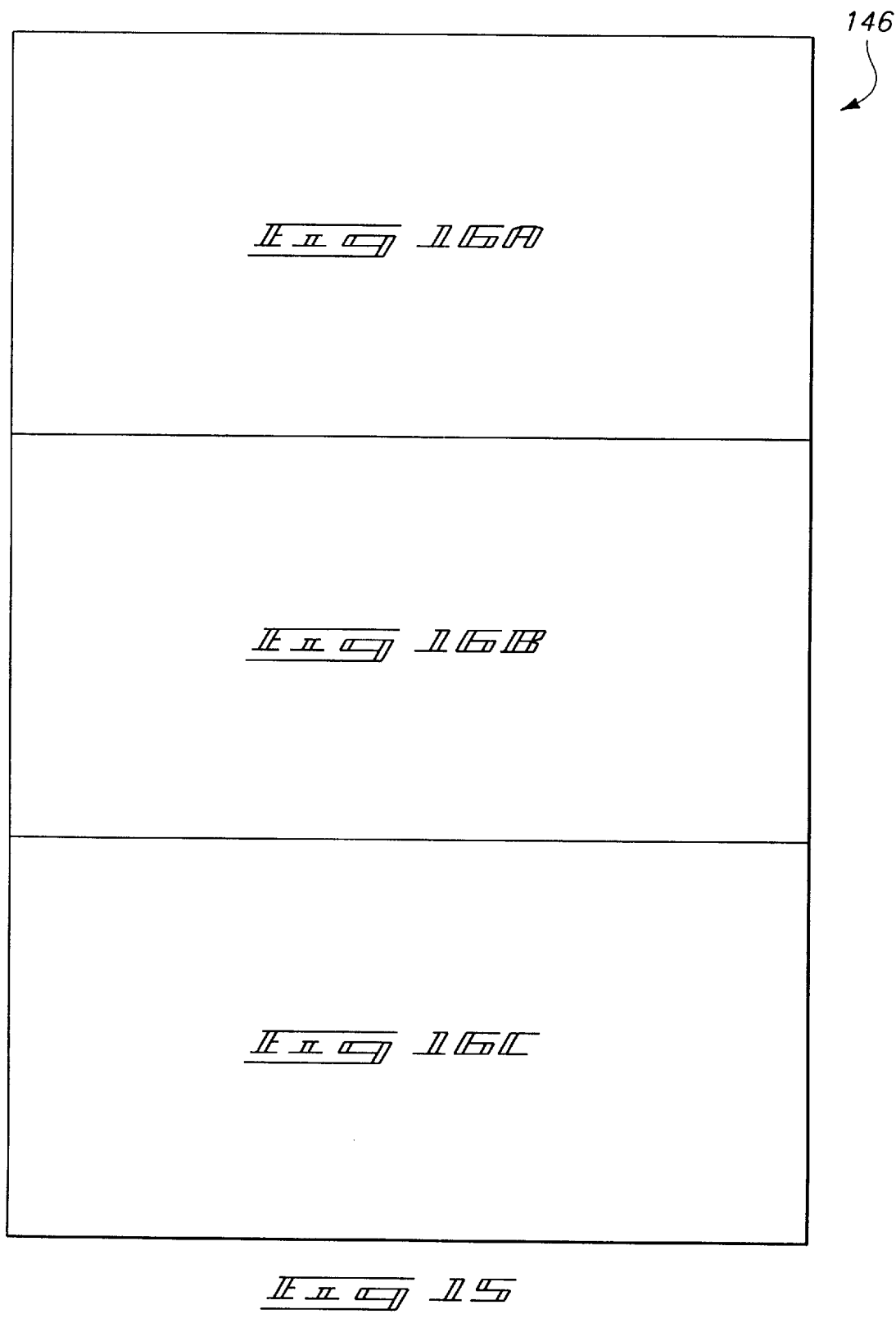

ACIS Suites
August 1997 Total Resource Costs

| Resource | Current | Prior | Change |
|---|---|---|---|
| Electric | $24,202.73 | $53,876.79 | −55.08% |
| Natural Gas | $2,199.13 | $6,879.75 | −68.03% |
| Water | $2,038.39 | $4,505.13 | −54.75% |
| Sewer | $2,273.54 | $9,403.78 | −75.82% |
| Total: | $30,713.78 | $74,665.44 | −56.86% |

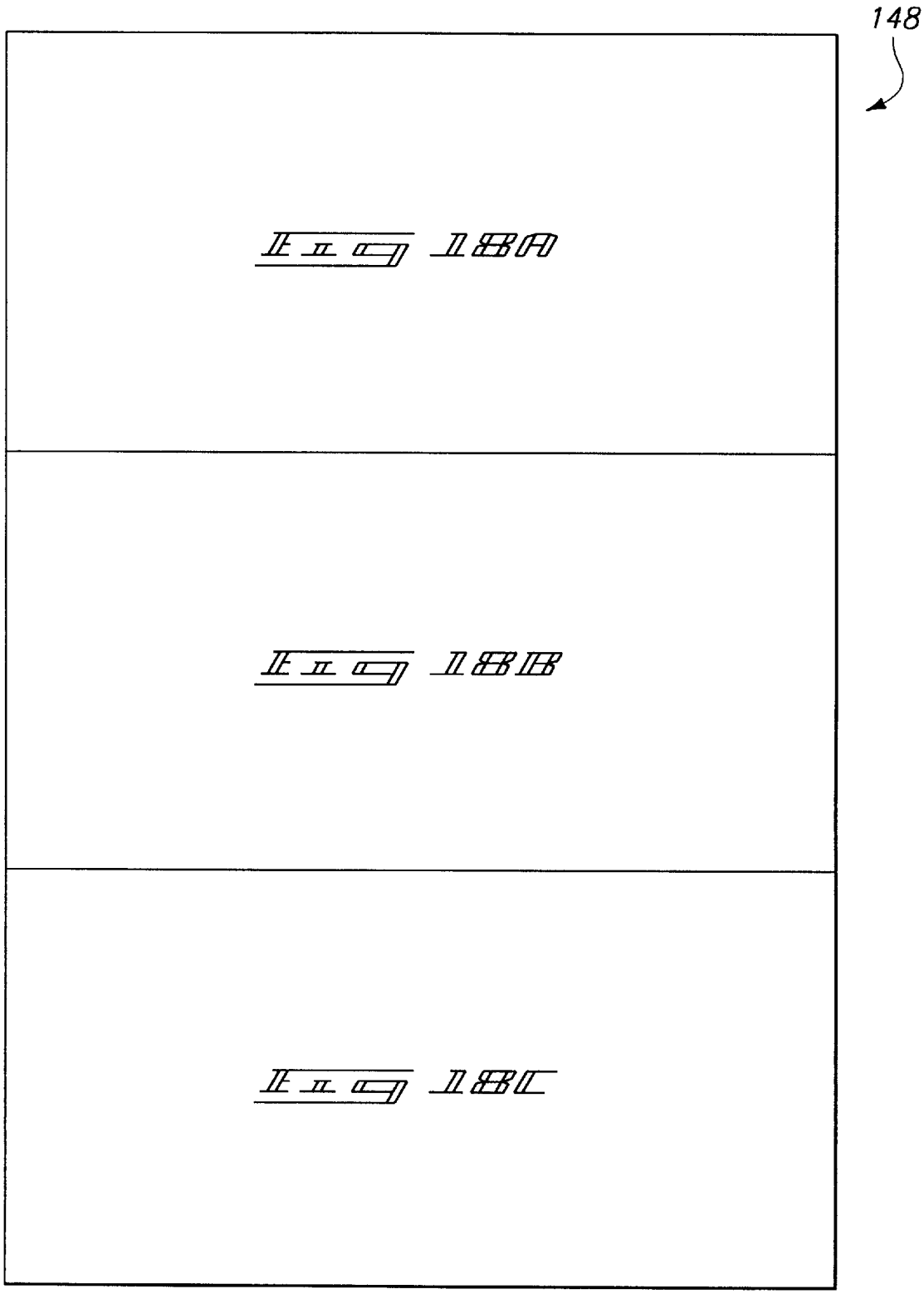

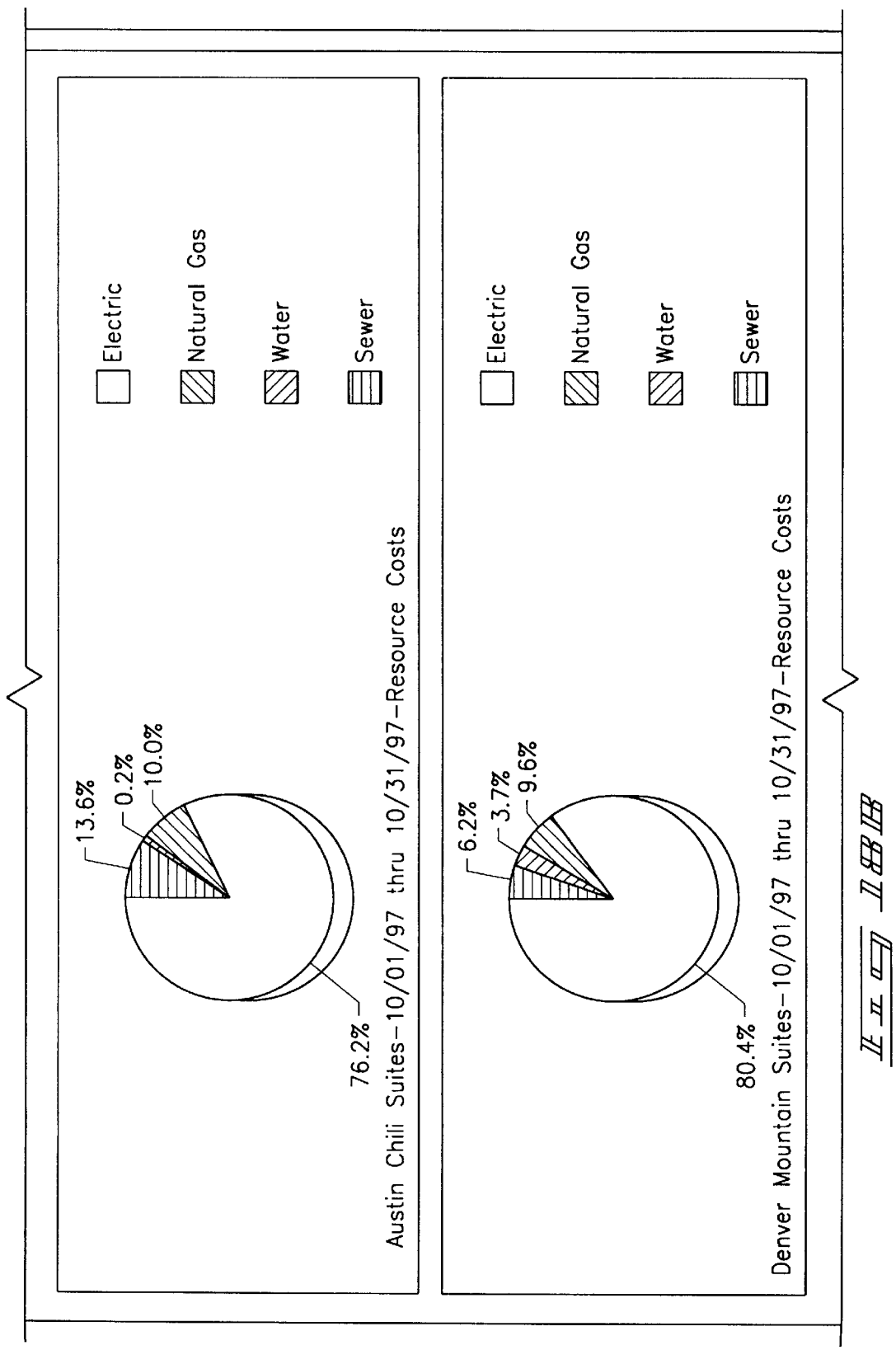

Austin Chili Suites Resource Costs
1/01/97 thru 10/31/97

| Resource | Current | Prior | Change |
|---|---|---|---|
| Electric | $23,490.62 | $107.48 | *******% |
| Natural Gas | $3,605.75 | $0.00 | N/A |
| Water | $77.33 | $59.00 | 31.07% |
| Sewer | $4,657.28 | $176.35 | 2540.96% |
| Total: | $31,830.97 | $342.82 | 9184.99% |

Denver Mountain Suites Resource Costs
1/01/97 thru 10/31/97

| Resource | Current | Prior | Change |
|---|---|---|---|
| Electric | $55,141.47 | $55,508.03 | -0.66% |
| Natural Gas | $8,018.37 | $9,899.14 | -23.46% |
| Water | $2,989.85 | $5,639.76 | -88.63% |
| Sewer | $5,000.85 | $10,426.54 | -108.50% |
| Total: | $71,150.54 | $81,473.48 | -14.51% |

FIG. 18C

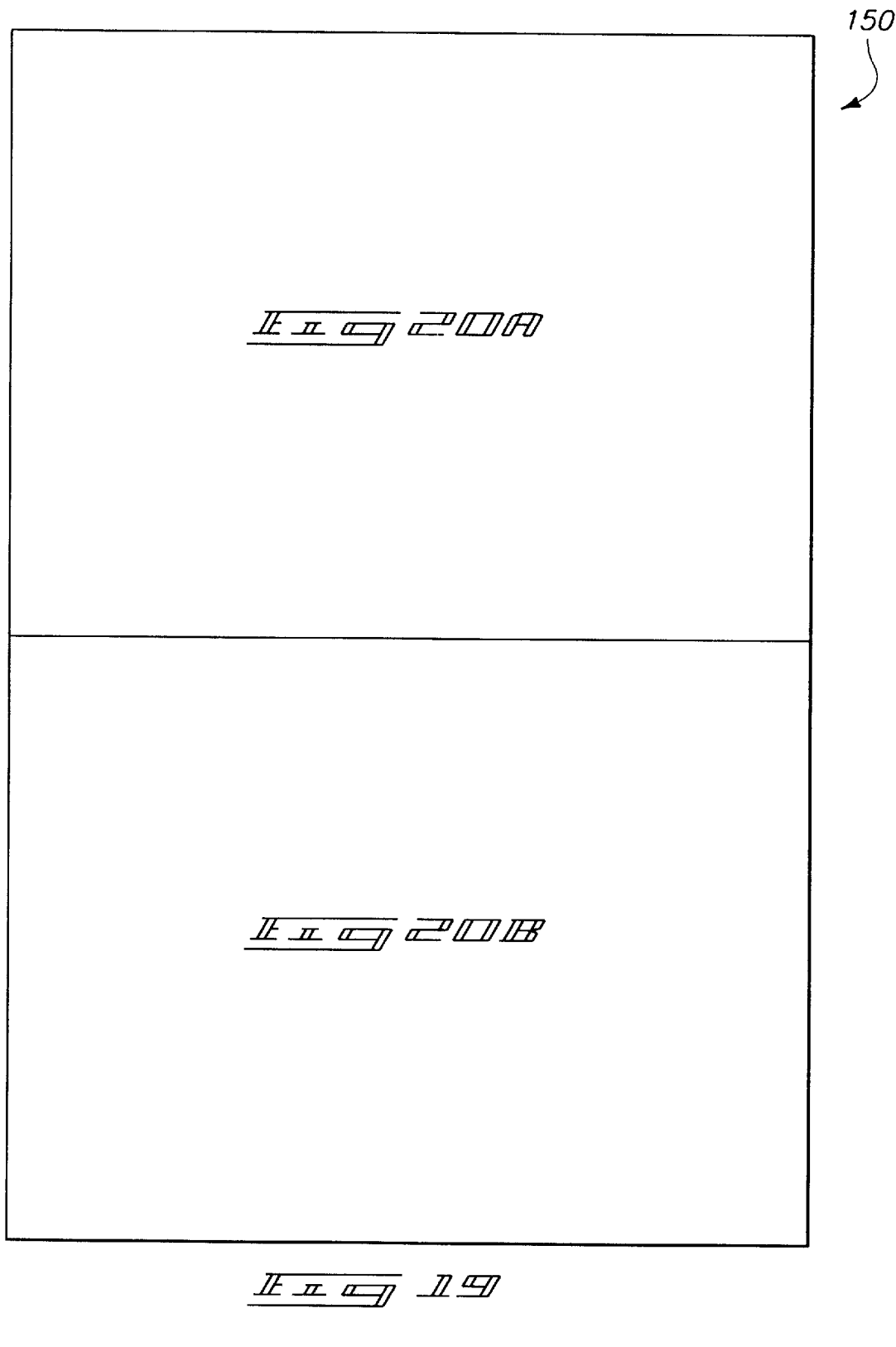

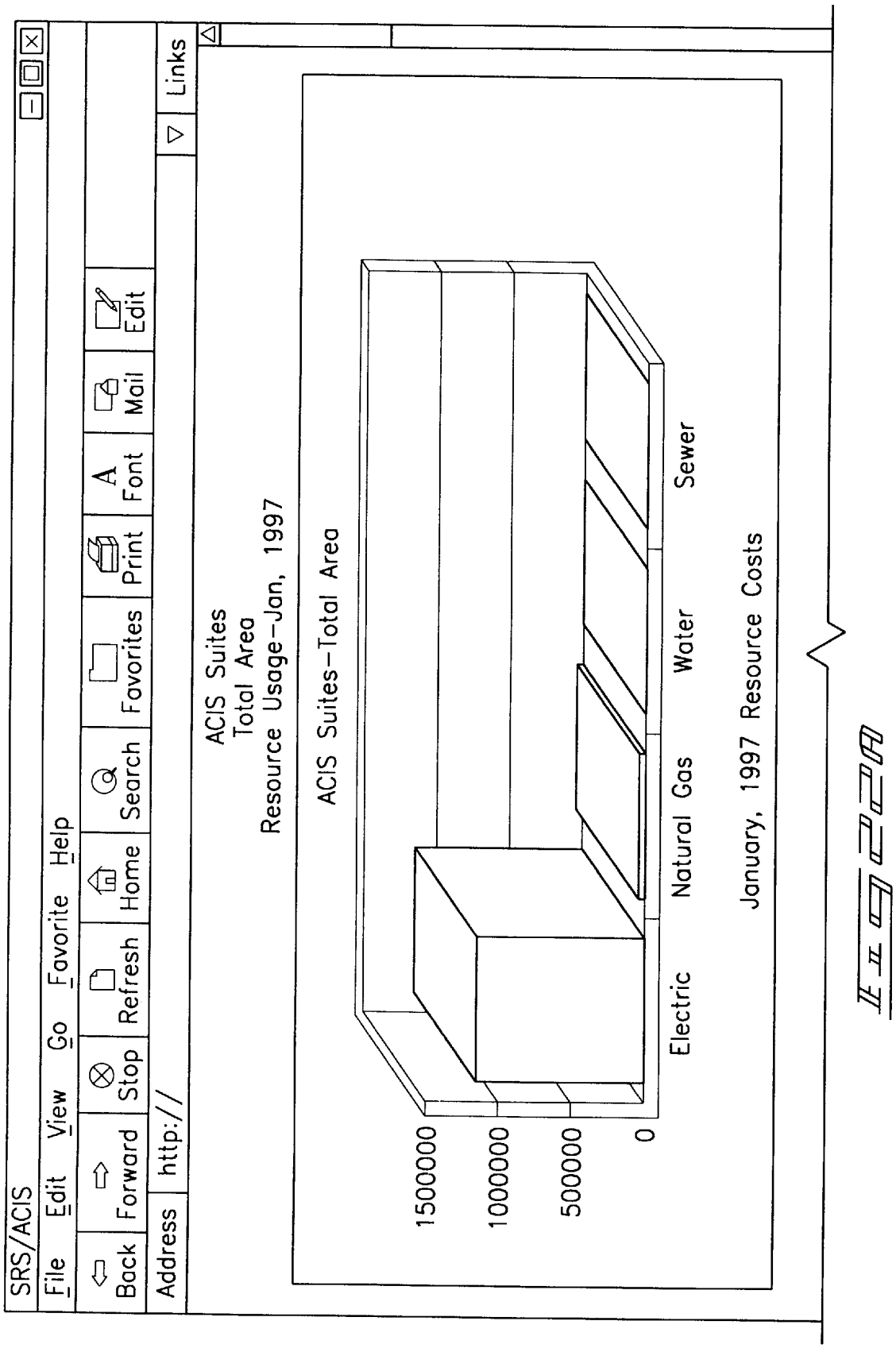

ACIS Suites
Total Area
Resource Usage—Jan, 1997

| Resource | Current | Prior | Change |
|---|---|---|---|
| Electric (KWh) | 1,196,124 | 801,035 | 49.32% |
| Natural Gas (Therms) | 31,143 | 24,146 | 28.98% |
| Water (KGal) | 1,503 | 950 | 58.34% |
| Sewer (KGal) | 1,701 | 1,044 | 62.97% |

FIG. 22B

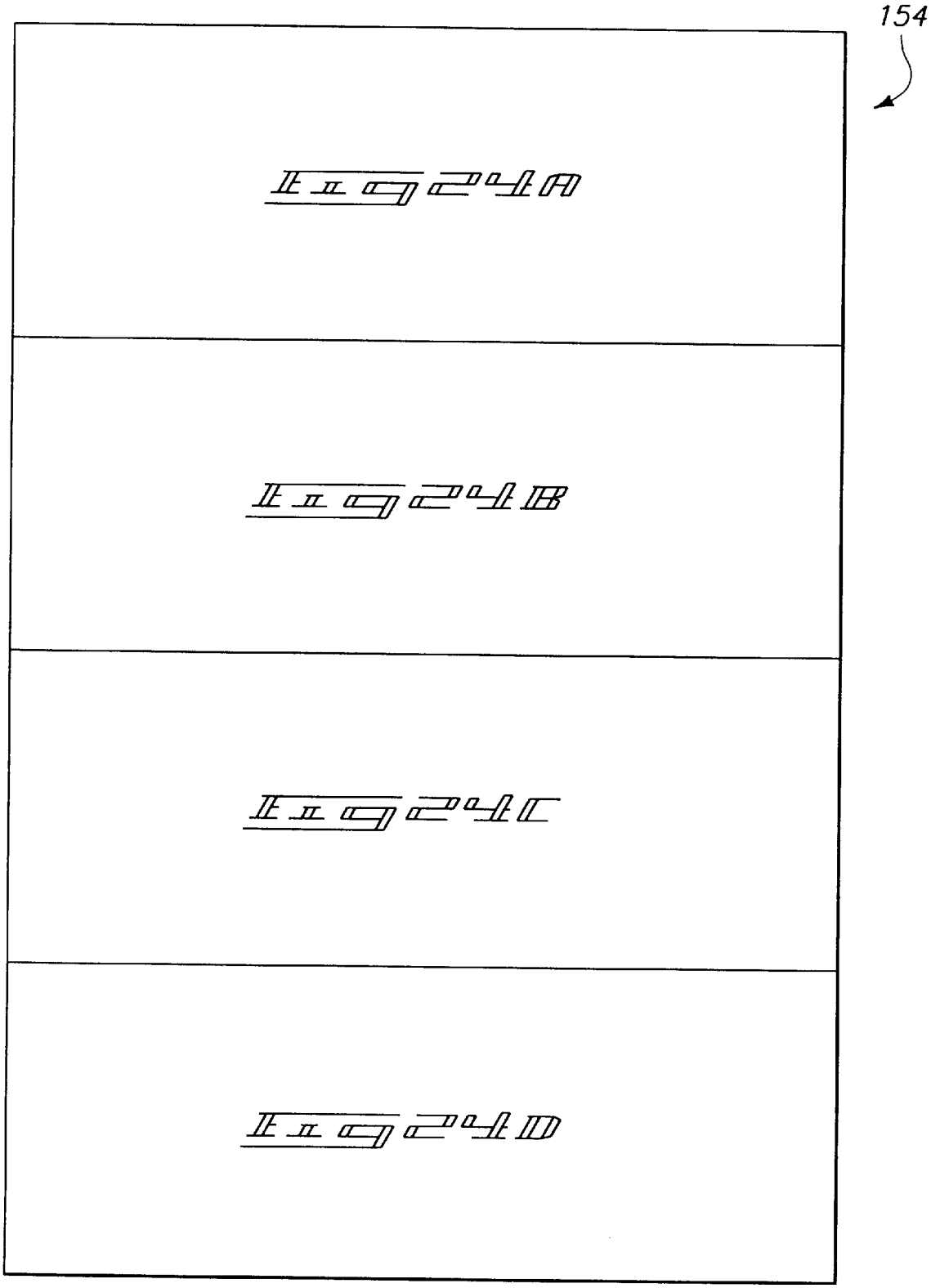

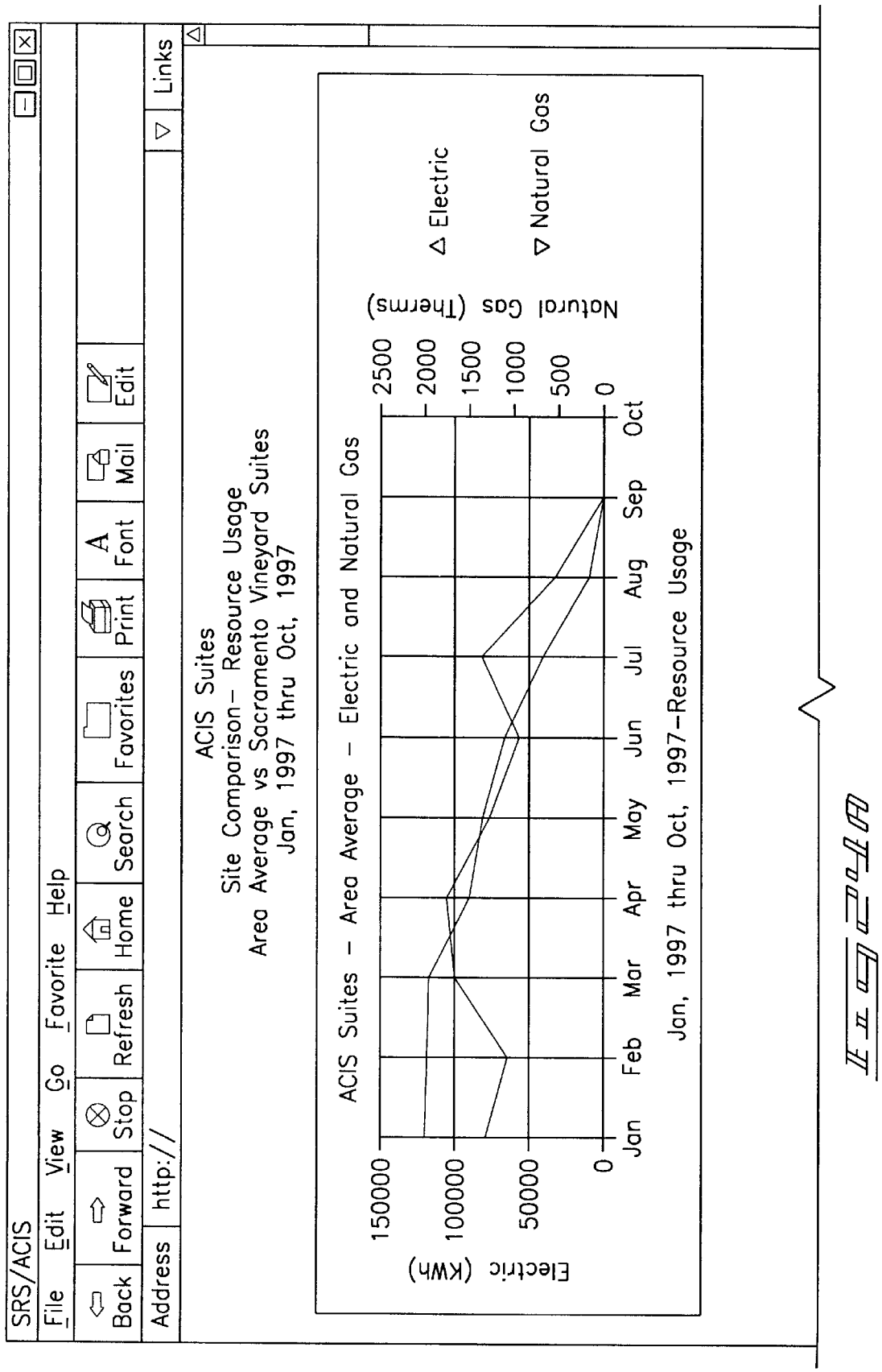

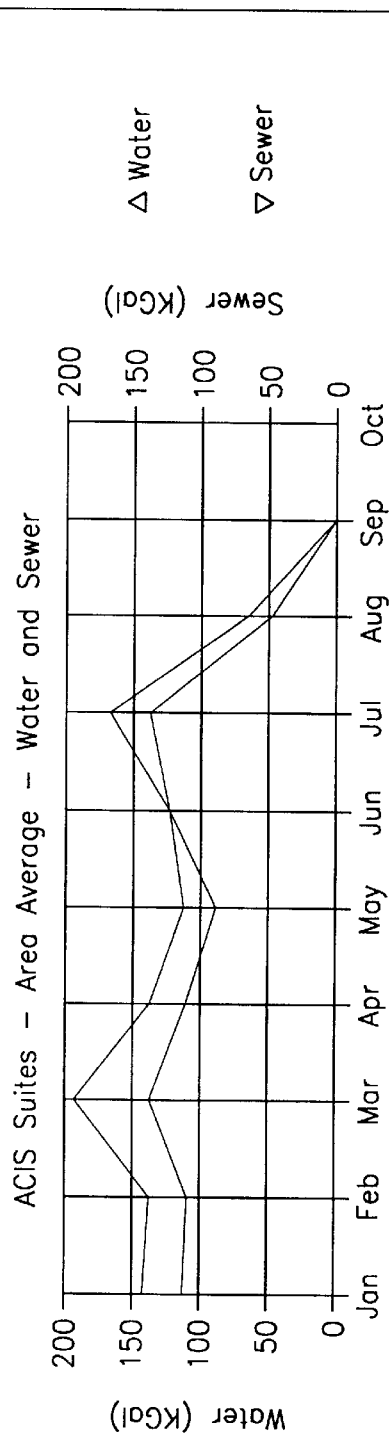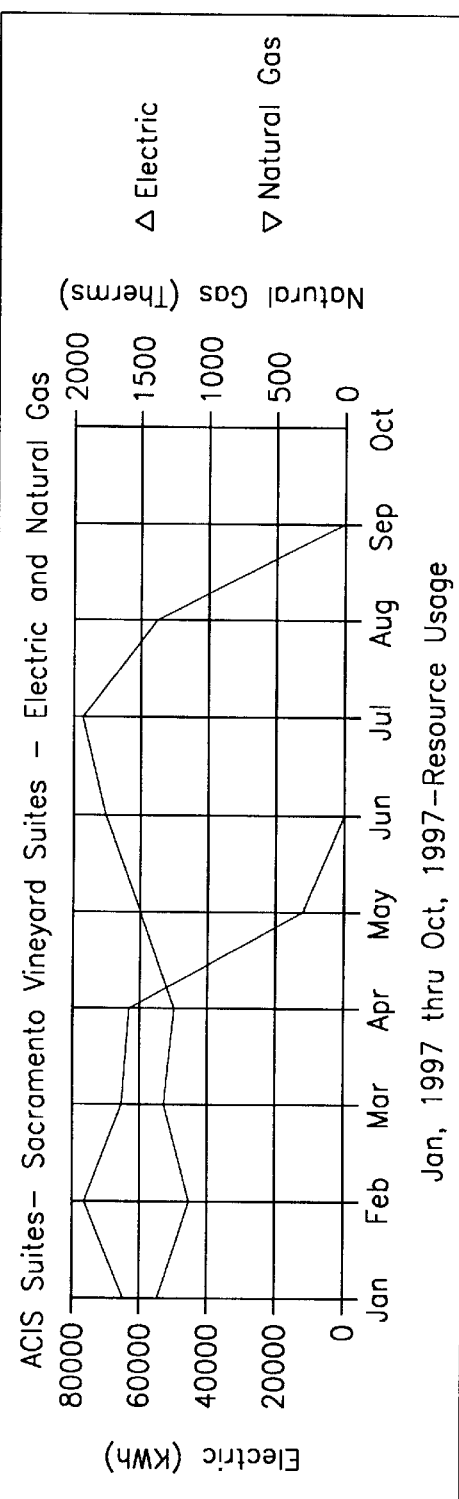

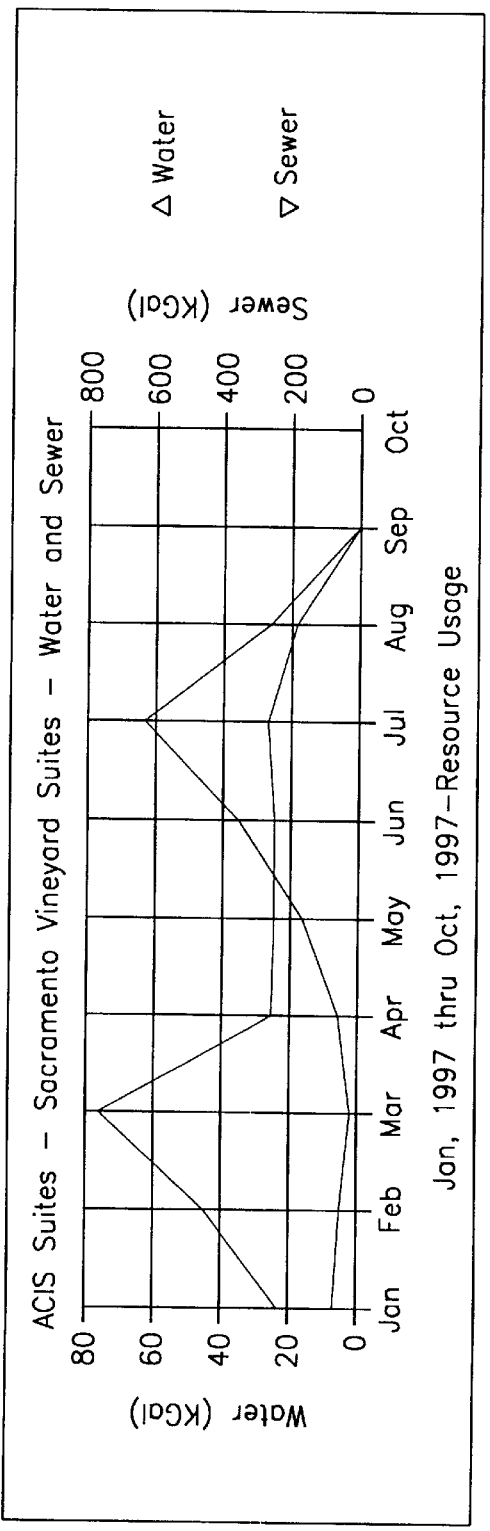

ACIS Suites
Site Comparison – Resource Usage
Area Average vs Sacramento Vineyard Suites
Jan, 1997 thru Oct, 1997
Area Average

| Resource | Current | Prior | Change |
|---|---|---|---|
| Electric (KWh) | 597,808 | 546,384 | 9.412% |
| Natural Gas (Therms) | 8,780 | 11,197 | -27.535% |
| Water (KGal) | 815 | 1,106 | -35.786% |
| Sewer (KGal) | 901 | 1,764 | -95.835% |
| Total: | 610,637 | 562,221 | 8.611% |

Sacramento Vineyard Suites

| Resource | Current | Prior | Change |
|---|---|---|---|
| Electric (KWh) | 460,162 | 514,008 | -11.702% |
| Natural Gas (Therms) | 5,483 | 9,443 | -72.219% |
| Water (KGal) | 154 | 71 | 115.092% |
| Sewer (KGal) | 2,409 | 9,341 | -287.715% |
| Total: | 470,077 | 532,864 | -13.357% |

FIG. 24D

ACIS Suites
Total Company Energy Costs ($)/Sq Foot (1004161 sqft)
September, 1996 thru August, 1997

| Site | Current | Prior | Change |
|---|---|---|---|
| Spokane Falls Suites | $0.17 | $0.00 | N/A |
| Portland Riverview Suites | $0.21 | $0.00 | N/A |
| Cincinnati Stadium Suites | $0.44 | $0.00 | N/A |
| Austin Chili Suites | $0.49 | $0.00 | N/A |
| Sacramento Vineyard Suites | $0.74 | $0.39 | 93.10% |
| Memphis Country Suites | $0.83 | $0.80 | 3.92% |
| Indianapolis Brickyard Suites | $0.86 | $0.19 | 361.87% |
| Raleigh Match Play Suites | $0.88 | $0.77 | 14.31% |
| Tucson Desert Suites | $0.98 | $0.92 | 6.56% |
| Long Island Beach Suites | $1.01 | $0.73 | 38.65% |
| Las Vegas Shimmering Suites | $1.13 | $0.61 | 85.17% |
| Wilmington Garden Suites | $1.15 | $0.77 | 49.5% |
| Dertoit Luxury Suites | $1.16 | $1.02 | 13.77% |
| Hartford Village Suites | $1.23 | $0.99 | 23.63% |
| Denver Mountain Suites | $1.74 | $1.13 | 54.01% |
| Monthly Average: | $0.87 | $0.55 | 56.81% |
| Total: | $13.03 | $8.31 | 56.81% |

FIG. 26B

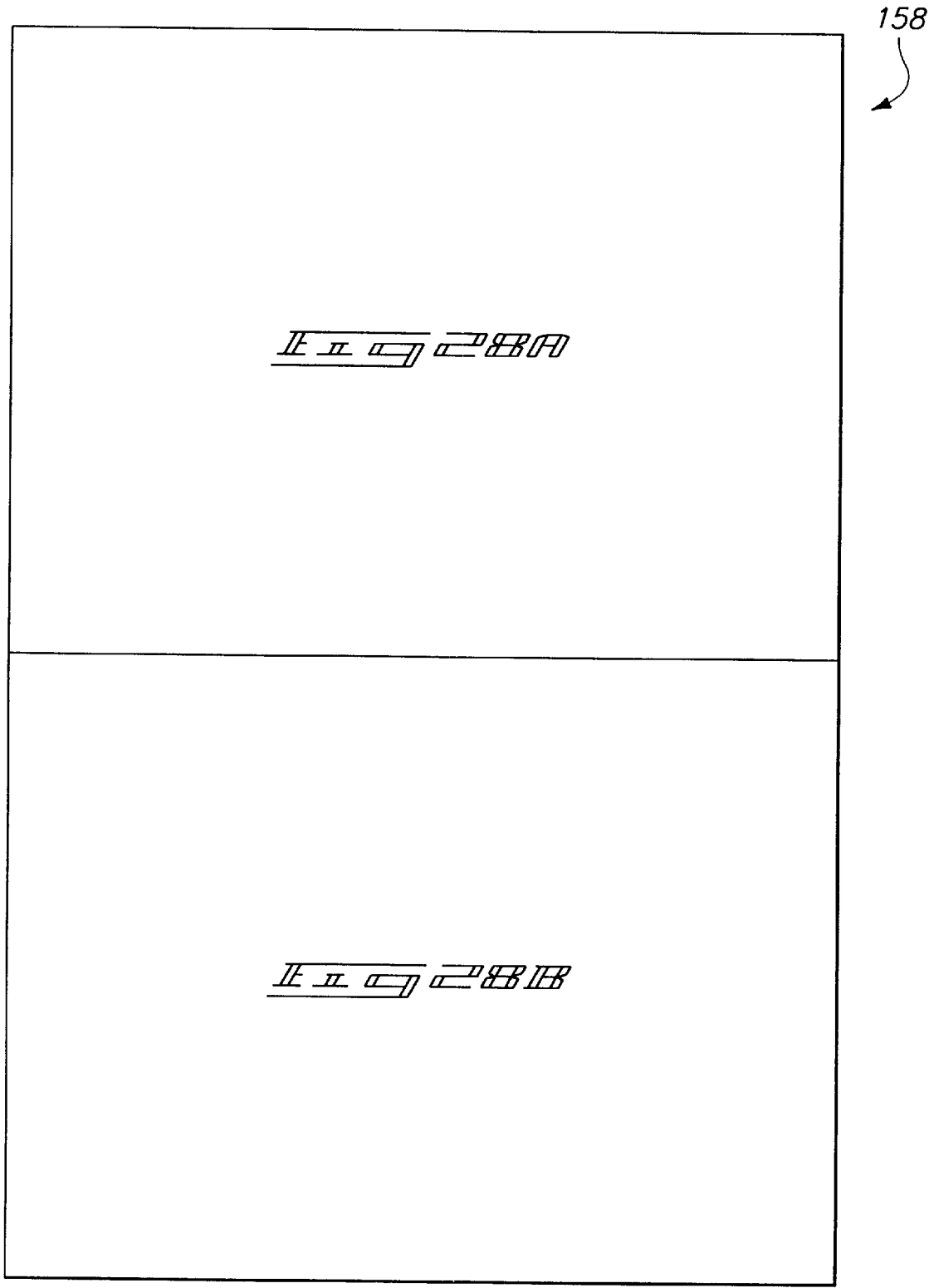

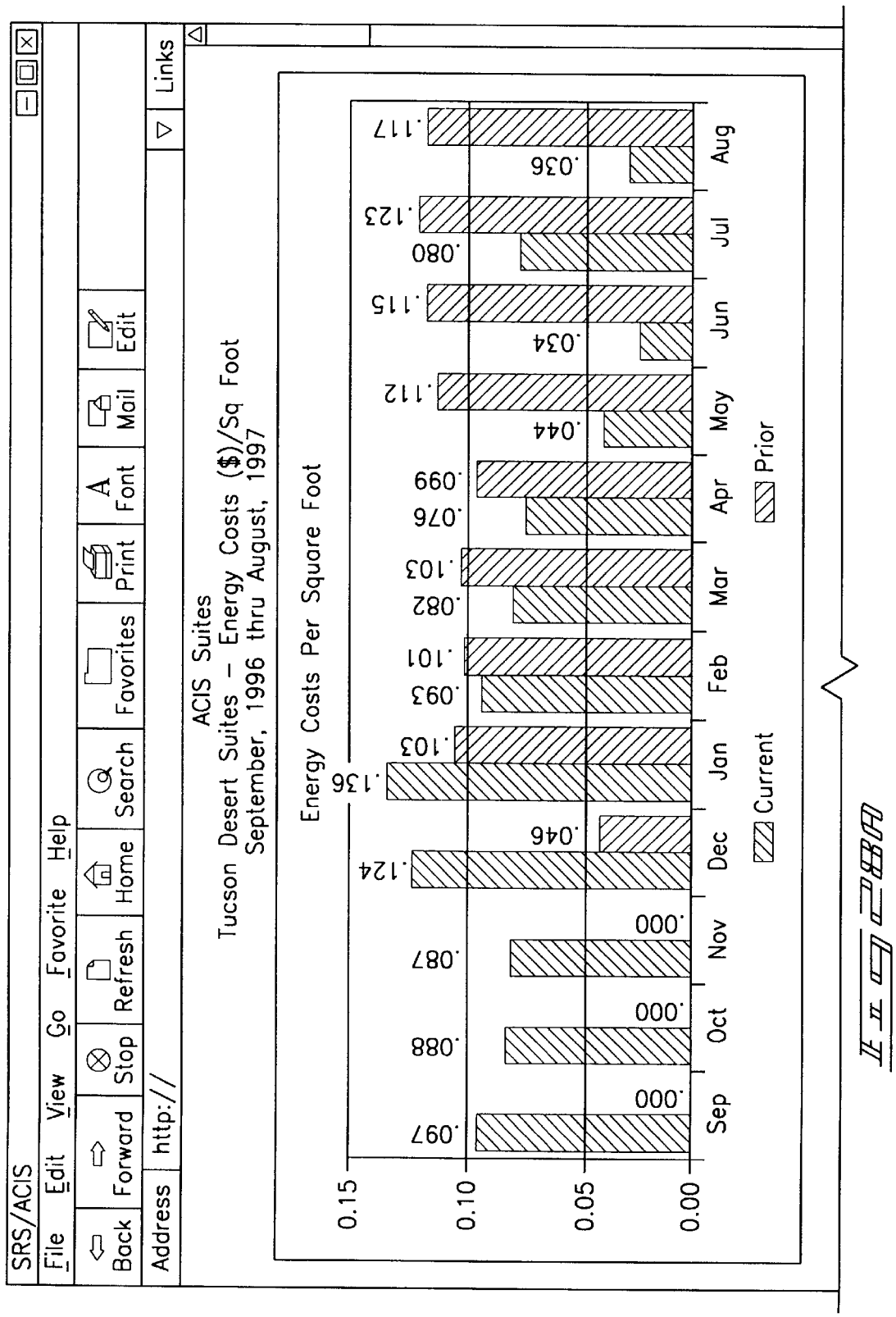

ACIS Suites
Tucson Desert Suites – Energy Costs ($)/Sq Foot
September, 1996 thru August, 1997

| Month | 1997 | 1996 | Change |
|---|---|---|---|
| September | 0.097 | 0.0 | ********% |
| October | 0.088 | 0.0 | ********% |
| November | 0.087 | 0.0 | ********% |
| December | 0.124 | 0.046 | 159.07% |
| January | 0.136 | 0.103 | 29.41% |
| February | 0.093 | 0.101 | -9.26% |
| March | 0.082 | 0.103 | -22.05% |
| April | 0.076 | 0.099 | -24.21% |
| May | 0.044 | 0.112 | -60.99% |
| June | 0.034 | 0.115 | -70.46% |
| July | 0.08 | 0.123 | -35.80% |
| August | 0.036 | 0.117 | -69.80% |
| Monthly Average: | 0.081 | 0.077 | 6.31% |
| Total: | 0.977 | 0.919 | 6.31% |

FIG. 28B

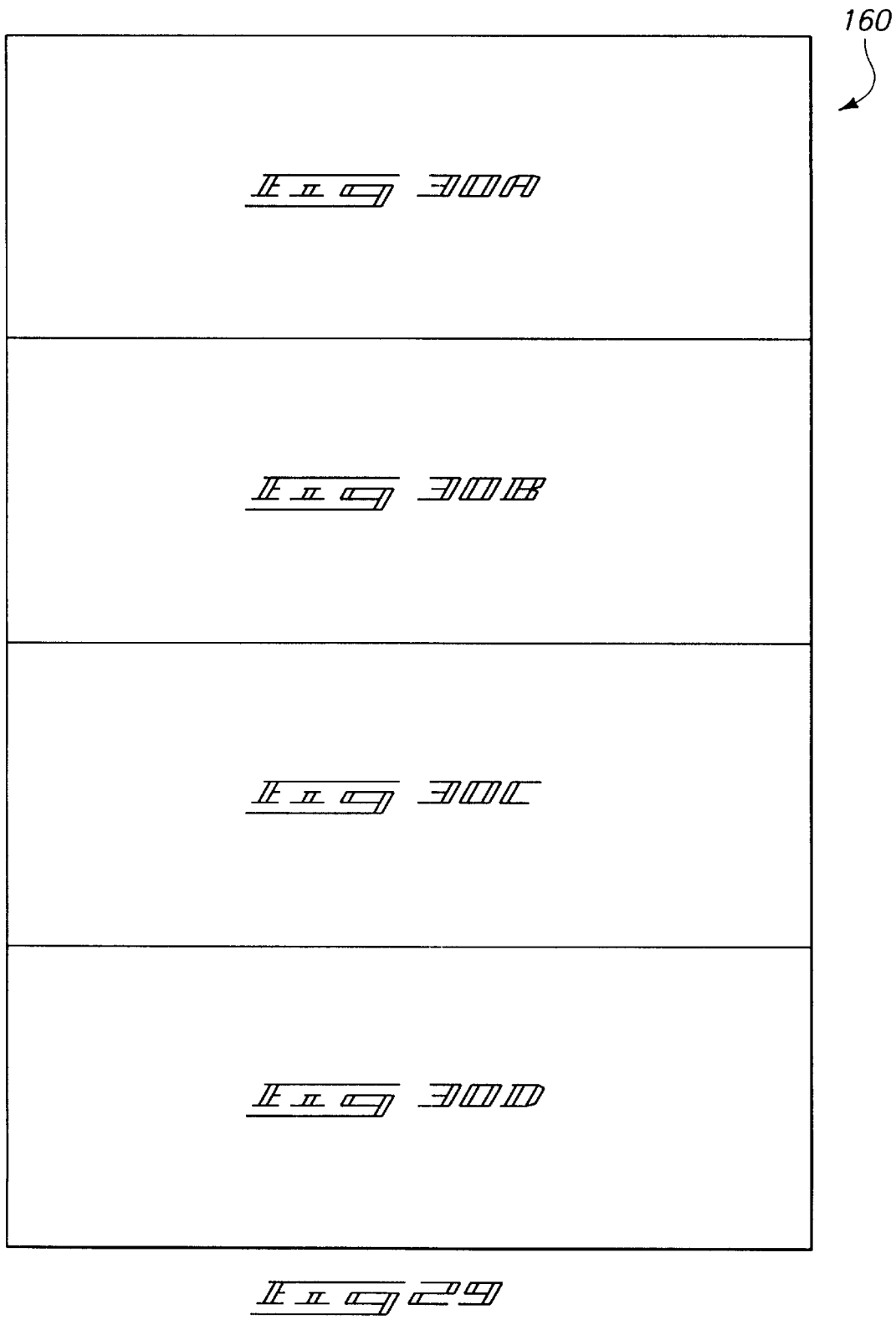

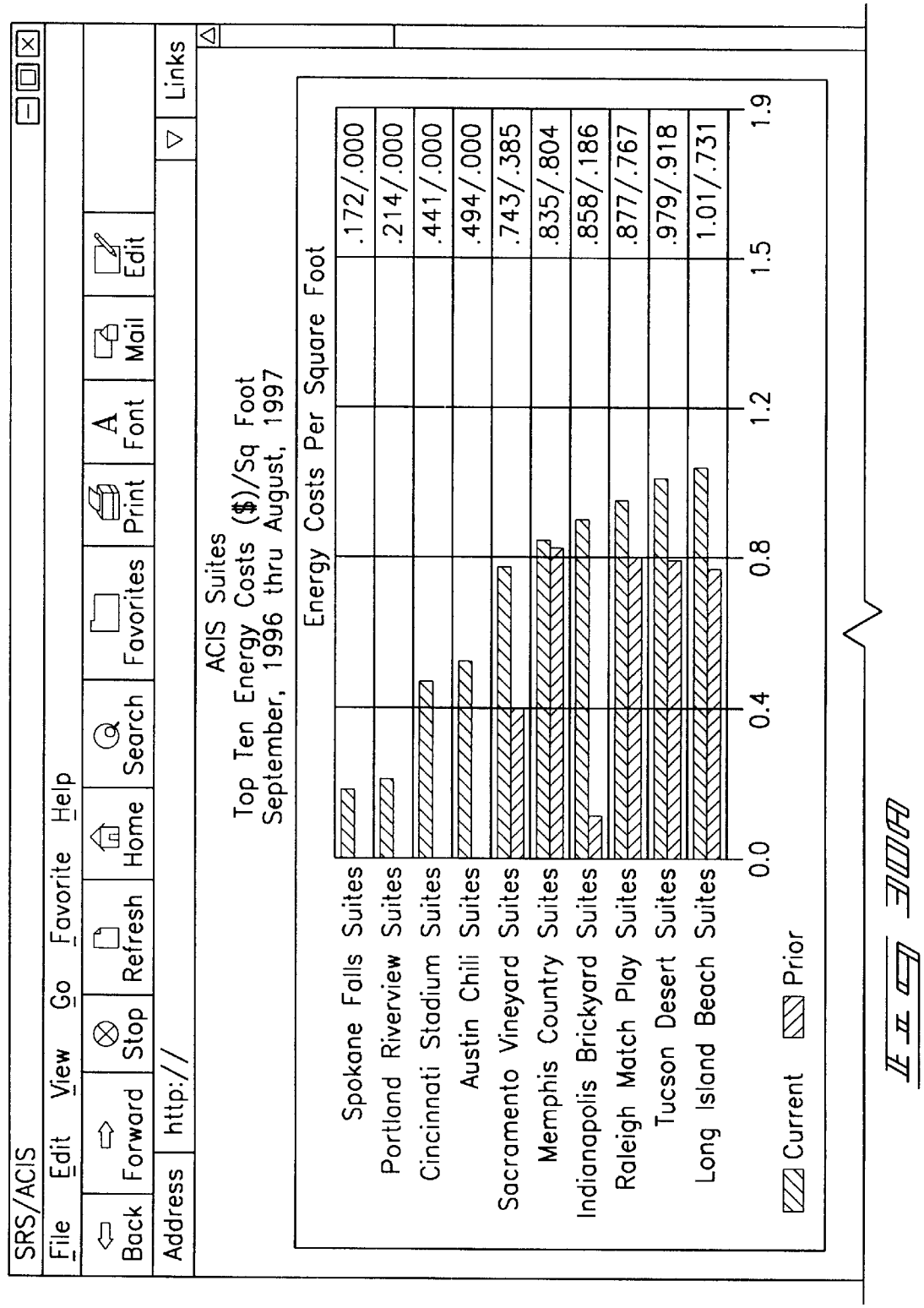

ACIS Suites
Top Ten ($)/Sq Foot (162500 sqft)
September, 1996 thru August, 1997

| Site | Sqfeet | Current | Prior | Change |
|---|---|---|---|---|
| Spokane Falls Suites | 162500 | 0.172 | 0.00 | N/A |
| Portland Riverview Suites | 75690 | 0.214 | 0.00 | N/A |
| Cincinnati Stadium Suites | 82536 | 0.441 | 0.00 | N/A |
| Austin Chili Suites | 65700 | 0.494 | 0.00 | N/A |
| Sacramento Vineyard Suites | 56980 | 0.743 | 0.385 | 93.10% |
| Memphis Country Suites | 27560 | 0.835 | 0.804 | 3.92% |
| Indianapolis Brickyard Suites | 49500 | 0.858 | 0.186 | 361.87% |
| Raleigh Match Play Suites | 68585 | 0.877 | 0.767 | 14.31% |
| Tucson Desert Suites | 118250 | 0.979 | 0.918 | 6.56% |
| Long Island Beach Suites | 44750 | 1.014 | 0.731 | 38.65% |
| Monthly Average: | 75205 | 0.66 | 0.38 | 74.81% |
| Total: | 752051 | 6.627 | 3.791 | 74.81% |

FIG. 30E

ACIS Suites
Bottom Ten ($)/Sq Foot (162500 sqft)
September, 1996 thru August, 1997

| Site | Sqfeet | Current | Prior | Change |
|---|---|---|---|---|
| Denver Mountain Suites | 51200 | 1.743 | 1.132 | 54.01% |
| Hartford Village Suites | 60500 | 1.225 | 0.991 | 23.63% |
| Dertoit Luxury Suites | 48535 | 1.156 | 1.016 | 13.77% |
| Wilmington Garden Suites | 52250 | 1.145 | 0.766 | 49.50% |
| Las Vegas Shimmering Suites | 39625 | 1.129 | 0.61 | 85.17% |
| Long Island Beach Suites | 44750 | 1.014 | 0.731 | 38.65% |
| Tucson Desert Suites | 118250 | 0.979 | 0.918 | 6.56% |
| Raleigh Match Play Suites | 68585 | 0.877 | 0.767 | 14.31% |
| Indianapolis Brickyard Suites | 49500 | 0.858 | 0.186 | 361.87% |
| Memphis Country Suites | 27560 | 0.835 | 0.804 | 3.92% |
| Monthly Average: | 56076 | 1.10 | 0.79 | 56.81% |
| Total: | 560755 | 10.961 | 7.921 | 56.81% |

ACIS Suites
kBTU/sqft Usage – Sep 1996 thru Aug 1997

| Site | Sq Feet | Current | Prior | Change |
|---|---|---|---|---|
| Austin Chili Suites | 65700 | 36.01 | 0.0 | N/A |
| Cincinnati Stadium Suites | 82536 | 42.66 | 0.0 | N/A |
| Denver Mountain Suites | 51200 | 130.61 | 104.69 | 27.76% |
| Dertoit Luxury Suites | 48535 | 157.39 | 98.14 | 60.38% |
| Hartford Village Suites | 60500 | 105.24 | 101.42 | 3.77% |
| Indianapolis Brickyard Suites | 49500 | 75.3 | 14.02 | 437.11% |
| Las Vegas Shimmering Suites | 39625 | 86.62 | 45.88 | 82.26% |
| Long Island Beach Suites | 44750 | 75.28 | 59.17 | 27.23% |
| Memphis Country Suites | 27560 | 64.07 | 63.22 | 1.34% |
| Portland Riverview Suites | 75690 | 27.04 | 0.0 | N/A |
| Raleigh Match Play Suites | 68585 | 62.1 | 56.04 | 10.82% |
| Sacramento Vineyard Suites | 56980 | 62.98 | 36.4 | 73.02% |
| Spokane Falls Suites | 162500 | 12.55 | 0.0 | N/A |
| Tucson Desert Suites | 118250 | 69.2 | 59.53 | 16.24% |
| Wilmington Garden Suites | 52250 | 88.85 | 71.98 | 23.45% |
| Monthly Average: | 66944 | 72.86 | 47.37 | 53.82% |
| Total: | 1004161 | 1092.9 | 710.49 | 53.82% |

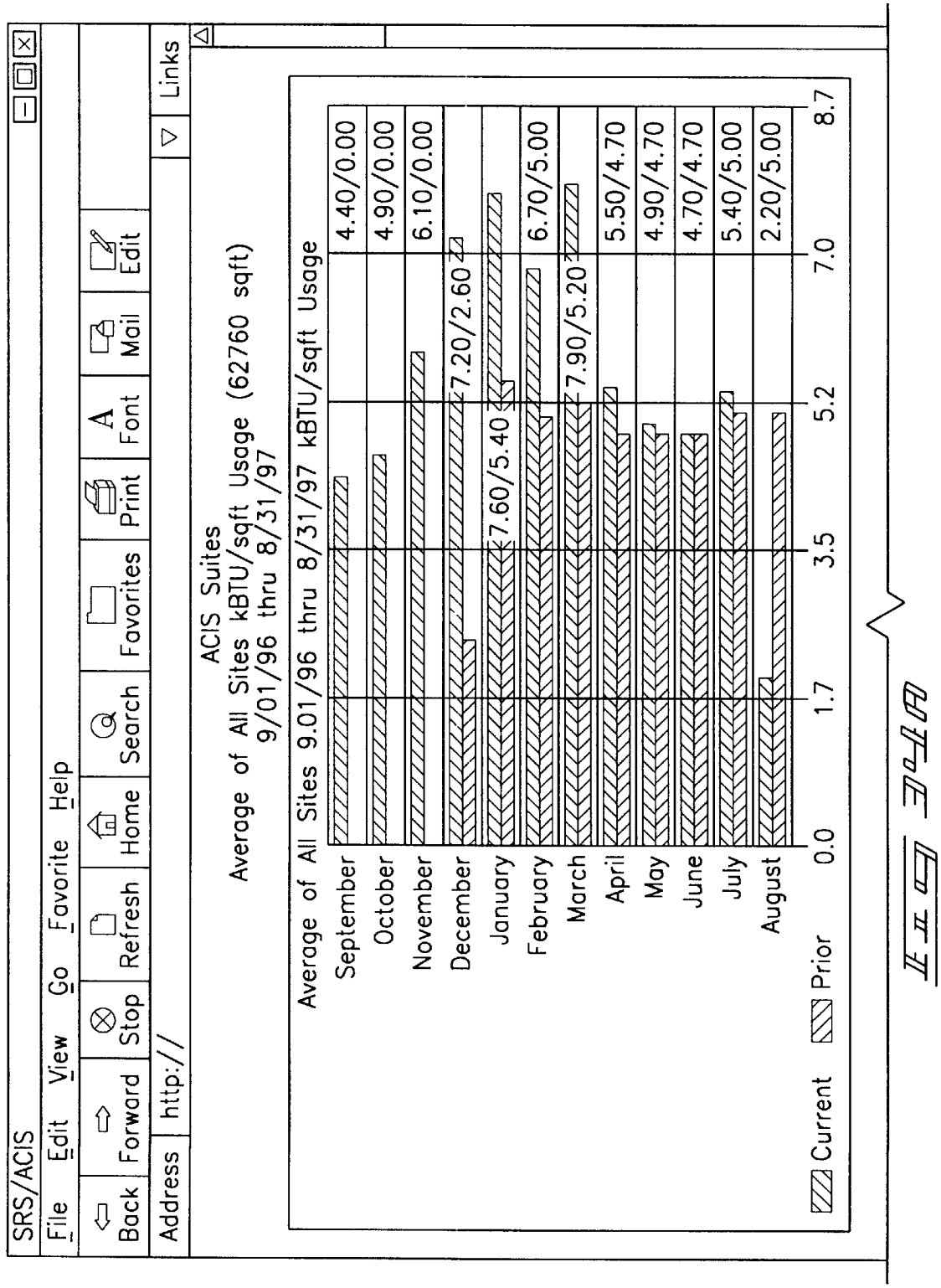

ACIS Suites
Average of All Sites kBTU/sqft Usage (62760 sqft)
9/01/96 thru 8/31/97

| Month | Current | Prior | Change |
|---|---|---|---|
| September | 4.40 | 0.0 | N/A |
| October | 4.90 | 0.0 | N/A |
| November | 6.10 | 0.0 | N/A |
| December | 7.20 | 2.60 | 175.58% |
| January | 7.60 | 5.40 | 40.39% |
| February | 6.70 | 5.00 | 34.49% |
| March | 7.90 | 5.20 | 51.69% |
| April | 5.50 | 4.70 | 16.80% |
| May | 4.90 | 4.70 | 4.39% |
| June | 4.70 | 4.70 | 0.43% |
| July | 5.40 | 5.00 | 7.23% |
| August | 2.20 | 5.00 | -56.88% |
| Monthly Average: | 5.63 | 3.53 | 59.57% |
| Total: | 67.50 | 42.30 | 59.57% |

Done

FIG. 64B

Detroit Luxury Suites – (48535 sqft)
9/01/96 – 8/31/97 kBTU/sqft Usage

| Month | Current | Prior | Change |
|---|---|---|---|
| September | 8.55 | 0.0 | N/A |
| October | 10.26 | 0.0 | N/A |
| November | 10.69 | 0.0 | N/A |
| December | 10.84 | 11.19 | -3.14% |
| January | 13.99 | 13.99 | -0.01% |
| February | 13.58 | 11.82 | 14.89% |
| March | 45.51 | 14.30 | 218.25% |
| April | 15.92 | 11.00 | 44.64% |
| May | 7.35 | 9.72 | -24.41% |
| June | 9.99 | 8.61 | 16.03% |
| July | 9.50 | 7.99 | 18.87% |
| August | 1.20 | 9.50 | -87.37% |
| Total: | 157.38 | 98.12 | 60.40% |

FIG. 36L

Denver Mountain Suites — (51200 sqft)
9/01/96 — 8/31/97 kBTU/sqft Usage

| Month | Current | Prior | Change |
|---|---|---|---|
| September | 9.07 | 0.0 | N/A |
| October | 9.86 | 0.0 | N/A |
| November | 12.54 | 0.0 | N/A |
| December | 14.63 | 5.48 | 167.19% |
| January | 15.32 | 15.62 | -1.88% |
| February | 12.88 | 15.31 | -15.84% |
| March | 11.88 | 14.88 | -20.18% |
| April | 6.64 | 12.13 | -45.27% |
| May | 9.77 | 10.39 | -5.94% |
| June | 9.21 | 9.77 | -5.72% |
| July | 18.02 | 10.66 | 70.69% |
| August | 0.59 | 10.46 | -94.34% |
| Total: | 130.59 | 104.70 | 24.73% |

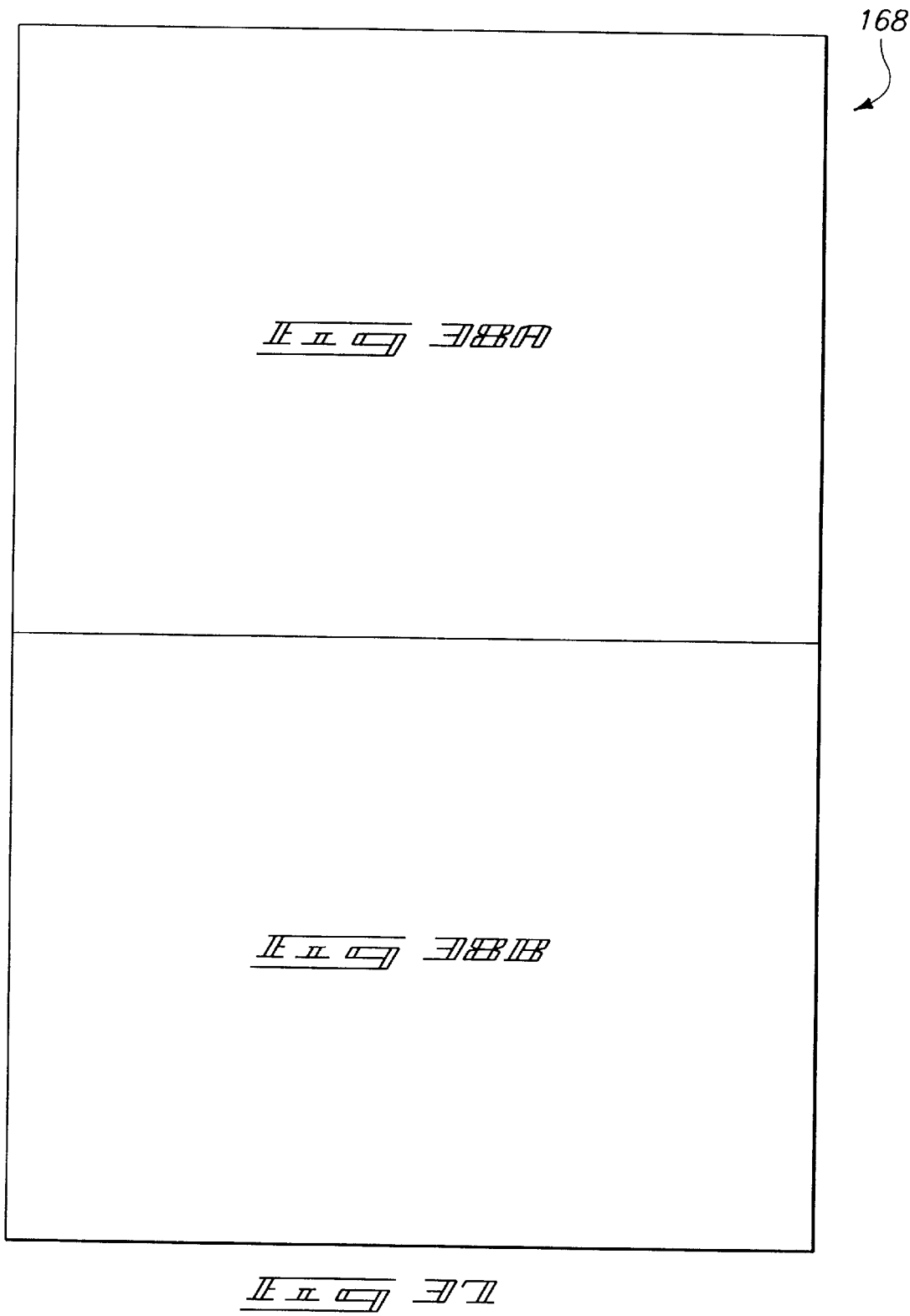

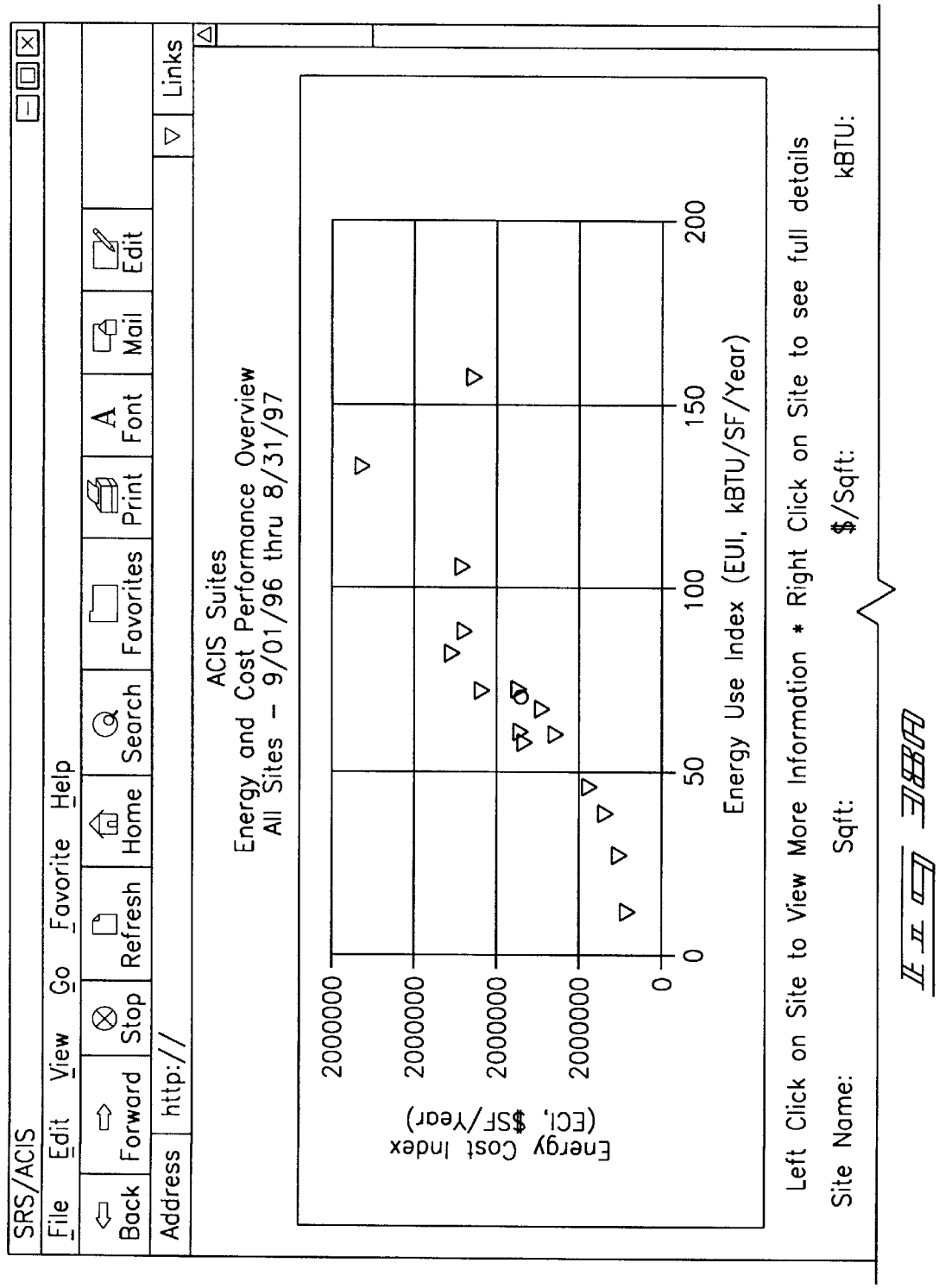

| Site | Sq Feet | $/Sft | kBTU |
|---|---|---|---|
| Monthly Average: | 66944 | $0.84 | 72.86 |
| Austin Chili Suites | 65700 | $0.36 | 36.01 |
| Cincinnati Stadium Suites | 82536 | $0.46 | 42.66 |
| Denver Mountain Suites | 51200 | $1.79 | 130.61 |
| Dertoit Luxury Suites | 48535 | $1.11 | 157.39 |
| Hartford Village Suites | 60500 | $1.19 | 105.24 |
| Indianapolis Brickyard Suites | 49500 | $0.86 | 75.3 |
| Las Vegas Shimmering Suites | 39625 | $1.22 | 83.62 |
| Long Island Beach Suites | 44750 | $1.05 | 75.28 |
| Memphis Country Suites | 27560 | $0.83 | 64.07 |
| Portland Riverview Suites | 75690 | $0.21 | 27.04 |
| Raleigh Match Play Suites | 68585 | $0.82 | 62.1 |
| Sacramento Vineyard Suites | 56980 | $0.67 | 62.98 |
| Spokane Falls Suites | 162500 | $0.17 | 12.55 |
| Tucson Desert Suites | 118250 | $0.72 | 69.2 |
| Wilmington Garden Suites | 52250 | $1.19 | 88.85 |

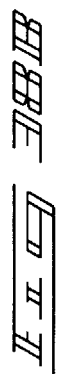

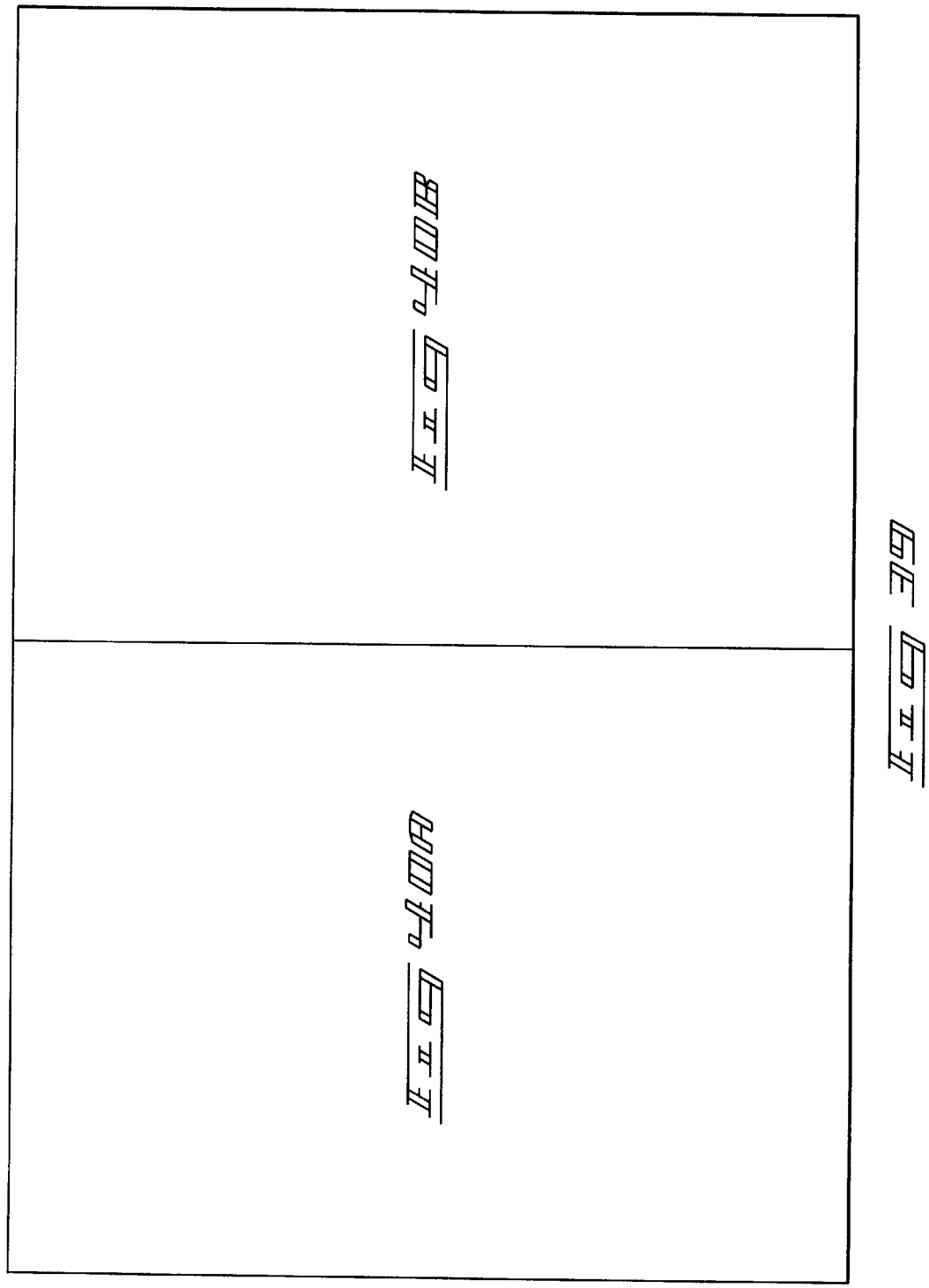

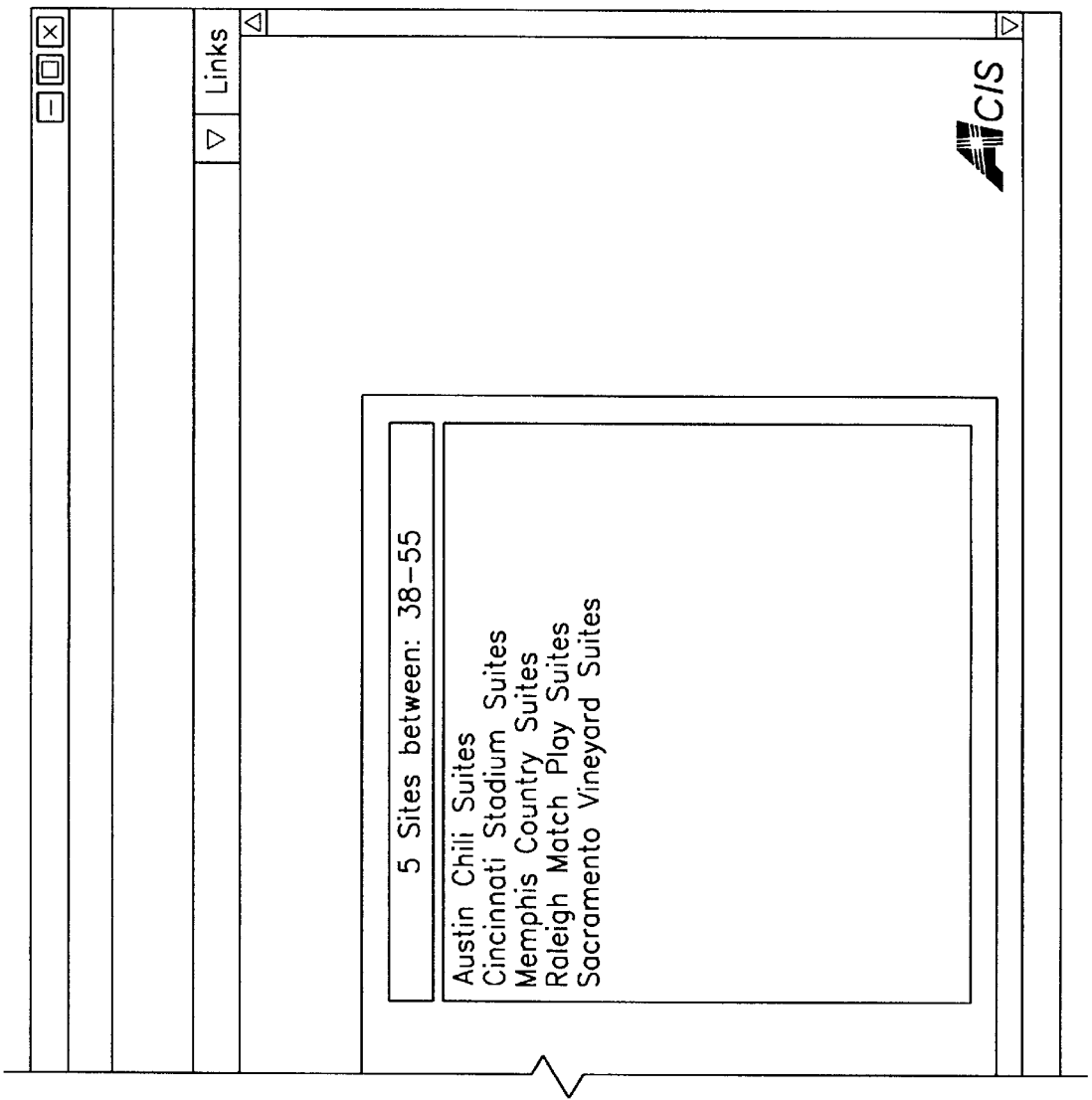

ACIS Suites
Energy Performance Site Detail*
12 Sites – All EUI Ranges kBTU/SF/YEAR

| Zone 1 | Floor Area (Sq. F.t) | | | | | | |
|---|---|---|---|---|---|---|---|
| National Average | | 36 | 93 | 143 | 200 | 434 | |
| Company Average | 51200 | △117.7 | | △153.4 | | | |
| Denver Mountain Suites | 51200 | △117.7 | | | | | |

| Zone 2 | Floor Area (Sq. F.t) | | | | | | |
|---|---|---|---|---|---|---|---|
| National Average | | 34 | 100 | 153 | 226 | 583 | |
| Company Average | 52845 | △96.8 | | △196.9 | | | |
| Indianapolis Brickyard Suites | 49500 | △63.5 | | | | | |
| Hartford Village Suites | 60500 | △88.3 | | | | | |
| Detroit Luxury Suites | 48535 | | △138.6 | | | | |

| Zone 3 | Floor Area (Sq. F.t) | | | | | | |
|---|---|---|---|---|---|---|---|
| National Average | | 36 | 75 | 139 | 210 | 435 | |
| | | | △159.3 | | | | |

FIG. 42A

| | Floor Area (Sq. F.t) | | | | | |
|---|---|---|---|---|---|---|
| Company Average | 62441 | | | | | Δ 51.3 |
| Portland Riverview Suites | 75690 | | | | | Δ 27.2 |
| Cincinnati Stadium Suites | 82536 | | | | | Δ 42.7 |
| Sacramento Vineyard Suites | 56980 | | | | | Δ 52.1 |
| Long Island Beach Suites | 44750 | | | | | Δ 60.5 |
| Wilmington Garden Suites | 52250 | | | | | Δ 73.8 |
| Zone 4 | | 21 | 68 | 103 | 166 | 490 |
| National Average | | | | Δ 130.3 | | |
| Company Average | 40461 | | | Δ 130.7 | | |
| Austin Chili Suites | 59500 | | | | | Δ 39.7 |
| Memphis Country Suites | 27560 | | | | | Δ 50.7 |
| Raleigh Match Play Suites | 68585 | | | | | Δ 51.8 |
| Austin Chili Suites | 6200 | | | | | Δ 380.7 |
| Zone 5 | | 22 | 69 | 92 | 152 | 425 |
| National Average | | | | Δ 117.7 | | |
| Company Average | 39625 | | | | | Δ 67.1 |
| Las Vegas Shimmering Suites | 39625 | | | | | Δ 67.1 |

\* The four quartile ranges were developed from a 1992 national survey. The values shown are for buildings of similar activity types and climate zones.

FIG. 42B

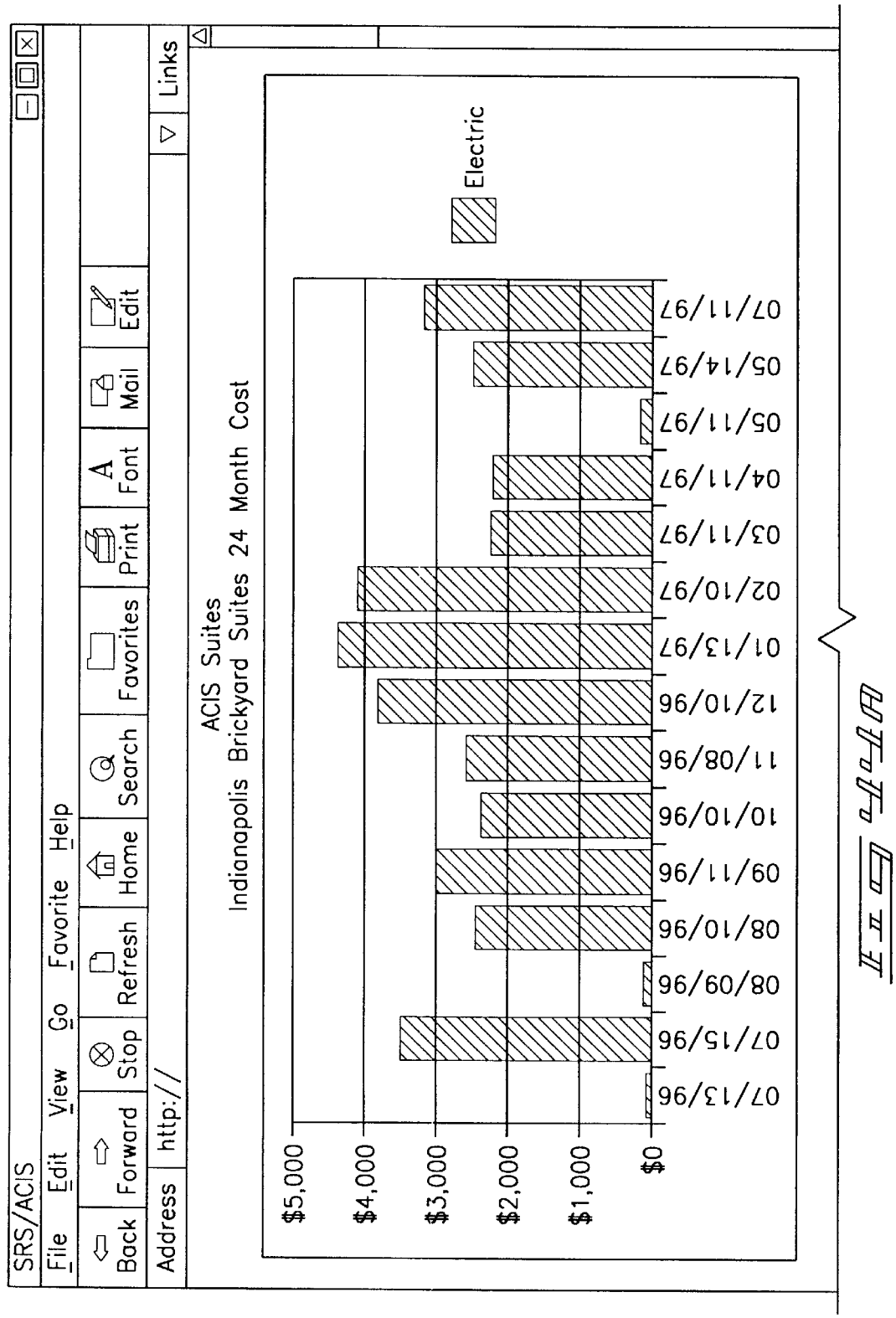

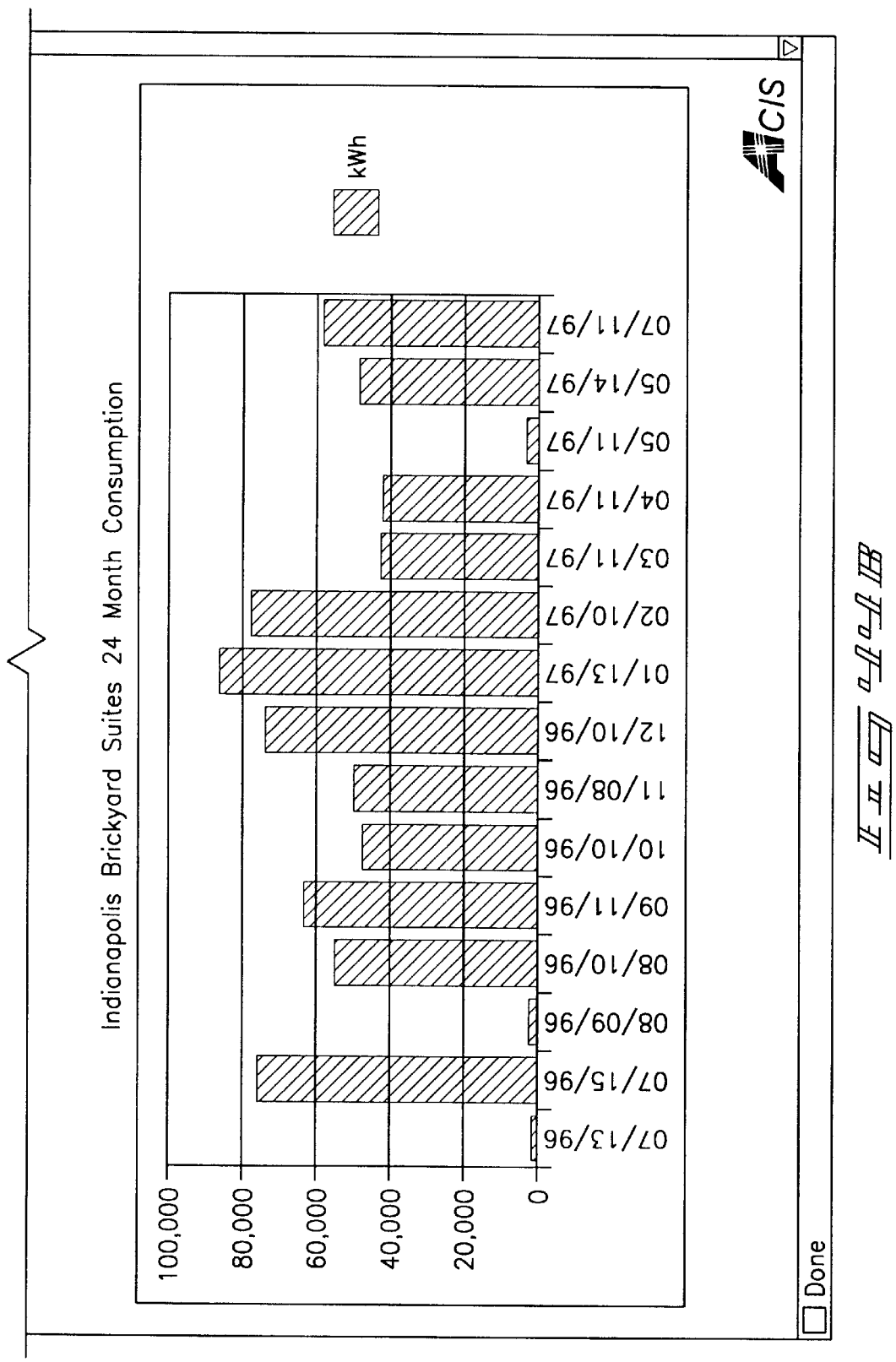

ACIS Suites
October, 1997 YTD Production Units Costs

| Site Name | Oct 97 YTD | Oct96 YTD | Variance YTD | Variance % |
|---|---|---|---|---|
| Memphis Country Suites | $0.97 | $1.64 | (0.67) | -40% |
| Tucson Desert Suites | $1.24 | $1.96 | (0.73) | -36% |
| Sacramento Vineyard Suites | $1.49 | $2.30 | (0.80) | -34% |
| Long Island Beach Suites | $2.16 | $2.95 | (0.80) | -26% |
| Dertoit Luxury Suites | $1.47 | $1.96 | (0.49) | -25% |
| Raleigh Match Play Suites | $1.49 | $1.97 | (0.48) | -24% |
| Hartford Village Suites | $1.11 | $1.46 | (0.35) | -23% |
| Wilmington Garden Suites | $2.31 | $2.87 | (0.56) | -19% |
| Denver Mountain Suites | $1.39 | $1.55 | (0.16) | -10% |
| Las Vegas Shimmering Suites | $1.33 | $1.33 | (0.00) | 0% |
| Indianapolis Brickyard Suites | $0.74 | $0.35 | | |
| Cincinnati Stadium Suites | $0.76 | $0.07 | | |
| Austin Chili Suites | $1.04 | $0.00 | | |
| Portland Riverview Suites | $0.35 | $0.00 | | |
| Spokane Falls Suites | $0.87 | $0.00 | | |

FIG. 46A

COST PER
= 10% Reduction of better
= 5-9% Reduction
= 1-4% Reduction
= 0 or Less Reduction
= N/A

FIG. 46B

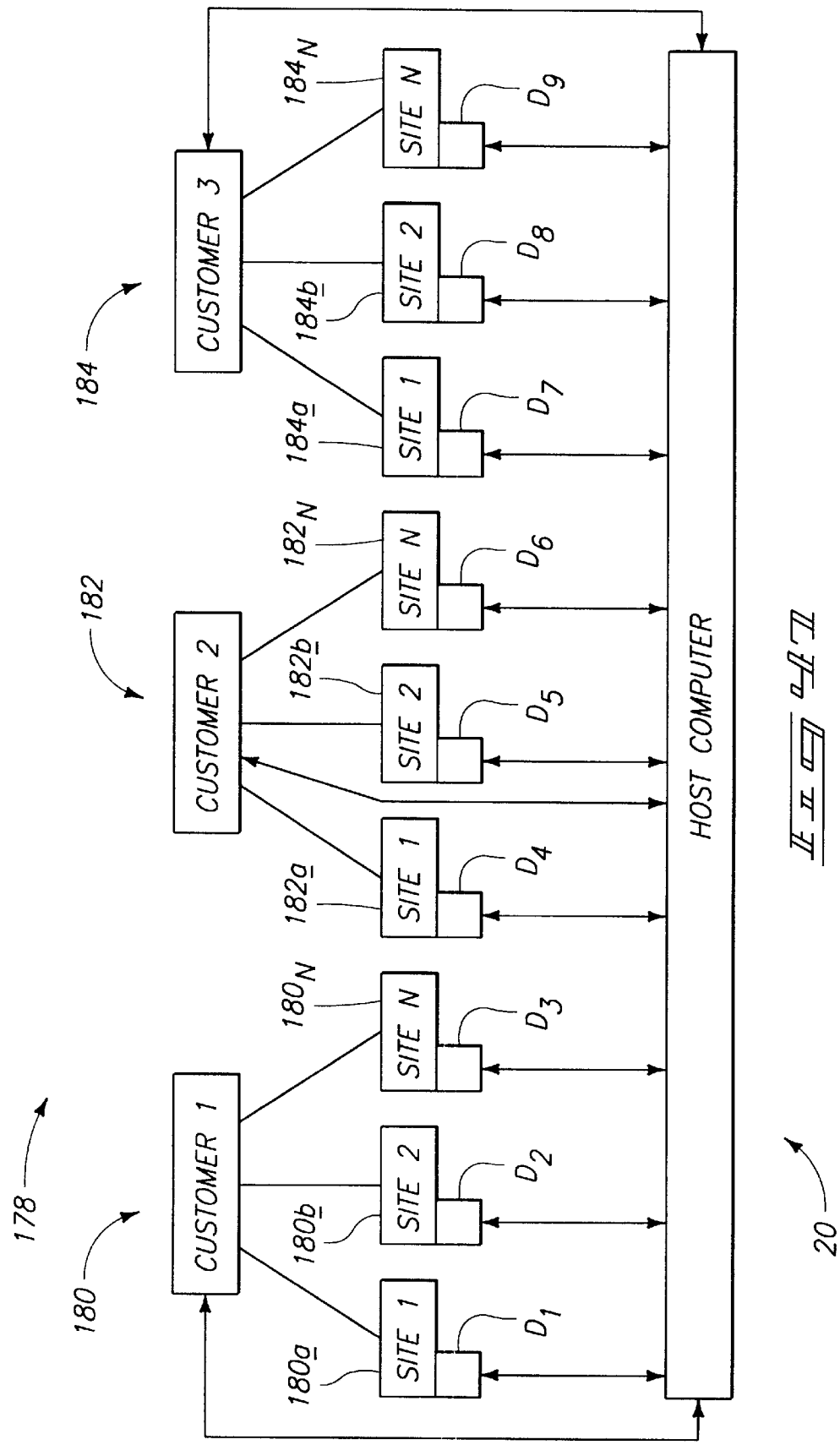

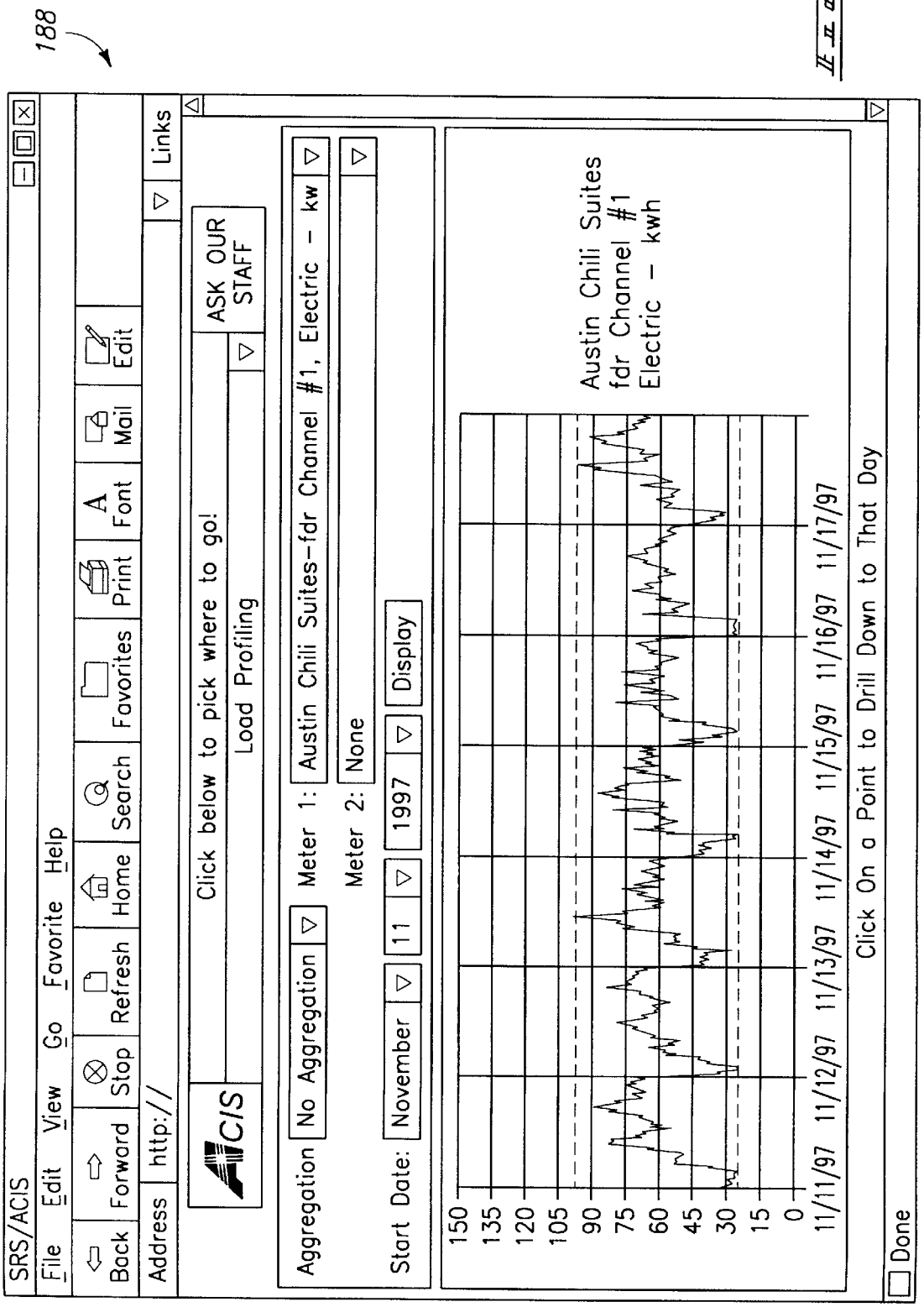

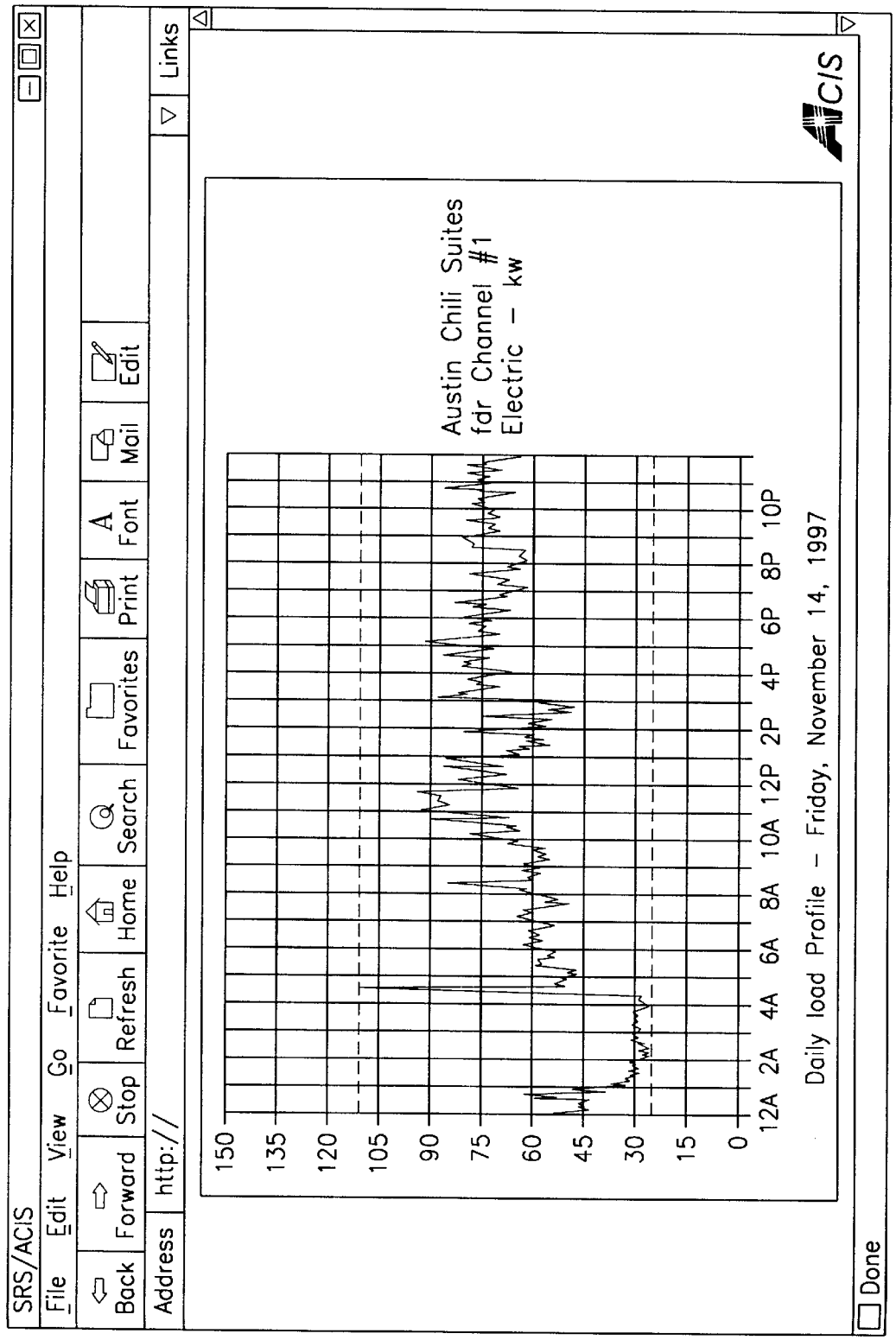

FIG. 52A

| SRS/ACIS | | | | | | | | | | □ × |
|---|---|---|---|---|---|---|---|---|---|---|
| File Edit View Go Favorite Help |

Back | Forward | Stop | Refresh | Home | Search | Favorites | Print | Font | Mail | Edit Address http://

◢CIS

Click below to pick where to go!

Load Profiling ▷

Aggregation: | Region ▷
| No Aggregation |
| Total Company |

Start Date: | Region
| State
| Utility

Display

Region: Southwest ▷

ASK OUR STAFF

COMPUTERIZED RESOURCE ACCOUNTING METHODS AND SYSTEMS, COMPUTERIZED UTILITY MANAGEMENT METHODS AND SYSTEMS, MULTI-USER UTILITY MANAGEMENT METHODS AND SYSTEMS, AND ENERGY-CONSUMPTION-BASED TRACKING METHODS AND SYSTEMS

RELATED PATENT DATA

This application is related to U.S. patent application Ser. No. 08/984,708, bearing attorney docket number WA23-003, entitled "Computerized Billing and Payment Authorization Methods and Systems, Computerized Bill Consolidating and Payment Authorization Methods and Systems, Utility Billing Access and Payment Methods and Systems, Utility Billing Access and Consolidating Methods and Systems, and Utility Provider Consolidated Billing System", filed on Dec. 3, 1997, assigned to the assignee of the present application, the disclosure of which is incorporated by reference herein.

TECHNICAL FIELD

This invention pertains to computerized resource accounting methods and systems, and in particular computerized utility resource management methods and systems, multi-user utility resource management methods and systems, and energy-consumption-based tracking methods and systems.

BACKGROUND OF THE INVENTION

A resource can be considered as a good, service, and/or commodity which is purchased by a customer and sold by a resource provider. Oftentimes a customer will purchase many different types of resources from numerous providers under differing pricing structures, and desire to account for, or otherwise track its resource consumption. This can be for various reasons which include a desire to budget for resource purchasing, track current and past usage and expenditures, and to predict future usage and expenditures.

One type of resource is a utility resource. Utility resources typically include electricity, gas (natural or petroleum-based), water, and sewer service, to name just a few. One type of customer for utility services is one which includes a number of different geographically-separated sites. Such customers typically purchase their resources from multiple unrelated resource providers. Those who have purchase decision making and/or payment authority for these types of resources typically face a very burdensome task of tracking and maintaining resource consumption and use information for a customer, and in particular for a customer having a number of different sites. In the past, tracking and accounting for resource consumption has typically been done by each individual customer. Needless to say, this is a very time-consuming and expensive proposition.

The problems faced by a customer having multiple sites are particularly nettlesome in view of the environment of deregulated energy markets because customers now have the ability to look to multiple providers with differing offering terms for required utility resources.

This invention arose out of concerns associated with improving the management tools available for assisting customers in tracking, verifying bill accuracy, maintaining, and/or making resource purchasing decisions. In particular, this invention arose out of concerns associated with providing improved management tools for tracking, verifying bill accuracy, maintaining, and/or facilitating decision making pertaining to the acquisition, transport, and consumption of utility resources.

SUMMARY OF THE INVENTION

Computerized resource accounting methods and systems, and in particular computerized utility resource management methods and systems, multi-user utility resource management methods and systems, and energy-consumption-based tracking methods and systems are described. In one implementation, a host computer includes a processor, an interface device and a database defined therein for maintaining information pertaining to one or more customers of one or more resources. Resource usage information is received into the host computer pertaining to consumption of one or more of the resources by one or more of the customers at one or more customer site. The resource usage information is processed to provide usage-based, computer-viewable data. associated with a respective customer's consumption of one or more of the resources. In a preferred aspect, each customer is provided with computer access to the computer-viewable data through the interface device, wherein the customer can view the data at a location which is remote from the host computer. Preferably, the computer-viewable data comes in the form of a plurality of different graphical reports, including numerical and tabulated reports, which can be selected by a customer. For customers with multiple sites, the viewable data for the various sites can be viewed remotely and in a plurality of different report formats. In a preferred implementation, utility resource usage information, e.g. electricity, gas, water, etc. . . , is tracked, maintained, and made available to facilitate decision making.

BRIEF DESCRIPTION OF THE DRAWINGS

Preferred embodiments of the invention are described below with reference to the following accompanying drawings.

FIG. 1 is a block diagram of a computer system which is suitable for implementing the methodologies and systems of the present invention.

FIG. 2 is a high level organizational diagram illustrating one aspect of the present invention.

FIG. 7 is a high level organizational diagram illustrating a preferred embodiment of the present invention.

FIG. 8 is a view of an interactive computer screen implemented in connection with a preferred embodiment of the present invention.

FIG. 9 is a view of another interactive computer screen implemented in connection with a preferred embodiment of the present invention.

FIG. 12 is a view of the FIG. 11 computer screen showing a drop down menu feature listing a number of different exemplary graphical reports which can be selected by a customer.

FIGS. 15, 16A–16C are views of one report screen in connection with one aspect of the present invention.

FIGS. 17, 18A–18C are views of one report screen in connection with one aspect of the present invention.

FIGS. 19, 20A–20B are views of one report screen in connection with one aspect of the present invention.

FIGS. 23, 24A–24D are views of one report screen in connection with one aspect of the present invention.

FIGS. 27, 28A–28B are views of one report screen in connection with one aspect of the present invention.

FIGS. 29, 30A–30D are views of one report screen in connection with one aspect of the present invention.

FIGS. 31, 32A–32B are views of one report screen in connection with one aspect of the present invention.

FIGS. 37, 38A–38B are views of one report screen in connection with one aspect of the present invention.

FIGS. 39, 40A–40B are views of one report screen in connection with one aspect of the present invention.

FIG. 47 is a high level organizational diagram illustrating another preferred embodiment of the present invention.

FIG. 49 is a view of another interactive computer screen implemented in connection with the FIG. 47 preferred embodiment of the invention.

FIG. 50 is a view of another interactive computer screen implemented in connection with the FIG. 47 preferred embodiment of the invention.

FIG. 54 is a view of another interactive computer screen implemented in connection with another aspect of the present invention.

DETAILED DESCRIPTION OF THE PREFERRED EMBODIMENTS

Overview

Figure 3:
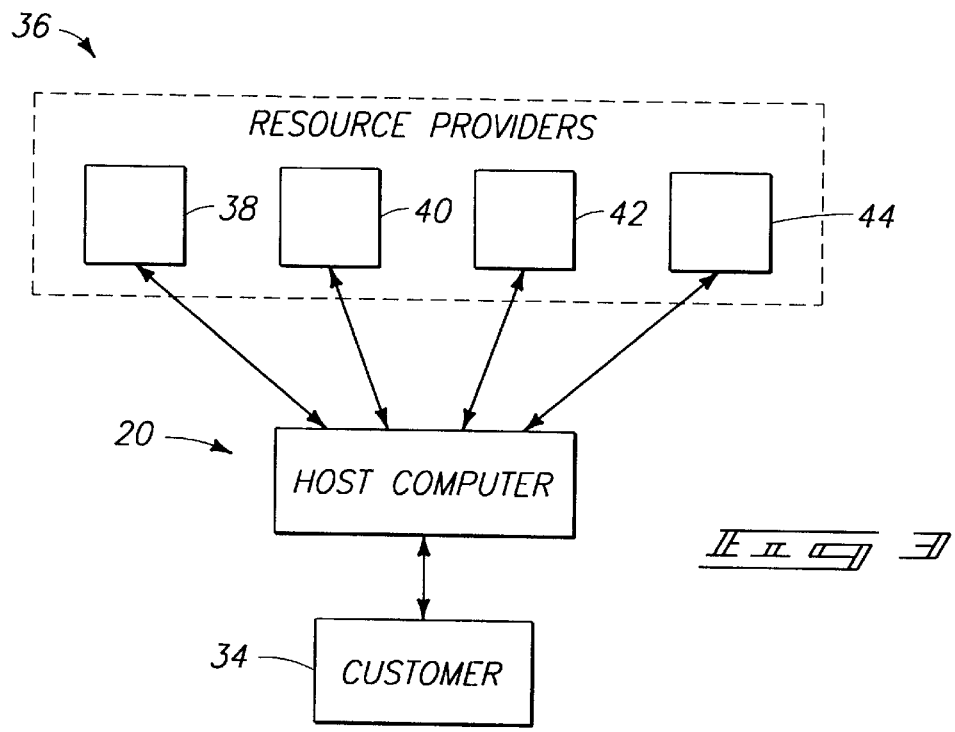
FIG. 3 is a high level organizational diagram illustrating one aspect of the present invention.

With reference to the various systems and methodologies of the present invention, as described below, aspects of the present invention are described in terms of steps, some of which being executed or executable on a computer system. Various implementations of the inventive systems and methodologies provide a comprehensive, multi-faceted, multi-user based resource accounting feature which, in a preferred implementation, provides a dynamic, real-time utility resource management tool. In accordance with these implementations, a utility resource tracking system is provided which is prepared to handle the increased complexities of utility resource billing, such as electric and gas billing, due to deregulation. Significant cost savings are achieved through the identification of opportunities made possible by detailed utility resource tracking aspects which will become apparent below. Access to important pertinent resource consumption and pricing information is immediate and comprehensive, and permits an individual or company to access, among other things, utility resource costs and usage figures to assist in the decision making process. In other aspects of the invention which are discussed in much more detail below, one is given the opportunity to compare resource consumption among various multiple sites for purposes which include identifying sites having desirable and undesirable resource usage or cost characteristics.

In a preferred implementation, a central database is developed and contains information pertaining to different corporate and/or individual facilities. Information such as billing history for utility resource usage, structure information (such as square footage and structure characteristics), servicing utility resource provider and/or utility resource providers, and utility resource account information can be, and preferably is incorporated into the database. Other types of information can be incorporated, as will become apparent below.

Through the normal course of the database development process, a verification can be utilized to ensure that all sites are on the most advantageous utility resource rate. Accordingly, comprehensive utility resource tracking, analysis, and reporting is made possible through the various systems and methodologies of the invention. Billing information, such as cost and usage information can be entered into or received into a host system or computer and normalized daily. The information can be normalized furthermore for variances in degree-days and/or site specific primary and secondary production units. Through monthly tracking and monitoring of utility resource cost and consumption, various facilities are able to be identified with high and/or abnormal energy or resource usage. Through timely detection of such usage anomalies, corrective action can be undertaken immediately, rather than months after the fact.

In accordance with one aspect of the invention, billing information which is received from each resource provider is scrutinized in accordance with a plurality of predefined or pre-determined tolerance parameters. Any information which does not meet with one or more of the tolerance parameters can be flagged for remedial processing. In accordance with a preferred aspect of the invention, scrutinization is performed by the host computer in accordance with a variety of algorithmic checks which are implemented in software. The tolerance parameters are preferably calculated through utilization of the billing information for each resource provider.

In accordance with one aspect of the invention, utility resource usage-based information is provided and can be accessed by a customer through an exclusive password-protected system. In this way, a flexible and paperless reporting environment meets the demands of real-time information needs of various customers. In other aspects, customers can remotely view utility resource usage data, via computer, in a number of different formats. For example, usage data can be viewed for individual facilities, all facilities, or in accordance with various defined reporting formats, e.g. BTUs/square feet, facility versus facility, facilities within a region, yearly, monthly or daily aggregate for a single or a group of facilities. Such various reporting formats are discussed in much more detail below. In other aspects of the invention, information can be downloaded from the host system, via a computer link established with a remote computer at a customer location. Such permits a customer to conduct their own analysis at their own location. In a preferred implementation, the download function is accessed through a drop down menu which permits selection of a time period, service codes, and locations. Once a request for downloading information is complete, a file is sent containing the bill date, bill identifier, site identifier, service code, consumption amount and unit of measurement, dollar amount, tax, and various miscellaneous charges. The information can be, and preferably is in a so-called fixed column flat file format.

Although a variety of different computer systems can be used with the present invention, an exemplary computer system is shown generally at 20 in FIG. 1.

Computer System Overview

Computer system 20 includes a host computer 22 having a processor 24, memory 26, data storage device 28, and an interface device 30. The exemplary components 24–30 of host computer 22 are operably connected via an address/data bus which is not specifically designated. Memory 26 can, and preferably does include a volatile memory (e.g. random access memory) which is coupled with the data bus for storing information and instructions for processor 24, and a non-volatile memory (e.g. read only memory) coupled with the data bus for storing static information and instructions for processor 24. Data storage device 28 can comprise a mass storage device. Host computer 22 constitutes a hardware platform which executes instructions to implement the application program(s) described just below. It will be understood that system 20, as set forth in FIG. 1, is a schematic representation only. Accordingly, the system as described above and below can be implemented as an integral stand alone system as suggested by FIG. 1, or can include separate component parts which are interconnected and operable for implementing the invention described below.

Interface device 30 preferably comprises a multi-user network interface (e.g. an Internet interface) which couples computer system 20 to a multi-user system (e.g. the Internet in one embodiment of the present invention). Interface 30 is coupled to permit communication with various application programs contained on the hardware platform defined by computer system 20.

As mentioned above, and in a preferred implementation of the present invention, interface device 30 comprises an Internet interface. The Internet is a well known connection of world wide computer systems that operate using a well known Internet protocol. The Internet is one type of multi-user computer system. Other Internet applications (e.g. using specific protocols) operate on top of the Internet protocol. One such application is the well known world wide web or "www" Internet application which operates using the hypertext transfer protocol or http. The "www" Internet application is a "demand system" in which a user requests information from a site and the site transfers the information back to the user on-line. Also well known is the email Internet application which operates using the simple mail transport protocol or smtp. The email Internet application is a "present system" in that an information transfer command originates from a sender site and information pursuant to that command is presented to the target email address. Another Internet application is the file transfer Internet application which operates using the file transfer protocol ftp. In one embodiment, the present invention utilizes the www, email, and file transfer Internet applications as well as the Internet protocol. Other embodiments of the present invention can be implemented in other multi-user computer environments. For example, the present invention could be implemented with a dedicated multi-user system.

Computer system 20 supports a software configuration which operates under control of a conventional operating system. The operating system permits various application processes to be executed. These include, for example, a communications application which permits data transfer with various remote terminals as will become apparent below. The software environment further includes a data management, storage, and retrieval application that is utilized in connection with data storage device 28. The data management, storage, and retrieval application organizes and stores information which will be described in greater detail below. This information is organized and stored within the environment of the operating system on one or more mass storage devices such as data storage device 28. Other applications conventionally known may be included in the software environment comprising computer system 20.

In view of the foregoing computer system description and in accordance with one aspect of the invention, the reader is referred to FIG. 2. There, an exemplary computer system or host system 20 can be seen to comprise part of a system which includes a resource provider 32 and a customer 34. In the context of this document, the term "resource provider" will be understood to include a company or other source from which resources in the form of goods, services and/or commodities originate. In a preferred implementation, such resource provider can comprise one or more utility resource providers, e.g. providers of electricity, water, sewage services, natural gas, propane, alternate energy sources and/or other related goods or services or processes. Similarly, the term "customer" as used in this document will be understood to include an individual, company, companies or sites which consume resources from one or more resource providers. In a preferred implementation, such customers consume one or more utility resources for which it is desired to account.

Figure 5:
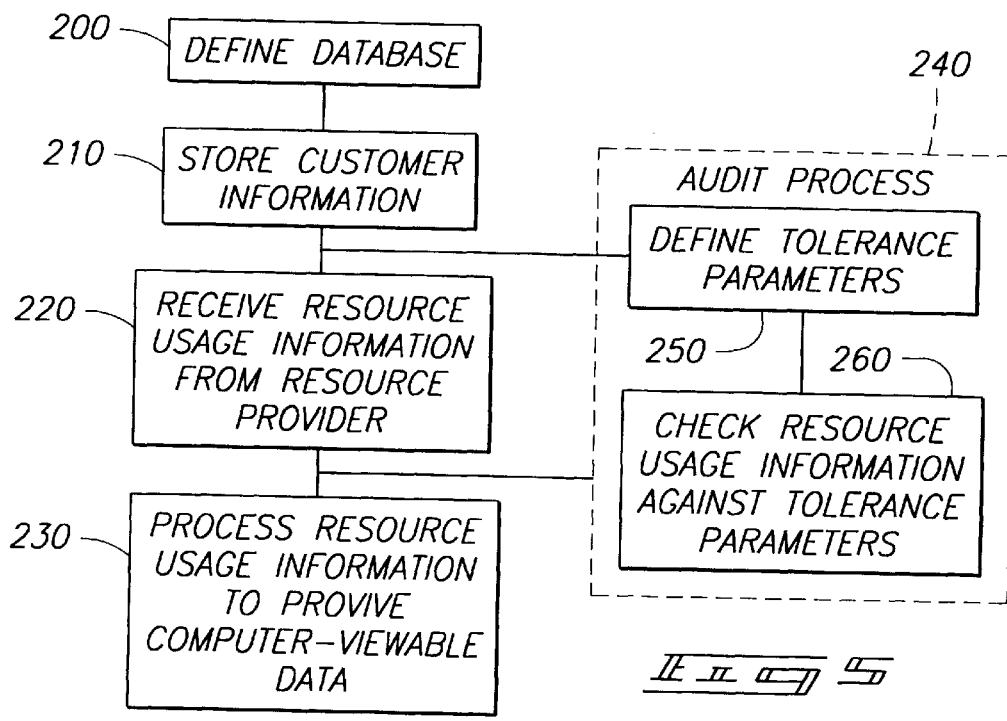
FIG. 5 is a flow diagram illustrating certain methodical aspects of the present invention.

Referring to FIGS. 1, 2, and 5, FIG. 5 presents a high level flow diagram which is or can be implemented with a software program executable on computer system 20 of the present invention. Such program would typically be stored in memory 26. A database is first defined at step 200 (FIG. 5) in host computer 22. Such database is preferably defined within a data storage device, such as data storage device 28 (FIG. 1). Information associated with at least one customer, such as customer 34, is entered and stored at step 210 in the database. The information can include any type of information which is useful in implementing the present invention. Exemplary information includes the customer's name (whether an individual or a company), mailing address, business phone number, primary accounts payable point of contact, email address, general ledger account number, banking information, and/or site listing. Additionally, information such as site name, site number, site address, square footage, year built, site open date, and billing histories can be stored in the database as well. Exemplary billing history information can include such things as billing date, past due date, billing period begin and end dates, types of service, consumption, commodity charges, tax, and various other information as well.

At step 220 (FIG. 5) resource usage information from resource provider 32 is received into host computer 22. The resource usage information pertains to consumption of at least one resource by the customer. The resource usage information can be introduced into system 20 in any suitable way. In one embodiment, such information from resource provider 32 is received electronically, via a suitable data link with host computer 20, using one or more of the Internet protocols mentioned above. Alternately, resource usage information can be received in hard-copy form and entered into the host computer as by manual data entry. Other methods and systems can, of course, be utilized to permit such information to be received by host computer 20.

In a preferred implementation, the resource usage information which is received into the host computer pertains to a plurality of different consumption variables of the resource by the consumer. For example, one such consumption variable can be a cost-related consumption variable associated with the cost of a particular resource consumed by a consumer. Another consumption variable is a quantity-related consumption variable which is related to a quantity of a particular resource consumed by a consumer.

Tolerance Parameter Checking

In one aspect of the invention, an audit process is provided at step 240 (FIG. 5). The audit process is preferably implemented in a suitable software application which is resident upon the hardware platform defined by host computer 22. Audit process 240 includes a definition step, at step 250, wherein at least one, and preferably more predetermined tolerance parameters are defined. At step 260, the resource usage information which is received from resource provider 32 is checked against the pre-determined tolerance parameter(s) for determining whether the information satisfies such parameter(s). If the resource usage information does not satisfy the pre-determined tolerance parameter, then, in accordance with one aspect of the invention, the information from the resource provider is flagged for remedial processing, either manually or electronically, which includes error checking the information.

In one implementation, the pre-determined tolerance parameters are defined through the utilization of historical billing data for customer 34. In particular, when the above-mentioned information regarding the customer is stored, at step 210, historical billing data can be entered and cataloged into the database at that time. Additionally, the historical billing data can include currently up-to-date billing information from a previous billing cycle. Processor 24 (FIG. 1) preferably processes the historical billing data and defines the tolerance parameters.

Two exemplary categories of tolerance parameters are: (1) overall bill tolerance check parameters; and (2) individual line item tolerance check parameters. Of course, other tolerance parameters are possible. Examples of overall bill tolerance check parameters include: (a) current charges cannot exceed one and one a haftimes the average bill; (b) bills cannot overlap with any other system bill with respect to begin and end dates; (c) the bill cannot be duplicated within the system; and, (d) all required information must be present on the entered bill. Examples of individual line item tolerance check parameters include: (a) the number of days of service must fall within 20% either way of the account average; (b) service start date must be the day following the prior period bill end date; (c) service end date must be one day prior to next period begin date; (d) service consumption and dollars must move in the same general direction, e.g. an increase in one should be accompanied by an increase in the other; (e) consumption must fall within a 20% difference of prior or next period consumption; and (f) charges must fall within a 20% difference of prior or next period charges. A bill or billing information failing any of the above parameters is flagged and identified for subsequent remedial processing. As history of a particular customer is accumulated, tolerances can be redefined based upon the actual variances that exist between months and/or billing periods. Accordingly, the pre-defined tolerance parameters are adjustable by the system for each customer. In preferred implementations, and ones which are discussed below, the resource or resources comprise utility resources. Accordingly, the tolerance parameters which are calculated and used to scrutinize the resource usage information can be specifically tailored to such resources. For example, tolerance parameters can be calculated to ensure that each utility bill is arithmetically accurate. Additionally, the resource usage information can be used to effect a comparison between a utility tariff rate to determine whether the bill was priced properly.

Remote Access

At step 230, the resource usage information, which may or may not have been audit processed as described above, is processed by the host computer to provide usage-based, computer-viewable data associated with a particular customer's consumption of the resource.

Figure 6:
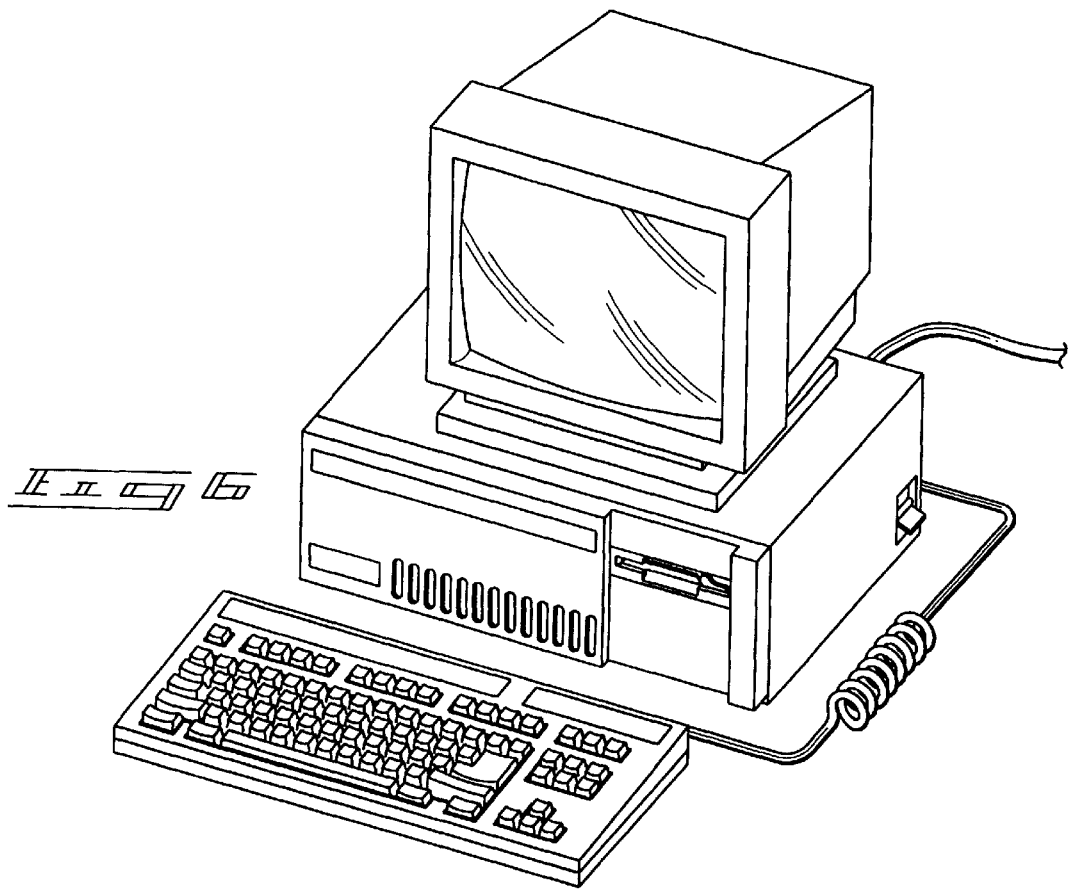
FIG. 6 is an illustration of an exemplary remote electronic access device which can be utilized in implementing the present invention.

Customer 34 can be subsequently provided with remote electronic access to the viewable data preferably through the interface device 30 (FIG. 1). Remote access is preferably provided through a remote computer, such as the one shown in FIG. 6, which is linkable with host computer 22 through a protocol, such as one suitable for use within an Internet-based system. In particular, and in connection with a preferred implementation, host computer 22 provides or otherwise defines an Internet website. The various usage information received and processed by host computer 22 from resource provider 32 is provided on the Internet site and can be remotely accessed by the customer. Preferably, access to information contained on host computer 22 is password-protected such that only the intended customer can access its relevant information. In this way, centralized, computer-accessible, resource accounting methods and systems are provided which are "proactive" in the sense that the customer can, on its own time and terms, access its relevant usage-based information. Further, an audit process is provided to scrutinize the resource usage information to ensure that the information utilized to generate the computer-viewable data is within acceptable tolerances levels.

Referring to FIG. 3, an implementation in accordance with another aspect of the invention is set forth generally at 36. In this implementation, a plurality of resource providers 38, 40, 42, and 44 provide resource usage information to host computer 20 such that the host computer can process the information as described immediately above. The resource providers need not be related to one another and can comprise separate companies. Alternately, the resource usage information provided by resource providers 38–44 can originate from one resource provider and can constitute a plurality of different resources, e.g. electric power, water, natural gas, sewer services, and the like. Such would be the case, for example, if one resource provider were to provide all of the pertinent resources which are utilized by a particular consumer. Of course, the above-described tolerance parameters which are effectuated through the audit processor function can be, and preferably are implemented for the resource usage information which is received from each of the resource providers.

Through a remote computer terminal, customer 34 can access host computer 20 and receive the processed usage-based information in the form of a plurality of different graphical reports which are selectable by a customer and described below in greater detail. Preferably, such access is provided through interface device 30 (FIG. 1) as discussed above.

Again, centralized, computer-accessible, interactive resource management methods and systems are provided which are "proactive" in the sense that the customer can, on its own time and terms, access its relevant resource usage information. Further, a system is provided which can receive resource usage input from a number of different resource providers. Further still, a system is provided which can tolerance check the resource usage information received from each of the resource providers to ensure accurate reporting thereof to the customer. Accordingly, very streamlined, efficient, and accurate resource management and accounting systems and processes are provided by the various implementations of the invention.

Figure 4:
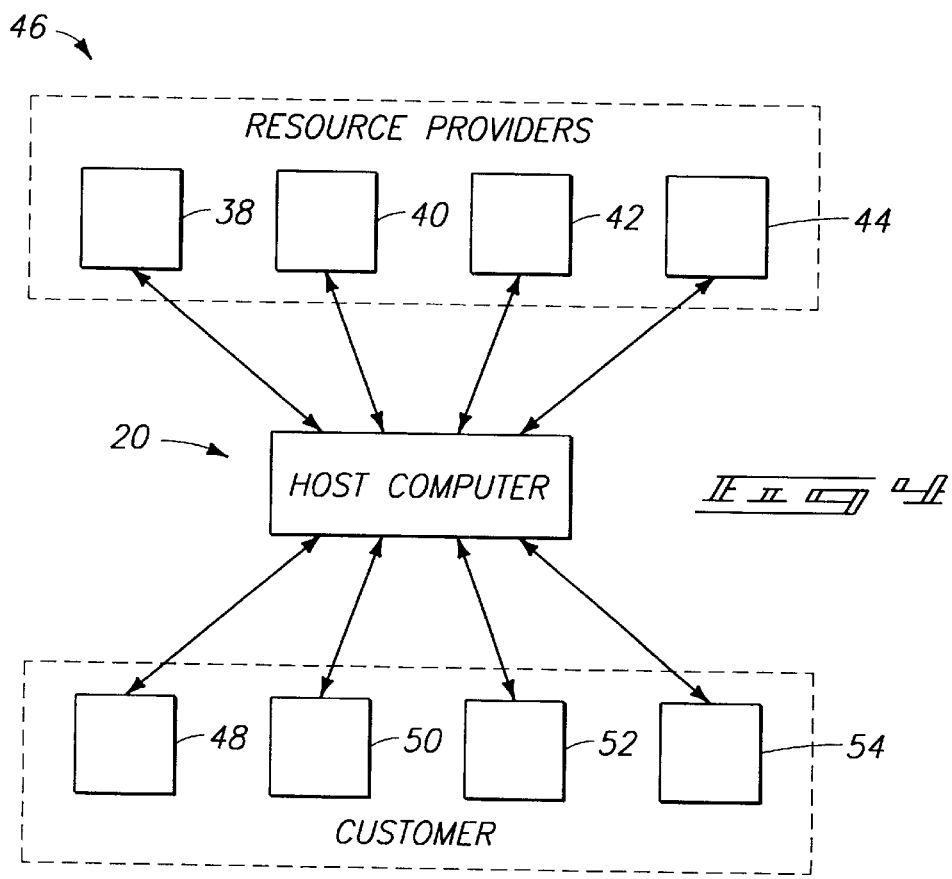
FIG. 4 is a high level organizational diagram illustrating one aspect of the present invention.

Referring to FIG. 4, another implementation in accordance with the invention is set forth generally at 46. There, it can be seen that a plurality of resource providers 38–44 have access to, or are otherwise capable of providing resource usage information to computer system 20. A plurality of customers 48, 50, 52, and 54 preferably have remote electronic access to computer system 20 in much the way as was described above. It is to be understood that although only four resource providers and four customers are utilized in the illustration, many more of both are contemplated.

In this example, a database within host system 20 receives and stores information associated with each of customers 48–54. Resource usage information is received into host computer 20 from resource providers 38–44. Such information, for each of both the resource providers and the customers, is preferably tolerance checked as described above, to ensure the accuracy of such information. Such information is further preferably processed into computer-viewable, usage-based data associated with each customer's consumption of the resource. In a preferred embodiment, the resource comprises a utility resource. Preferably a plurality of different utility resources are managed and tracked by the inventive systems and methodologies. Such processed information is preferably made available, through remote computer terminal access, to each of the customers.

Again, computer-accessible, interactive resource management methods and systems are provided which are "proactive" in the sense that the consumer can, on its own time and terms, access its relevant resource usage information. Further, a system is provided which receives resource usage information from a number of different resource providers, checks the resource usage information against one or more tolerance parameters, processes such information and makes it available to the customers via electronic link. In this implementation a plurality of different customers are incorporated into the system of the present invention. Accordingly, very streamlined, accurate, and efficient systems and processes are provided by the various implementations of the invention.

Referring to FIG. 7, a preferred implementation of the invention is set forth generally at 56. Similar to the above implementation, a computer system 20 is provided and includes a host computer 22 as described above. Information for a plurality of customers 58, 60, and 62 is stored in a database as described above. Each customer can, but need not, comprise a plurality of different sites which may or may not be geographically separated. The customers are customers and consumers of utility resources provided by a plurality of different utility resource providers 64, 66, 68, and 70. Each customer may, however, be a customer of only one utility resource provider. Alternately, each customer may be a customer of more than one utility resource provider. Where a customer has many different geographically-separated sites, utility resources such as electricity, water, gas, and/or other related utility resource services could conceivably be provided by a large number of utility resource companies or providers. Utility resource usage information is received from each utility resource company into host computer 22 as described above in connection with step 220 (FIG. 5). The usage information pertains to consumption of utility resources by each site of each customer and includes, as mentioned above, cost-related and quantity-related consumption variables. Such information is preferably tolerance checked in accordance with the above-described audit processor to ensure the accuracy thereof. Preferably, tolerance checking is performed for each of the utility resource providers for each of their relevant customers. Such information is preferably subsequently processed as described and customers 58–62 are provided with remote electronic access to computer-viewable data in host computer 20 through interface device 30 (FIG. 1) as described above. Such computer-viewable data is preferably in the form of a plurality of different graphical reports which can be selected by the customer for viewing on a computer which is remote from the host computer.

The inventive methodologies and systems described just above are particularly useful in the context of utility resource customers having a number of different, geographically-separated sites (such as nationwide) which are serviced by a plurality of different utility resource providers.

For example, and with reference to FIG. 7, customer 58 includes sites 58a, 58b, and 58c. Although only three exemplary sites are used, it will be understood that such sites can comprise any number of different sites which may or may not be geographically-separated. Similarly, customer 60 includes site 60a, 60b, and 60c. Likewise, customer 62 includes site 62a, 62b, and 62c. For purposes of example only, assume that each geographically-separated site of any of the customers is serviced by a different utility resource provider or company. Each utility resource provider is able to, through the inventive methodologies and systems, provide usage information for each specific geographically-separated site to computer system 20. Such information is received and processed and provided so that each customer, e.g. customers 58, 60, 62, can access and view graphical reports, including numerical and tabulated reports, for each of its sites. In this embodiment, as was briefly mentioned above, the tolerance parameters can be, and preferably are defined to be utility-specific. This gives the customer access to processed, computer-viewable data which includes a desired degree of utility pricing expertise. Such expertise is comprehensive and vast insofar as a large number of utility resource providers are incorporated into the system for an even larger number of customers. Through the preferred tolerance parameter checking, errors or anomalies can be easily detected for correction. In the context of utility providers, customers whose utility usage information is determined to fail one or more of the tolerance parameters can receive an adjustment from the servicing utility, or alternately, can be placed on a correct rate schedule. Alternatively, and in the event there is no error in the usage information, the customer can be advised to modify utility consumption to qualify for a more favorable price, or, may be advised to seek an alternate supplier whose pricing may be more favorable for the customer's existing consumption pattern.

As was initially discussed above, the systems and methodologies of the present invention are preferably implemented in connection with a multi-user computer environment. A preferred computer environment is the Internet. Accordingly, and with reference to FIGS. 8 through 46, 48–54, various exemplary screen displays are illustrated which can be supported or provided on a remote computer terminal, such as the one shown in FIG. 6, for each customer to utilize in accessing and viewing the computer-viewable, usage-based data described just below.

Referring to FIG. 8, a welcome screen 100 is displayed for a website supported by the host computer which allows access by a customer to computer system 20 via interface device 30 (FIG. 1). A particular customer or company can enter its name in field 102, as well as its unique password in field 104. Accordingly, password protection ensures that proper security measures are present and prevents unauthorized access.

Referring to FIG. 9, a screen 106 is presented and includes a number of different fields for gathering information about the customer and, where applicable, each site maintained by a customer. A site set up field 108 is provided in which a customer can enter, where appropriate, each of its individual sites into the system. A site address field is provided at 110. Information which is gathered on each customer can be gathered through a data entry website having a data entry screen such as screen 106, through conventional hard-copy form, or through transmitted email files, and the like. Such information is, or can be utilized in building and maintaining historical billing data and includes such things as corporate name, site, billing information, and utility resource account information.

Report Overview

In the explanation which follows, certain aspects of the invention are described in the context of fictional company called "ACIS Suites" which maintains a plurality of different, geographically-separated lodging units. It is to be understood, however, that inventive systems and methodologies have application in a wide range of industries, and that the present example is for illustrative purposes only.

Figure 10:
FIG. 10 is a view of another interactive computer screen implemented in connection with a preferred embodiment of the present invention.

Referring to FIG. 10, a different site setup screen 112 is shown which enables a customer to enter even more information into the host computer. Screen 112 can be provided for customers that have a plurality of different sites for which accounting for one or more resources is desired. In particular, specific information regarding each of a customer's sites can be ascertained through this screen. In the illustrated example, a plurality of fields are provided for entry of information and include a production units field 114, a climate zone field 116, and a secondary units field 118. In the illustrated example, the production units field 114 can be utilized by a customer to enter information pertaining to the number of units maintained, the variable monthly production units, and the date the site was opened. A production unit can be considered as a fixed daily unit of measurement such as, and in this example, available rooms for a lodging company facility site. The climate zone is used for benchmarking a facility's energy use against a national average adjusted for weather. In the climate zone field 116, a customer can designate a specific climate zone in which a site is located for purposes of comparison to other similarly-located sites. A state map based on the site address entered into the system can appear and a customer can click on the county and/or state in which the site resides. Climate zone assignment information enables reports to be generated which are discussed in more detail below. Climatic conditions for locations have been placed into five categories (i.e. zones 1–5) based upon the number of annual heating degree days and cooling degree days historically occurring in a given location. Such constitutes but one way of grouping sites in accordance with a predefined grouping variable. In this example, the predefined grouping variable is climate zone.

Resource Accounting

Figure 11:
FIG. 11 is a view of another interactive computer screen implemented in connection with a preferred embodiment of the present invention and illustrates a Resource Accounting menu from which a plurality of graphical reports can be selected by a customer.
Figure 11:
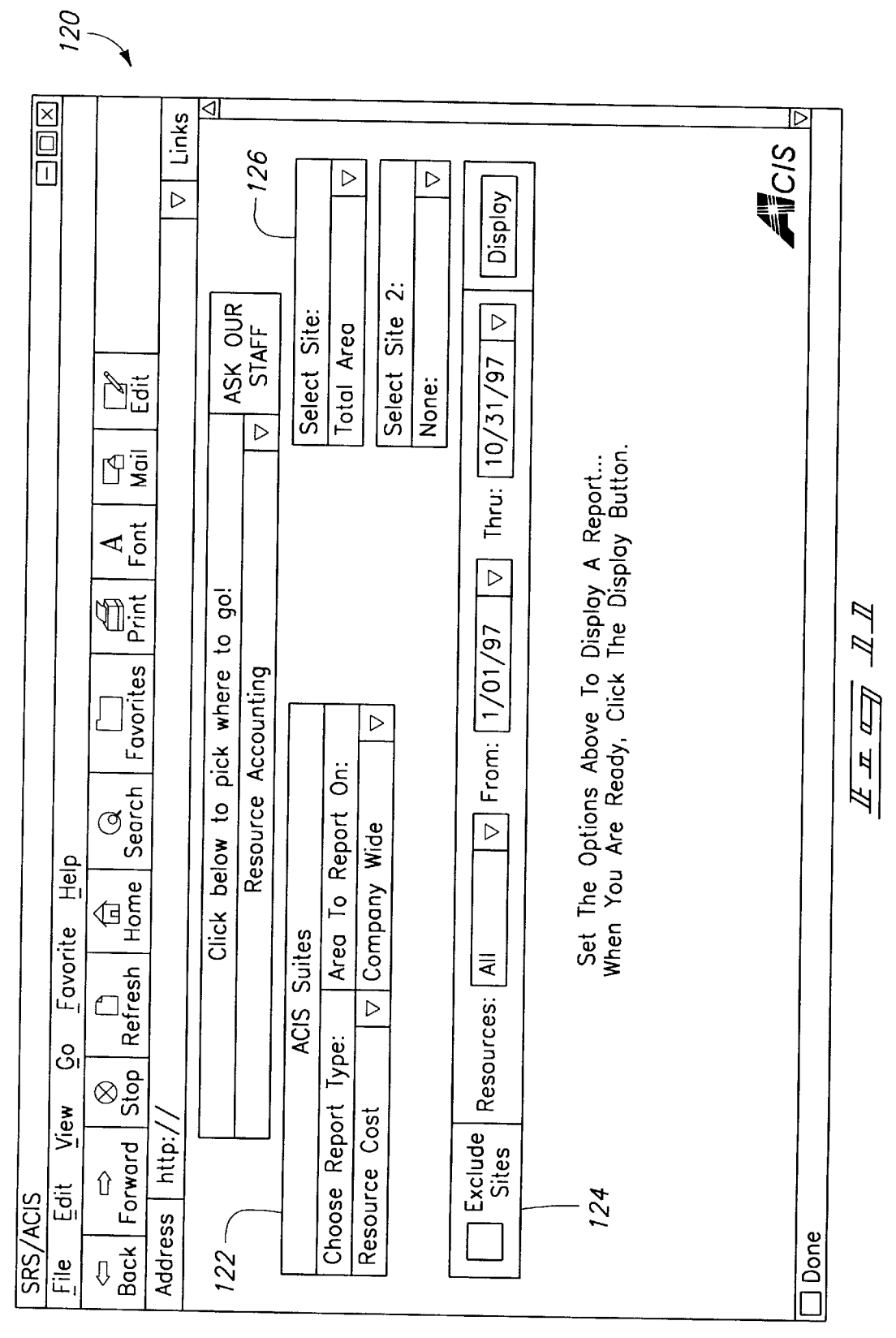

Referring to FIG. 11, a Resource Accounting screen 120 is provided and enables a plurality of selectable graphical reports to be selected by a customer. The reports which are selectable by each customer provide computer-viewable data which can be viewed, in a referred implementation, via a remote computer terminal as described above. A report field 122 is provided and permits a customer to choose between a report type (described in more detail below) and/or an area on which to report. In the illustrated example, a Resource Cost report is selected for a company-wide report. Once a particular report and area are selected via report field 122, the report can be specifically tailored depending on the needs of the customer. For example, a field 124 is provided in which a user can exclude sites based upon user-selected criteria or which were not open for a particular reporting period, select from among a number of different resources, i.e., electricity, gas, water, sewer services, and the like, and specify a date range through which such computer-viewable data can be viewed. In the illustrated example, a company-wide report has been selected to view all resources from Jan. 1, 1997, through Oct. 31, 1997. A select site field 126 is provided and permits a site-to-site comparison to be made between two different sites of the customer. Examples of this are given below in more detail. A customer, through utilization of screen 120, can opt to select a report to view a total company area average, a single site, or a site-to-site comparison. Once pertinent parameters have been set for a report, a user need simply only click on the "Display" feature in field 124 to see a display of the relevant computer-viewable data.

Figure 12:
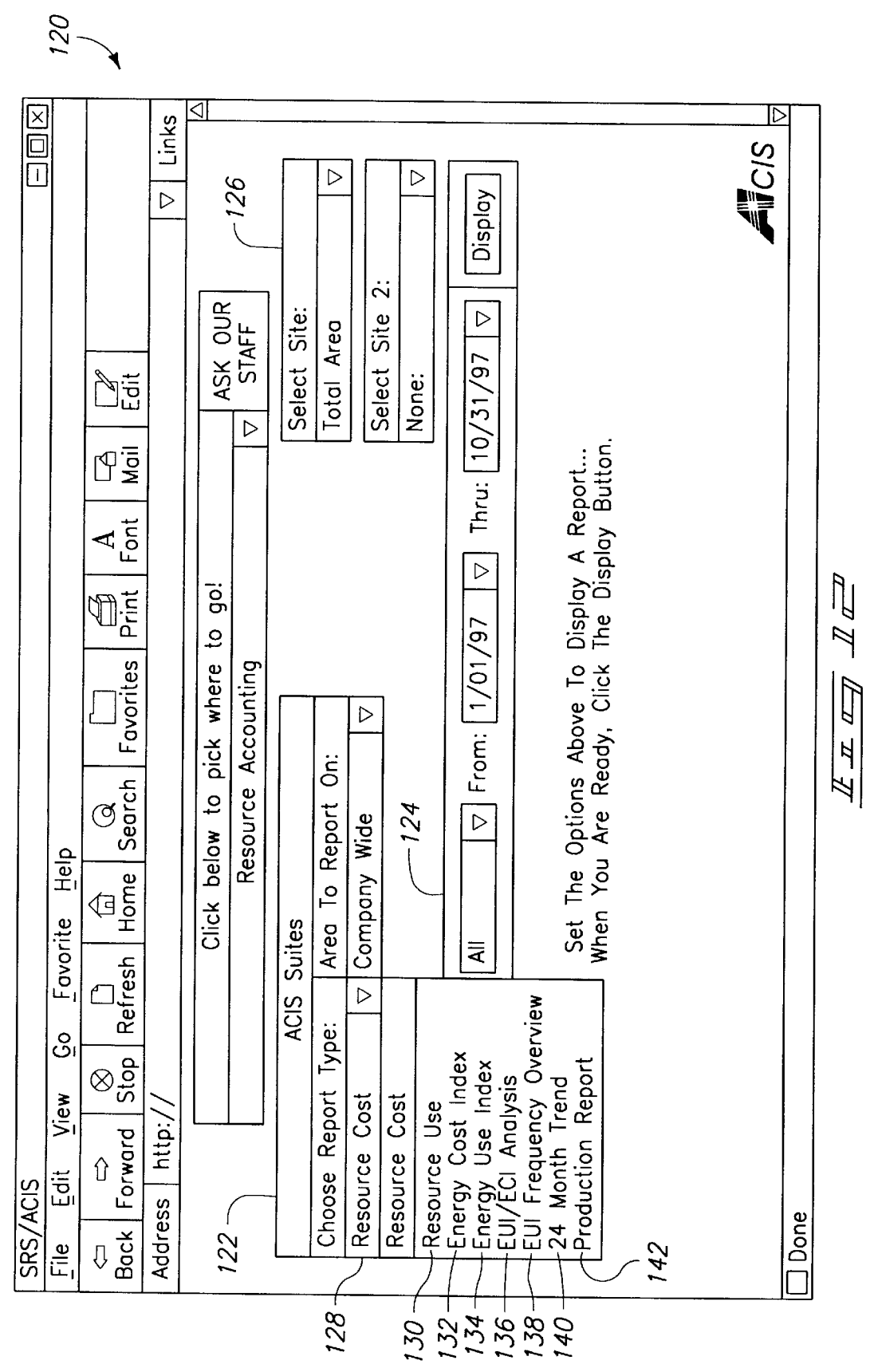

Referring to FIG. 12, screen 120 is shown in more detail, and in particular the number of different reports which can be selected by the customer in field 122. A plurality of different reports are shown in drop-down menu fashion, and include Resource Cost 128, Resource Use 130, Energy Cost Index 132, Energy Use Index 134, EUI/ECI Analysis 136, EUI Frequency Overview 138, 24-Month Trend 140, and Production Report 142. By using the drop down menu feature of field 122, a user can select from a variety of different reports which are generated based upon the resource usage information which was previously received into the host system. Each of these reports are discussed below in more detail. It is to be understood that the reports and formats thereof described below are for illustrative purposes only. Accordingly, other reports and formats could be utilized.

Before a discussion of the individual reports mentioned above, a discussion of the format of each report as presented in this document is in order. Most, if not all of the computer screens which can be displayed on a customer's computer are, for purposes of description, broken into segments in this document. This has been done because of spacing concerns. In many of the reports, the customer can navigate through the individual screen by clicking on the up/down symbols which are part of the screen. For the most part, each of the report screens is first represented in a block-type diagram. The separate segments of the screen bear their own Figure designation. Each separate segment is then shown in a subsequent Figure. Such will become evident below.

Resource Cost Report

Referring to FIGS. 13 and 14A–14C, an exemplary screen 144 is shown. Separate segments are designated as FIG. 14A, FIG. 14B, and FIG. 14C. Each segmented portion of FIG. 13 corresponds to a portion of a computer screen which can be viewed and navigated through by a customer. A customer can navigate through the computer screen using conventional up and down arrows.

Figures 13, 14A, 14B, 14C:
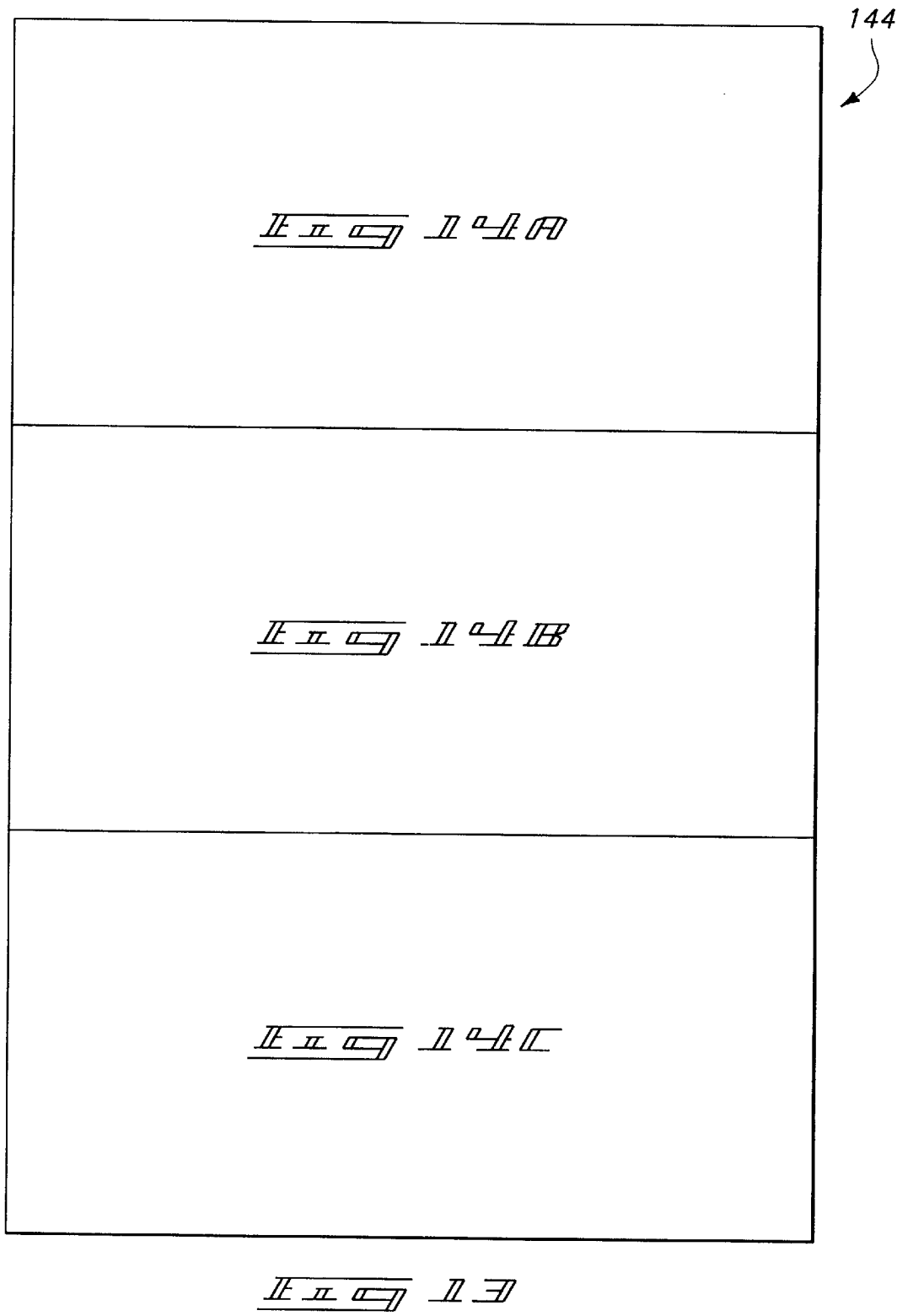
FIG. 13, and 14A–14C are views of one report screen in connection with one aspect of the present invention.

Computer screen 144 constitutes a company-wide, e.g. ACIS Suites, Resource Cost report from the period of Jan. 1, 1997, through Oct. 31, 1997. The Resource Cost report shows summed dollar amounts for the primary service groups such as electricity, gas, water, sewer, solid waste and/or other fuels. Referring more specifically to FIGS. 14A–14C, typical graphical report formats include a pie chart representation (FIG. 14A), a trend or line graph of resource costs (FIG. 14B), and a tabular or chart-based display (FIG. 14C) which gives a tabular allocation comparison between current and past periods with a percentage change therebetween. Collectively, the Resource Cost report provides graphical, user-viewable data which allows a customer or a customer's facility manager to view a cost representation of its company-wide consumption of resources. The illustrated resources include electric power, natural gas, water, and sewer services. Through utilization of comparative analysis, the facility manager can identify variances in consumption costs of one or more particular resources and identify problem areas which might need attention.

Figure 16A:
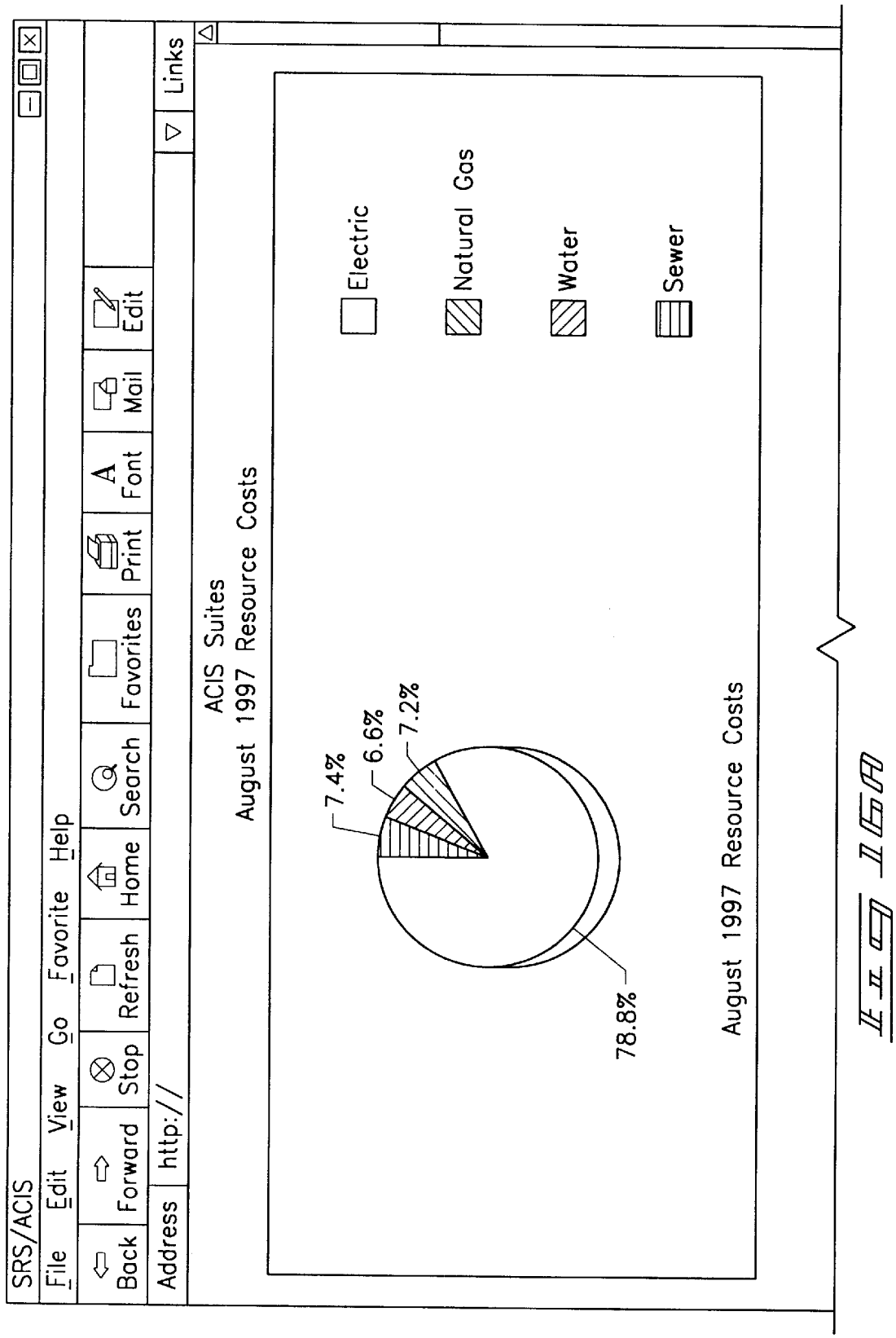
Figure 16B:
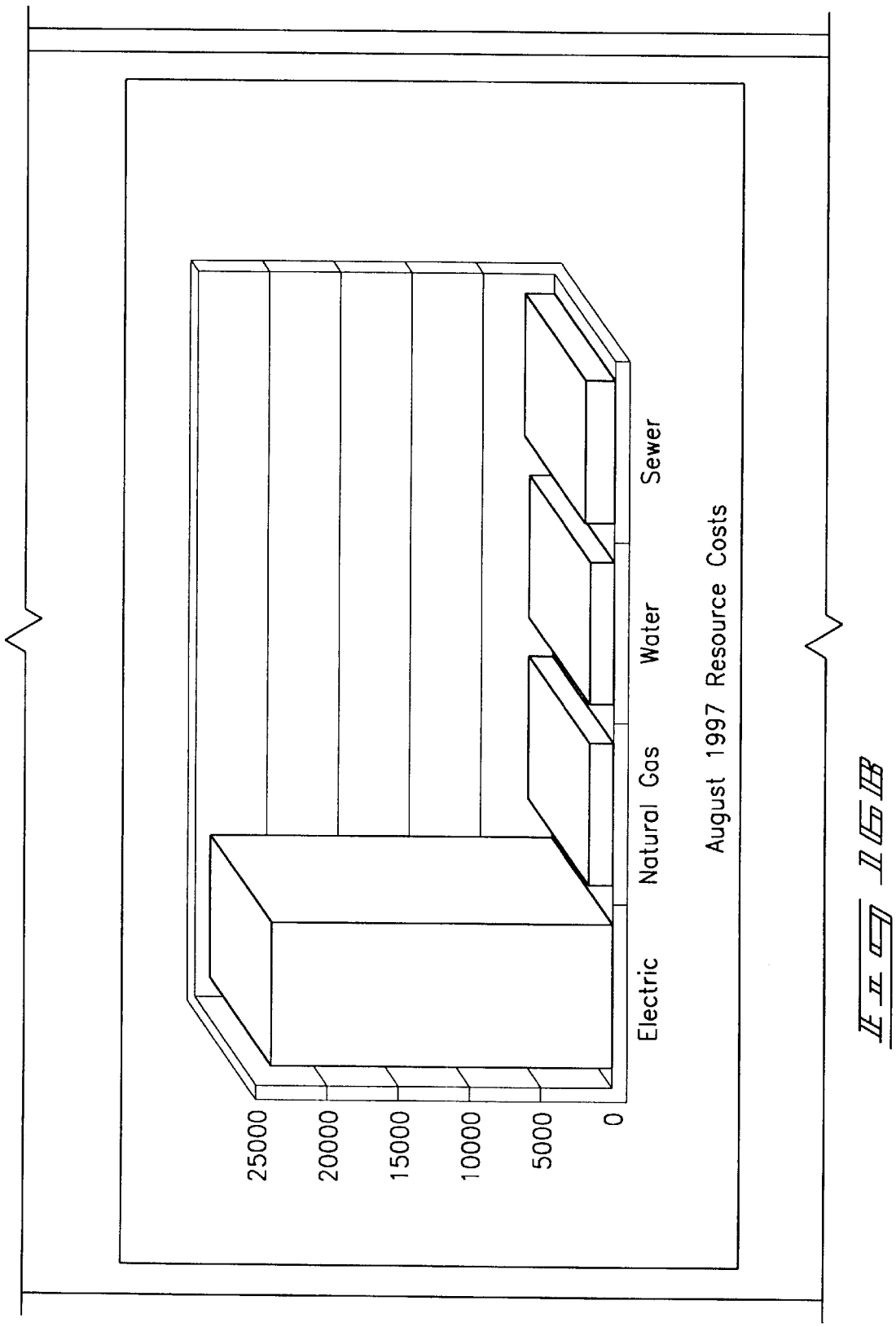
Figure 16E:

Referring to FIGS. 15 and 16A–16C, a screen 146 is shown having component parts designated as FIGS. 16A, FIG. 16B, and FIG. 16C. Screen 146 constitutes a Resource Cost report for a single month which covers company-wide consumption costs of resources. In this report format, and as shown in FIG. 16A, a pie chart representation of resource consumption is shown. FIG. 16B includes a bar graph chart describing the company's consumption costs of resources including electricity, natural gas, water, and sewer. FIG. 16C shows a tabular representation of such resources for the month of August 1997. This report format enables a facilities manager to ascertain, during any given month, whether there are variances in resource costs which could indicate problem areas. It also gives the facilities manager the tools to identify the effects of any conservation measures by being able to observe variances between reporting periods.

Figure 18A:
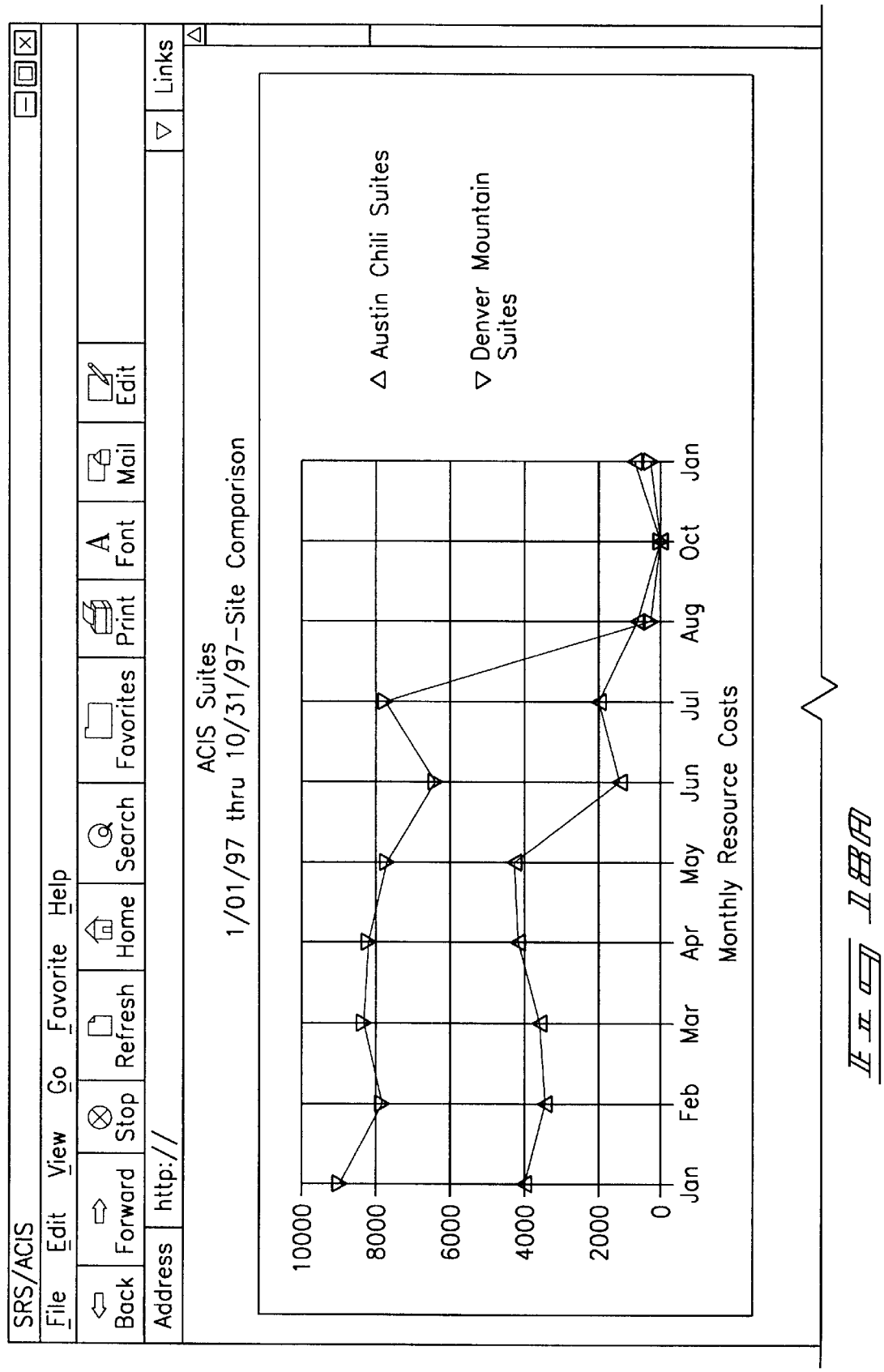

Referring to FIGS. 17 and 18A–18C, a screen 148 is provided and constitutes a report comprising a site-to-site comparison of two ACIS Suites sites, e.g. Austin Chili Suites and Denver Mountain Suites. Referring to FIG. 18A, a site-to-site, cost-based resource report is shown in line-graph form and compares the resource costs of both of the sites from a period of Jan. 1, 1997 through Oct. 31, 1997. Through utilization of this report, a facilities manager can quickly identify cost variances as between separate sites. For example, throughout most of the reporting period, Denver Mountain Suites consumed, cost-wise, more resources than did Austin Chili Suites. However, in August and through the corresponding month of October, the cost somewhat leveled out. This information is, or can be particularly useful to a facilities manager for the purpose of identifying specific reasons as to why a variation in resource cost occurred with the Denver Mountain Suites. Referring to FIG. 18B, a pair of pie charts are shown and describe, respectively, resource costs of Austin Chili Suites and Denver Mountain Suites through the relevant reporting period. The pie chart enables the costs of each of the consumed resources to be separately broken out so that each can be viewed by the customer of facilities manager. Referring to FIG. 18C, a tabular report is provided and individually describes resource costs from the prior reporting period, the current reporting period, as well as giving a percentage change therebetween. This specific information can enable the customer to identify any individual increases or decreases as between individual resource costs during a particular reporting period. It also enables a comparison to be made between separate sites. For example, Austin Chili Suites' sewer consumption costs for the current and prior reporting periods increased around 2,540%. This might be indicative of a problem which needs attention. Particularly in view of the fact that Denver Mountain Suites' sewer consumption costs decreased by around 108%. By knowing of this increase, a customer could then take remedial action to learn more about why such an increase occurred. The same would hold true for dramatic decreases in either one or more of the resources.

Resource Use Report

Figure 20A:
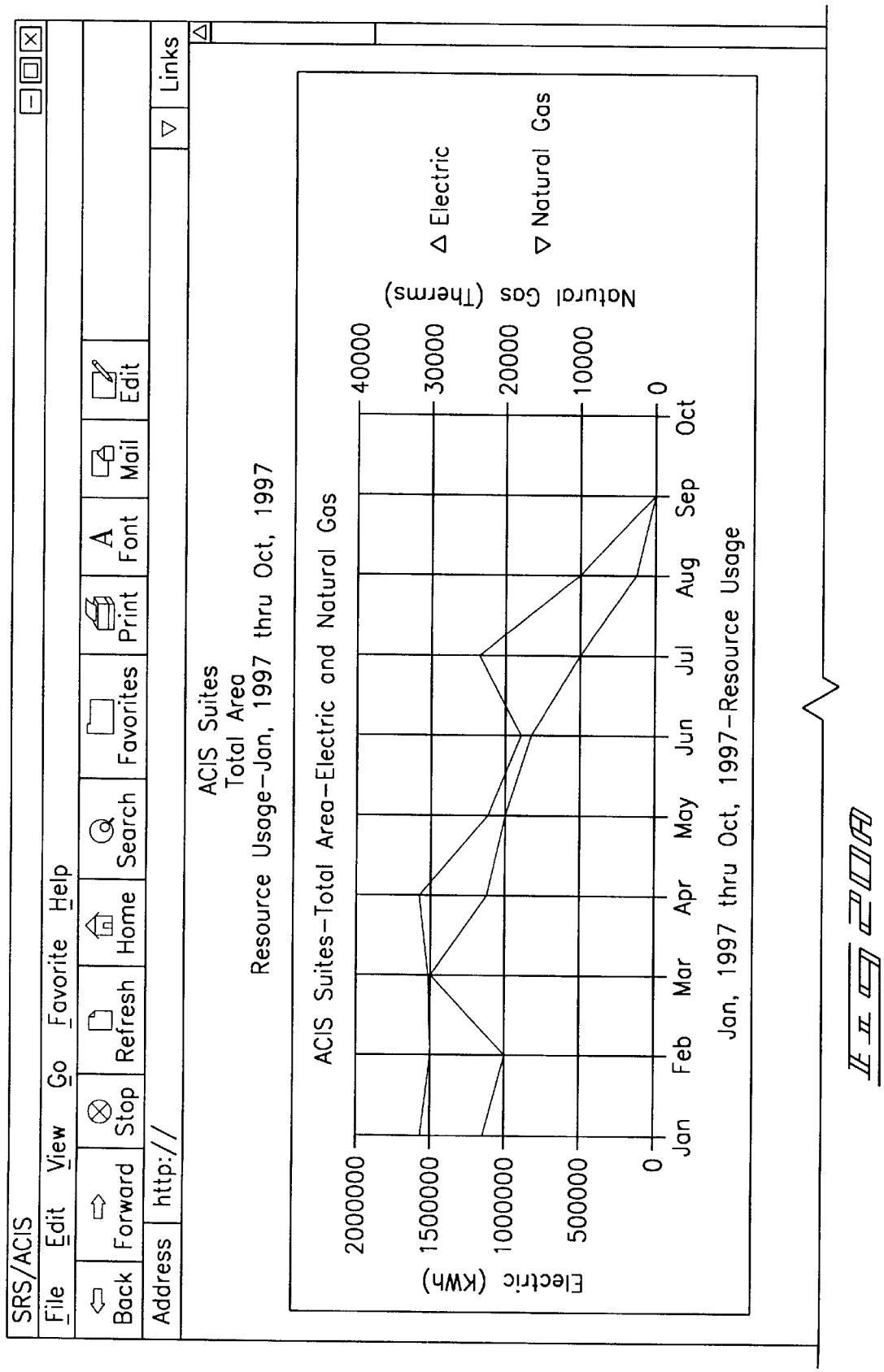
Figure 20B:
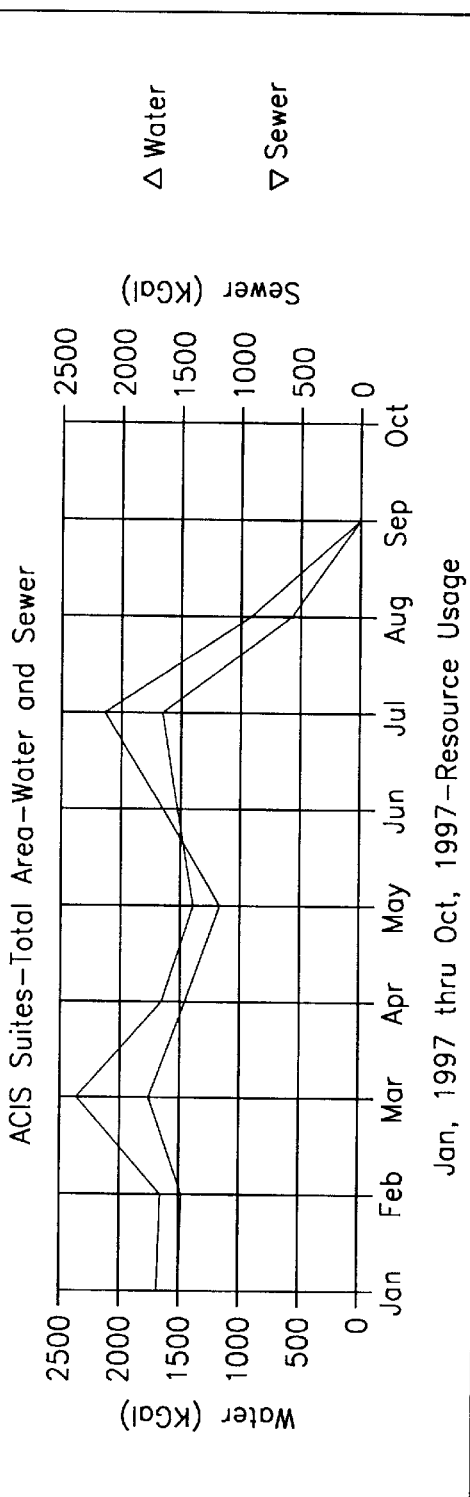

Referring to FIGS. 19 and 20A–20B, a screen 150 is provided and is divided into two segments, FIG. 20A and FIG. 20B. Screen 150 constitutes a resource usage report which is selectable by a customer and shows consumption (quantity) amounts for electricity, natural gas, water and sewer. Usage amounts are converted to a common unit of measurement. Gas and other fuels are reported in therms. Water and sewer are reported in thousands of gallons. Typical presentation formats include trending or line graphs of resource use over time, and tabular information comparing current reporting periods to prior reporting periods with an indication of any percentage change therebetween. Specifically, and with reference to FIGS. 20A and 20B, a company-wide resource usage report for electric and natural gas (FIG. 20A), and water and sewer (FIG. 20B) is shown. The date range for the report can be selected for any month or series of months. In the illustrated example, a date range from January 1997 through October 1997 has been selected. The line graph representations of resource usage can provide a customer with an understanding of its particular use of a particular resource through the relevant reporting period. By having the individual resources separated out and graphically displayed, the customer is able to identify any trends and/or variances of interest. The tabular information presented in FIG. 20B describes current and prior reporting period usages, together with any percentage changes therebetween.

Figures 21, 22A, 22B:
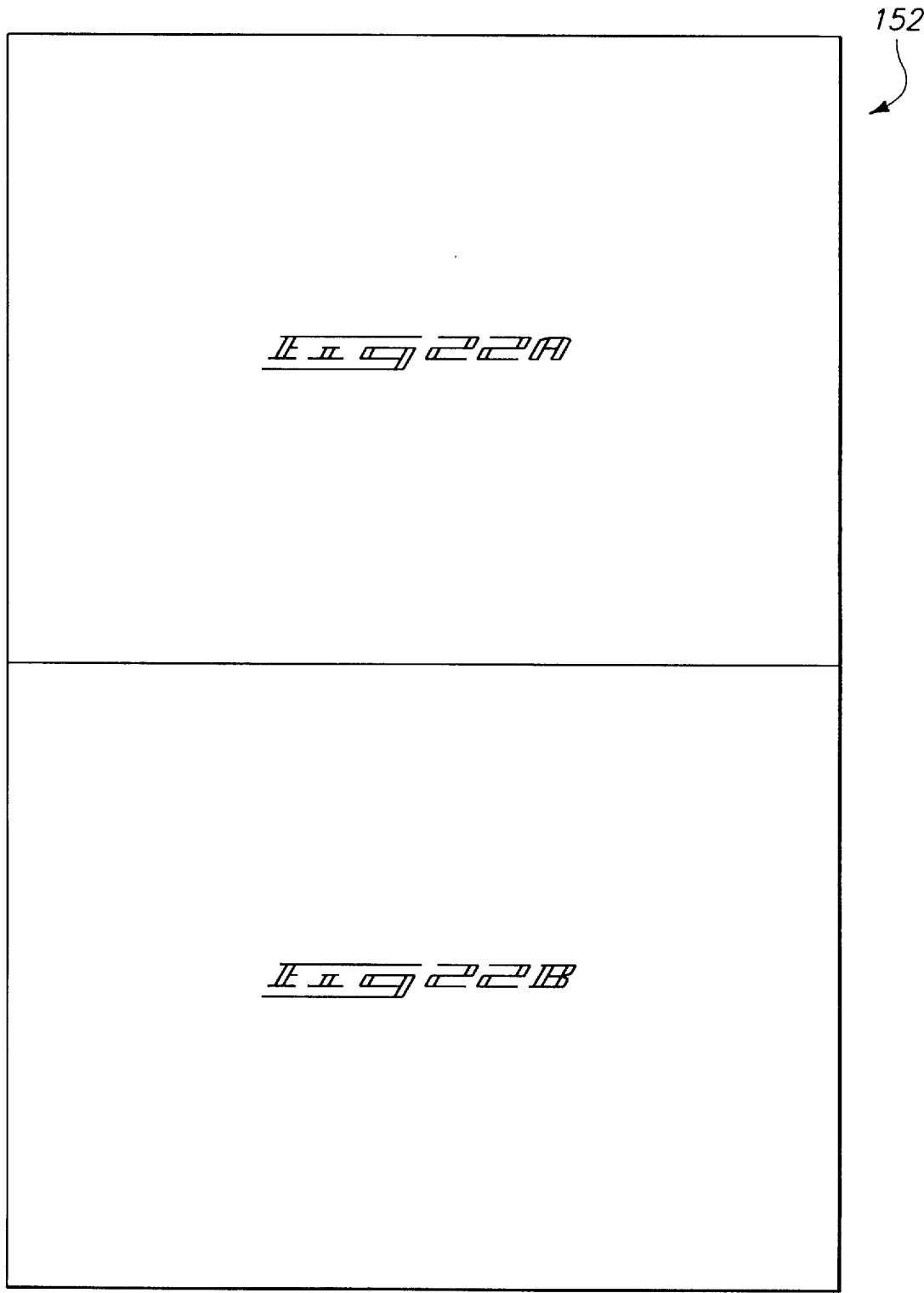
FIGS. 21, 22A–22B are views of one report screen in connection with one aspect of the present invention.

Referring to FIGS. 21 and 22A–22B, a screen 152 is provided and constitutes a company-wide, resource usage report for a single month. FIGS. 22A and 22B comprise separate portions of screen 152 and show a bar graph representation of total usage for the month (FIG. 22A), and a tabular accounting of usage (FIG. 22B).

Referring to FIG. 23 and 24A–24D, a screen 154 is provided and is divided into four segments. Such screen constitutes a resource usage report which permits a site comparison between an area average and a particular individual site of the customer. In particular, FIG. 24A shows for the ACIS Suites in a particular area, the average electric and natural gas usage. FIG. 24B shows the ACIS Suites area average water and sewer usage (uppermost graph), and, for the Sacramento Vineyard Suites, the electric and gas usage (lowermost graph). FIG. 24C shows, for the Sacramento Vineyard Suites, specific water and sewer usage; and FIG. 24D describes in tabular form, current and prior reporting period usages as between the area average and Sacramento Suites. Additionally, relevant variances are given as well. The relevant reporting period is from January 1997 to October 1997. By comparing each of the area averages for the resources with the particular site (Sacramento Vineyard Suites), the customer can ascertain whether usage at a particular site is above or below the area average. Usages above average would, in some instances, indicate that there may be a problem. Usages below the area average may, in some instances, indicate the effectiveness with which utility resource usage takes place.

Energy Cost Index Report

Figures 25, 26A, 26B:
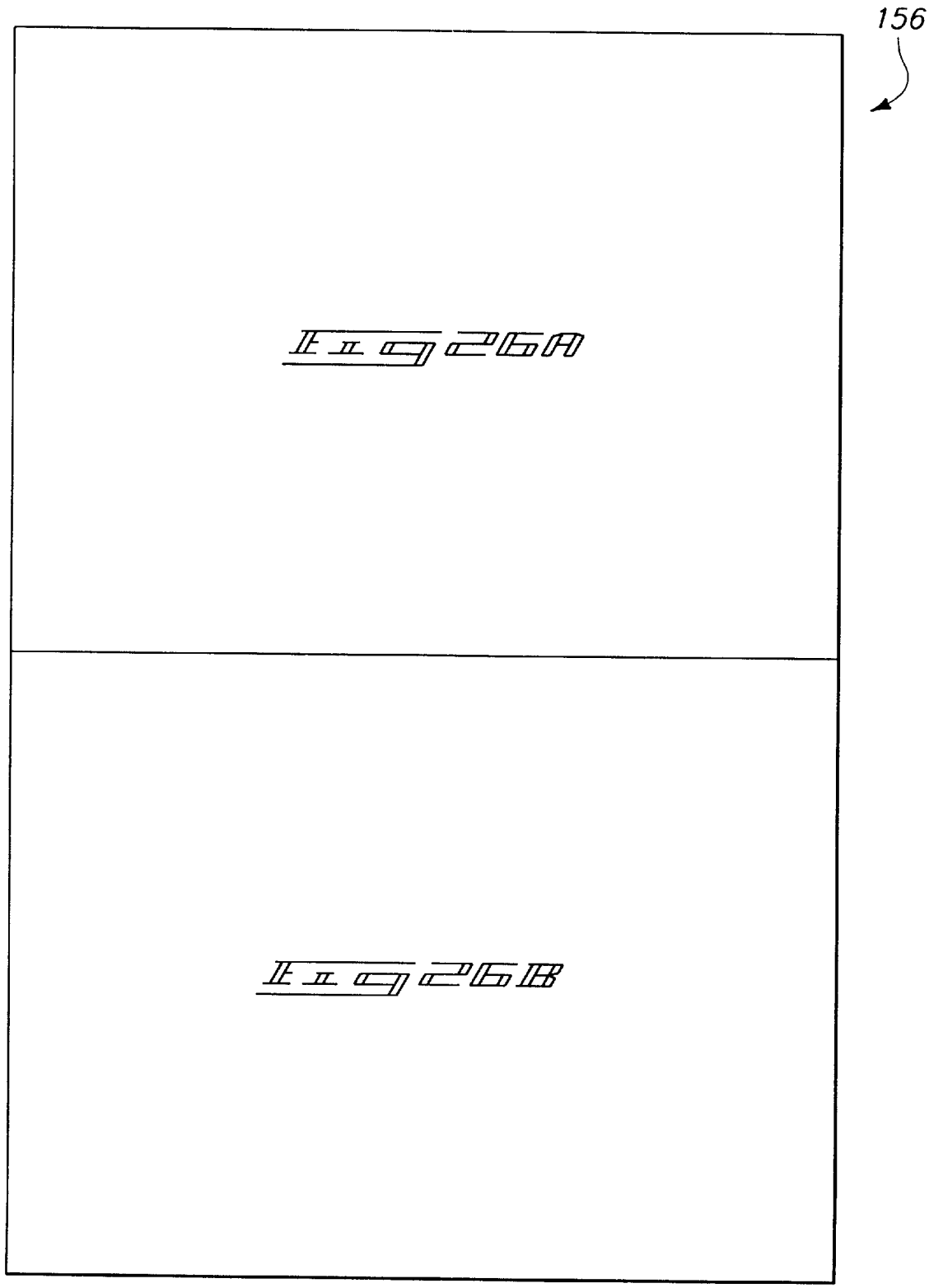
FIGS. 25, 26A–26B are views of one report screen in connection with one aspect of the present invention.
Figure 26A:
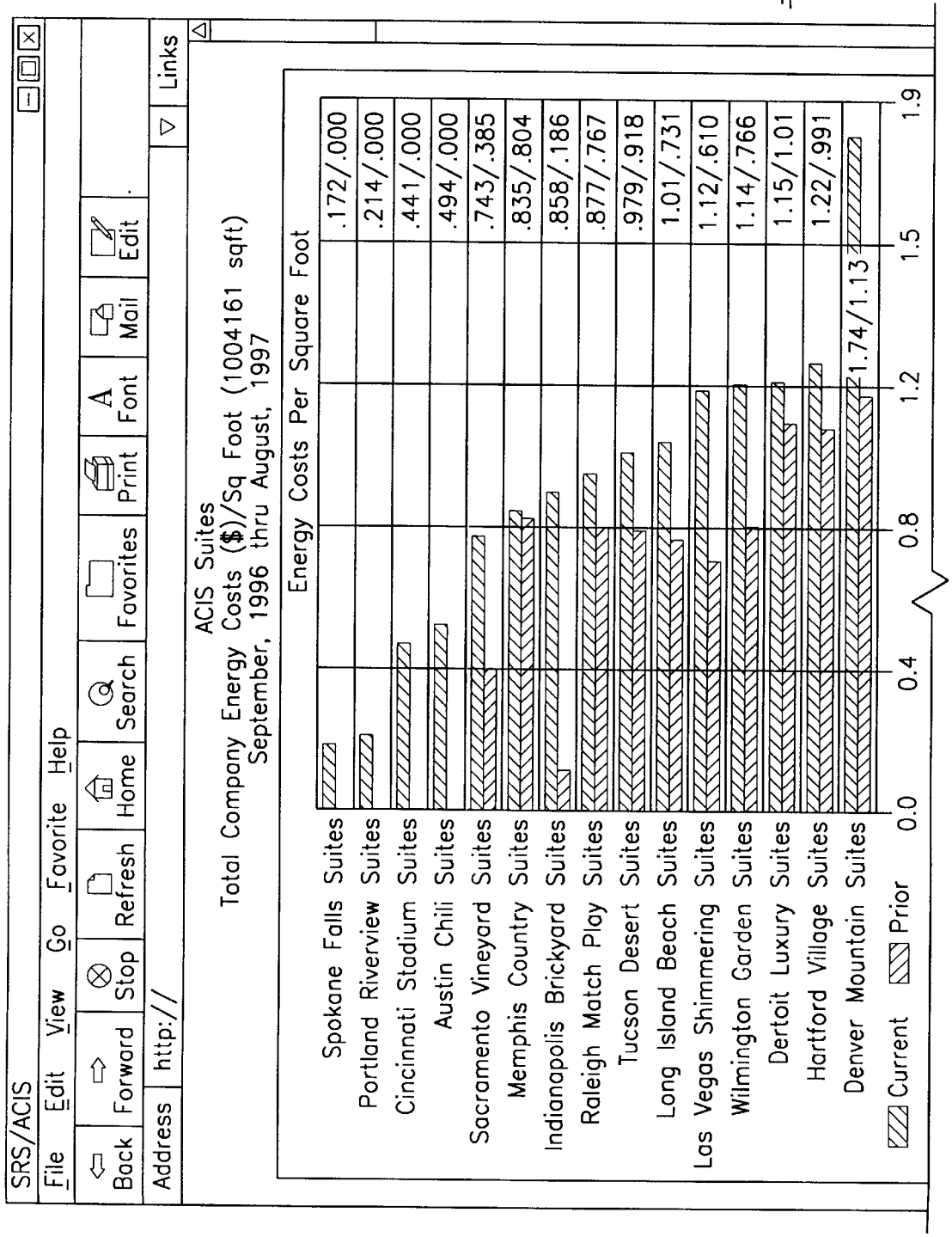

Referring to FIGS. 25 and 26A–26B, a screen 156 is provided and constitutes an Energy Cost Index (ECI) Report. The ECI Report comprises the total energy cost of all fuels used during a 12-month period divided by the total gross conditioned floor area in square feet. The units of ECI are dollars per square foot per year. Typical presentation formats of such computer-viewable data include ECI rankings for total company listing for each location, top 10/bottom 10 location ranking, company average and site-to-site comparisons.

Specifically, reference to FIG. 26A shows a plurality of sites with each site's ECI shown in bar graph fashion for current and prior reporting periods. In the illustrated example, the reporting period is from September 1996 through August 1997. A customer can, through review of the particular graphical representation in FIG. 26A, ascertain whether desirable or undesirable increases and/or decreases have taken place in each site's ECI during the relevant reporting. Referring to FIG. 26B, such information is presented in tabular form for the current and prior periods, along with any relevant percentage change therebetween.

Referring to FIGS. 27 and 28A–28B, a screen 158 is provided and constitutes an ECI report for an individual site, e.g. Tucson Desert Suites, for the reporting period September 1996 through August 1997. Referring to FIG. 28A, a bar graph representation of this particular site's energy cost per square foot is shown on a month-by-month basis for the prior and current reporting periods. Referring to FIG. 28B, a tabular detailing of the energy costs per square foot of this particular site is given for the prior and current reporting periods, as well as a percentage change therebetween.

Figure 30E:
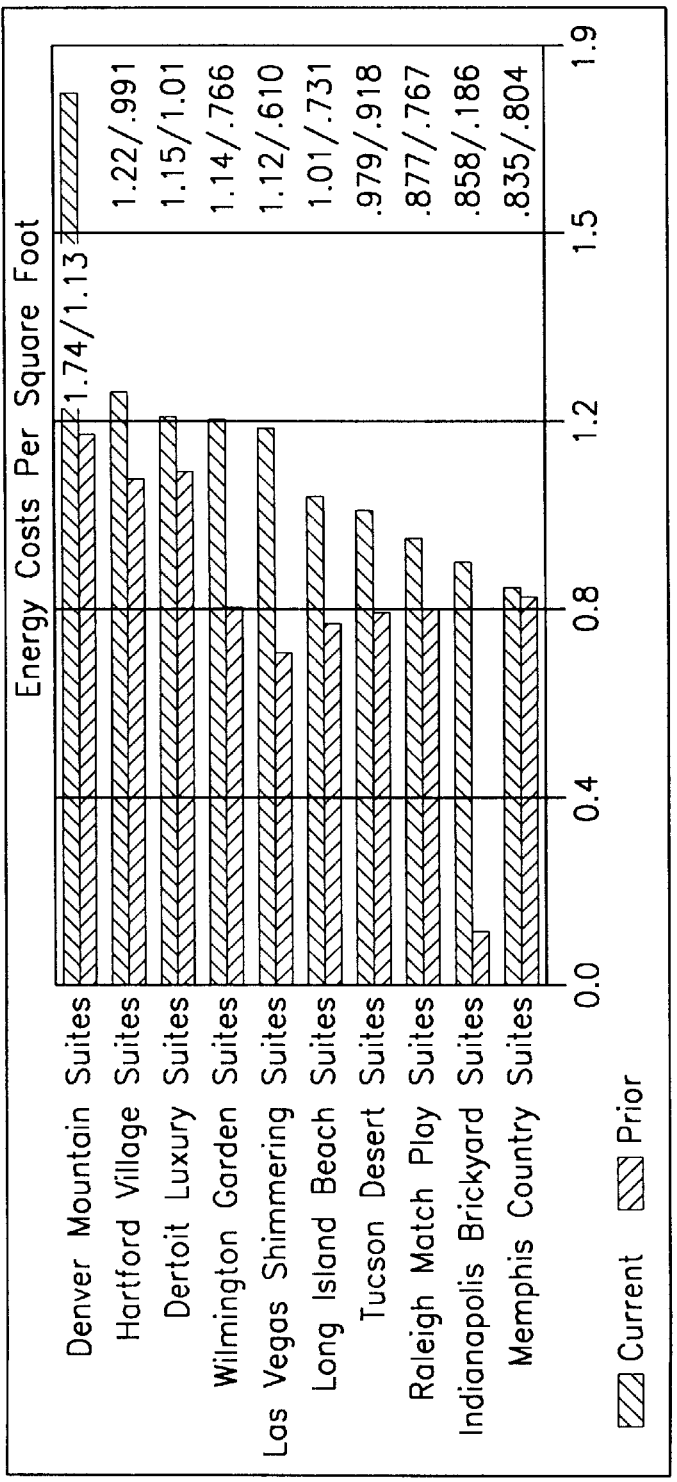

Referring to FIGS. 29 and 30A–30D, a screen 160 is provided and constitutes a ECI report for the top 10 and bottom 10 ACIS Suites sites. For example, and with reference to FIG. 30A, the top 10 sites with the lowest energy cost per square foot are shown. Similarly, FIG. 30B shows the bottom 10 sites with the highest energy cost per square foot. Through utilization of this report, the customer can identify sites having desirable or undesirable energy costs for the purpose of ascertaining, among other things, why such costs are low or high respectively. Such facilitates decision making on the part of the facilities manager. Referring to FIGS. 30C and 30D, the top 10 and bottom 10 sites respectively, are shown in tabular graphical form. The illustrated chart shows the square footage for each facility or site along with current and prior ECI indices. In addition, a percentage change is provided to enable the customer to ascertain desirable or undesirable variances in the ECI.

Energy Use Index Report

Figure 31:
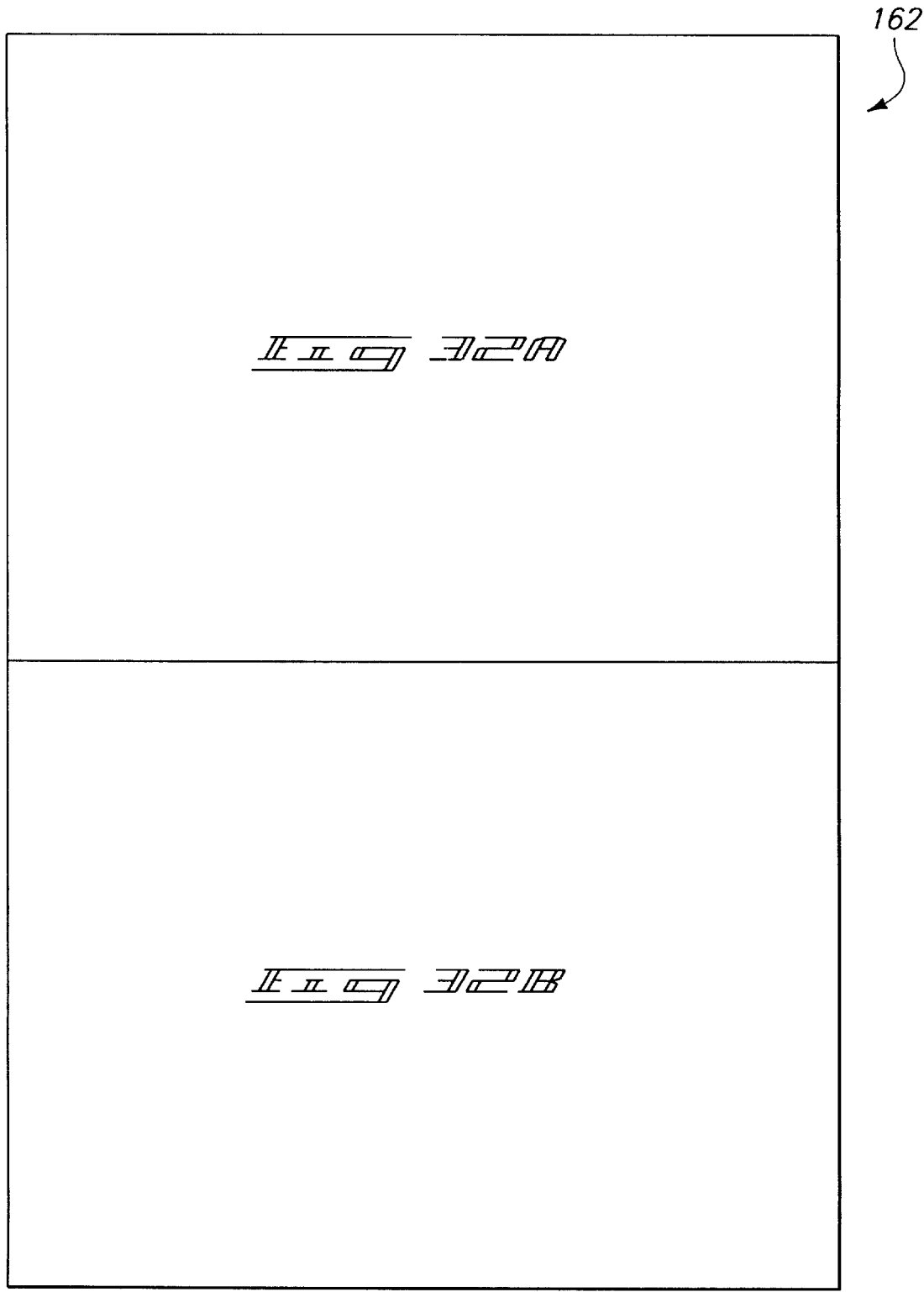
Figure 32A:
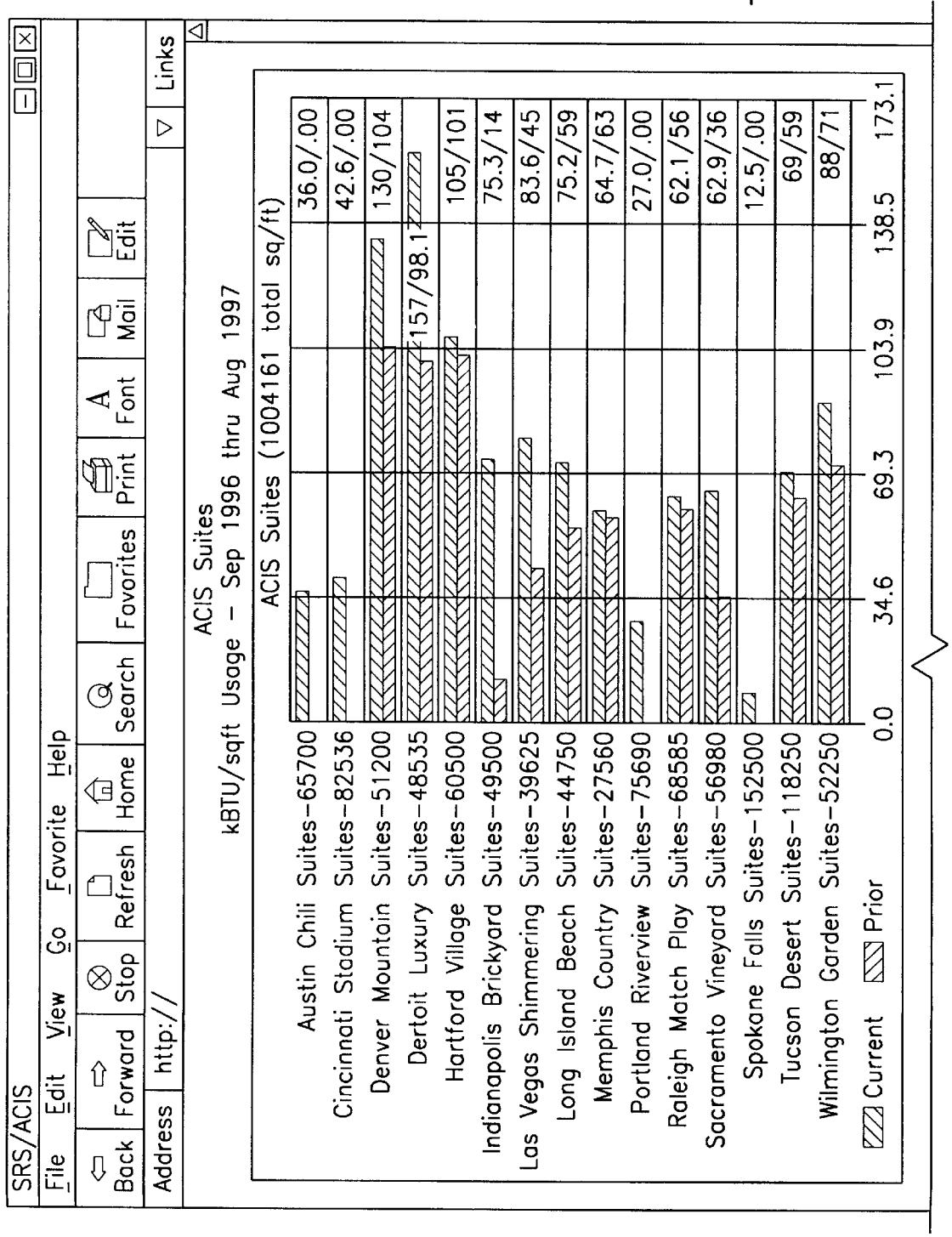

Referring to FIGS. 31 and 32A–32B, a screen 162 is provided and constitutes an Energy Use Index (EUI) Report which can be selected by the customer. The EUI is a convenient measure of energy use. In particular, consumption of each fuel type is converted into BTU's, a common unit of energy. The total energy use of a building, in BTU's, is divided by the total gross conditioned floor area, yielding the EUI in kBTU's per square foot per year (1,000 BTU/sf/year). Because the EUI presents energy use per square foot of building area, it can be used to compare energy use in buildings of various sizes. Although the EUI is a useful tool, it should be used with an understanding of how climate, activity, and fuel types can influence the EUI value. Typical presentation formats include EUI rankings for the total company listing each location, top 10/bottom 10 location ranking, company average and site-to-site comparisons. In particular, reference to FIG. 32A shows an EUI report for the total company in bar graph form. Both current and prior reporting periods are shown. FIG. 32B shows a tabular report in which the square footage, current and prior EUI values, and percentage change are shown for each site.

Figures 33, 34A, 34B:
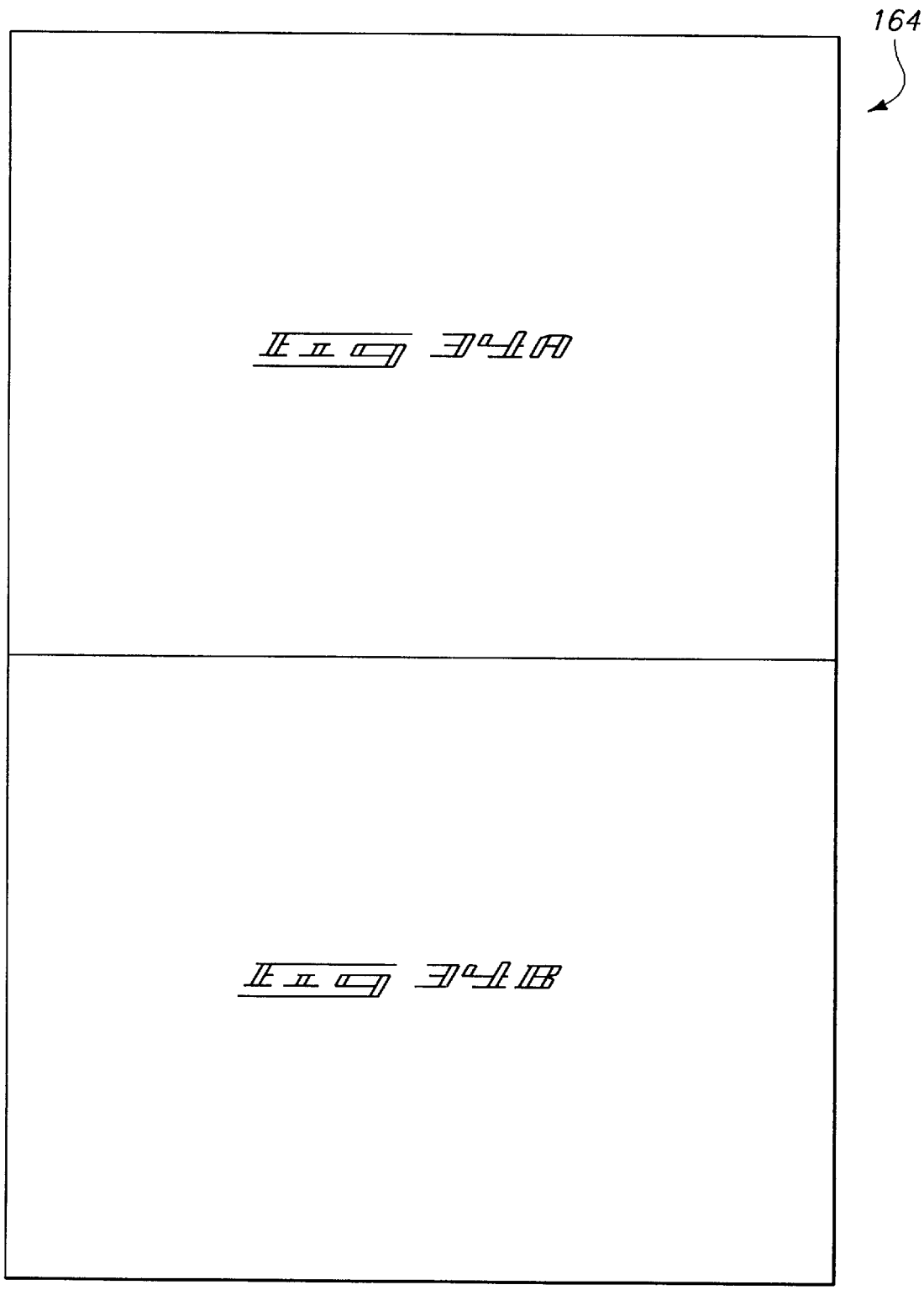
FIGS. 33, 34A–34B are views of one report screen in connection with one aspect of the present invention.

Referring to FIGS. 33 and 34A–34B, a screen 164 is provided and constitutes a EUI report comprising an average of all sites for each month of the reporting period. In particular, and with reference to FIG. 34A, a bar graph presentation of the average of all sites is indicated for each reporting month. FIG. 34B shows in tabular form, EUI values for the current and prior reporting periods along with percentage changes therebetween.

Figures 35, 36A, 36B, 36C, 36D:
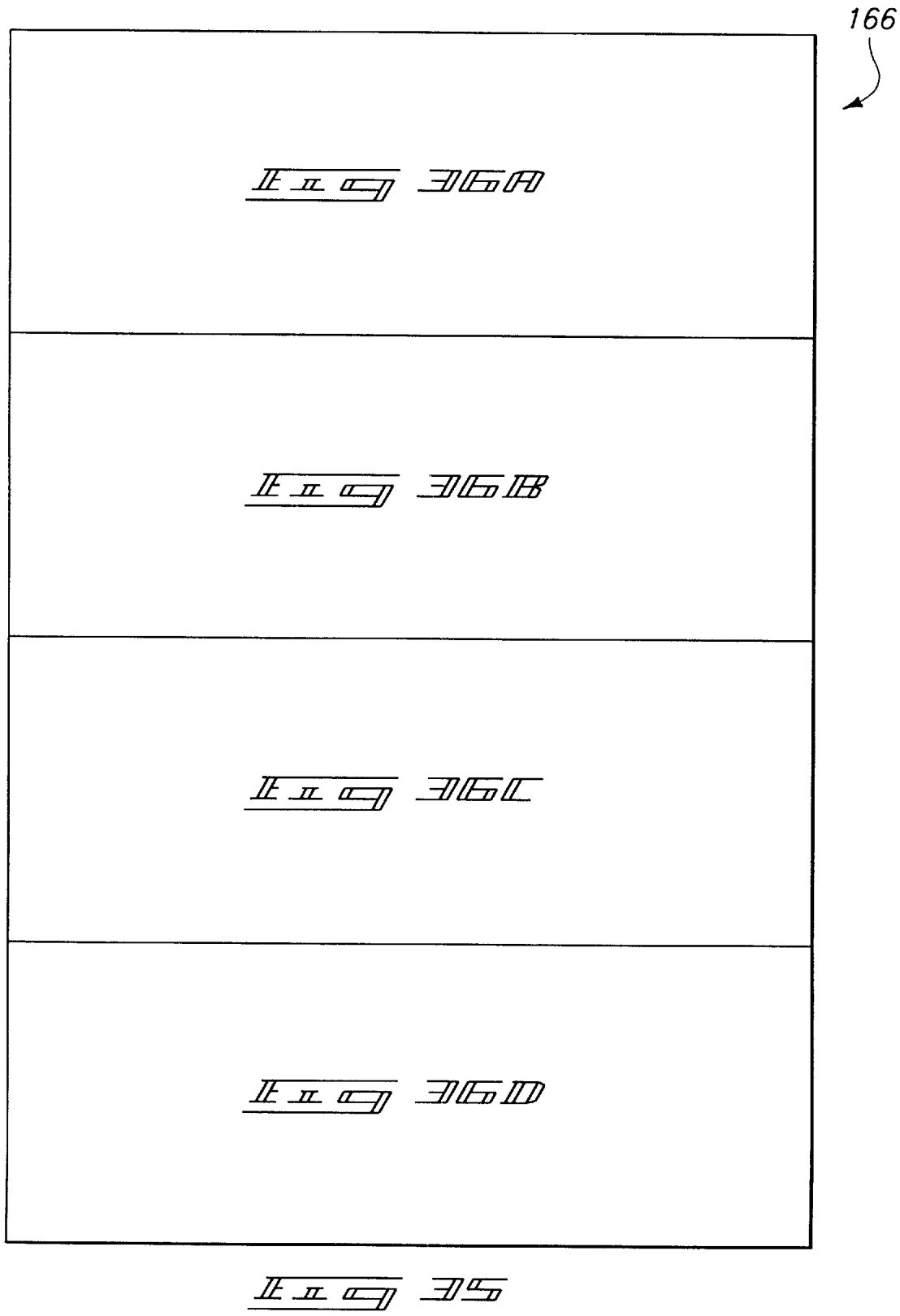
FIGS. 35, 36A–36D are views of one report screen in connection with one aspect of the present invention.
Figure 36A:
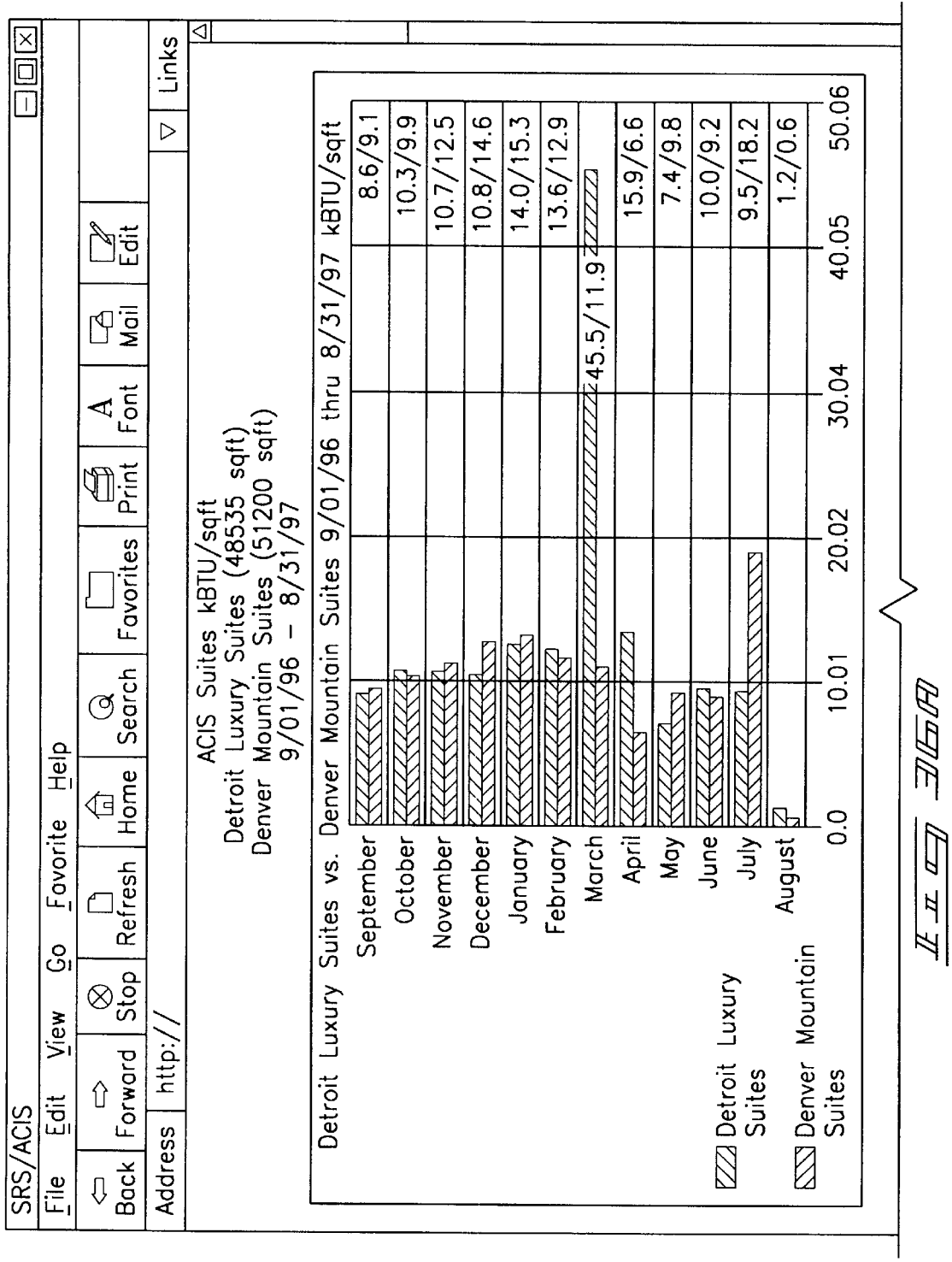
Figure 36B:
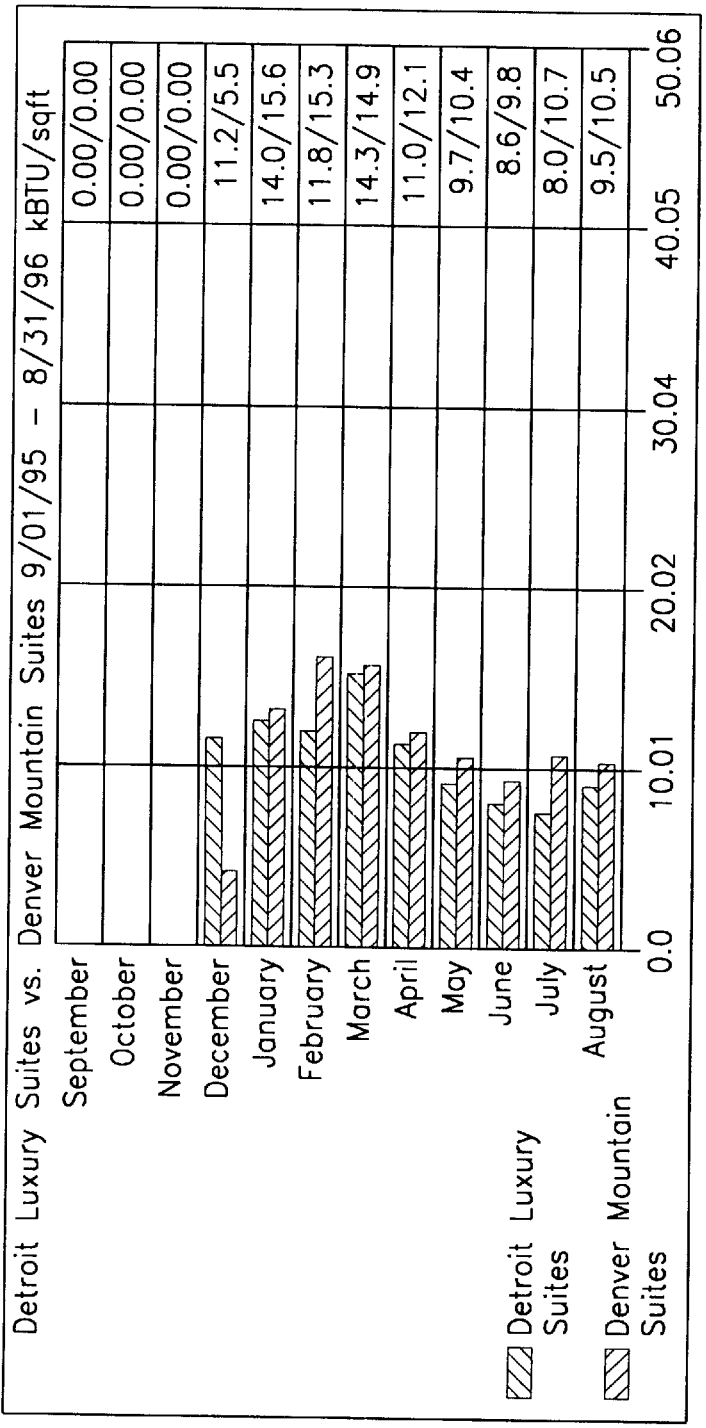
Figure 36D:

Referring to FIG. 35 and 36A–36D, a screen 166 is presented and constitutes a EUI report which enables a site-to-site comparison to be made between two particular sites. FIG. 36A shows a site-to-site comparison between two sites, the Detroit Luxury Suites and the Denver Mountain Suites. FIGS. 36A–36B show a month-to-month, bar-graph type comparison of each site's EUI value. FIGS. 36C–36D respectively describe, in tabular form, the EUI values for each site, i.e., the Detroit Luxury Suites (FIG. 36C) and the Denver Mountain Suites (FIG. 36D). In addition, this report enables the percentage change between reporting periods to be ascertained between the current and prior reporting periods.

Provision can also be made for a report which will present a rolling EUI average for a prior time period, e.g. the prior 12-month period. Reports of this type can identify gradual changes in the EUI by establishing a 12-month EUI ending on a given month, and then comparing that with the 12-month EUI ending on the prior month, and previous prior months. By testing against a customer-defined tolerance parameter, a customer can detect a trending change in resource usage which can be used to identify operational issues in a facility or site which impact resource cost.

EUI/ECI Analysis

Referring to FIG. 37 and 38A–38B, a screen 168 is provided and constitutes a graphical representation of energy and cost performance in the form of a scatter plot graph. Such allows both the energy use index (EUI) and energy cost index (ECI) to be portrayed in a single graph. Importantly, such conveys both the energy use and cost performance characteristics of facilities or sites since the various fuel types vary in terms of conversion efficiency and cost. Although energy efficiency is an important issue for energy managers, it is cost efficiency that is, in most instances, the real issue. This scatter plot portrays both the EUI and the ECI and allows an energy manager to review the performance of all sites. Best and worst performers are easily identified through a matrix analysis. For sites with a high ECI and low EUI, focus on commodity management/ rate schedule analysis (utility negotiations) can be had. For sites with a low ECI, and a high EUI, an investigation and implementation strategy for energy efficiency measures (demand side management) can be had. A so-called drill down capability provides detailed information about the particular site. FIG. 38A shows a scatter graph wherein ECI and EUI are presented in graphical form. Such graphical representation constitutes a matrix by which the customer and/or facility manager can identify relevant sites which are, or fall within pertinent parts of the graph, e.g., high ECI, low EUI, and/or low ECI, high EUI. FIG. 38B shows in tabular form, information presented in FIG. 38A for each site.

EUI Frequency Overview Report

Figure 40A:
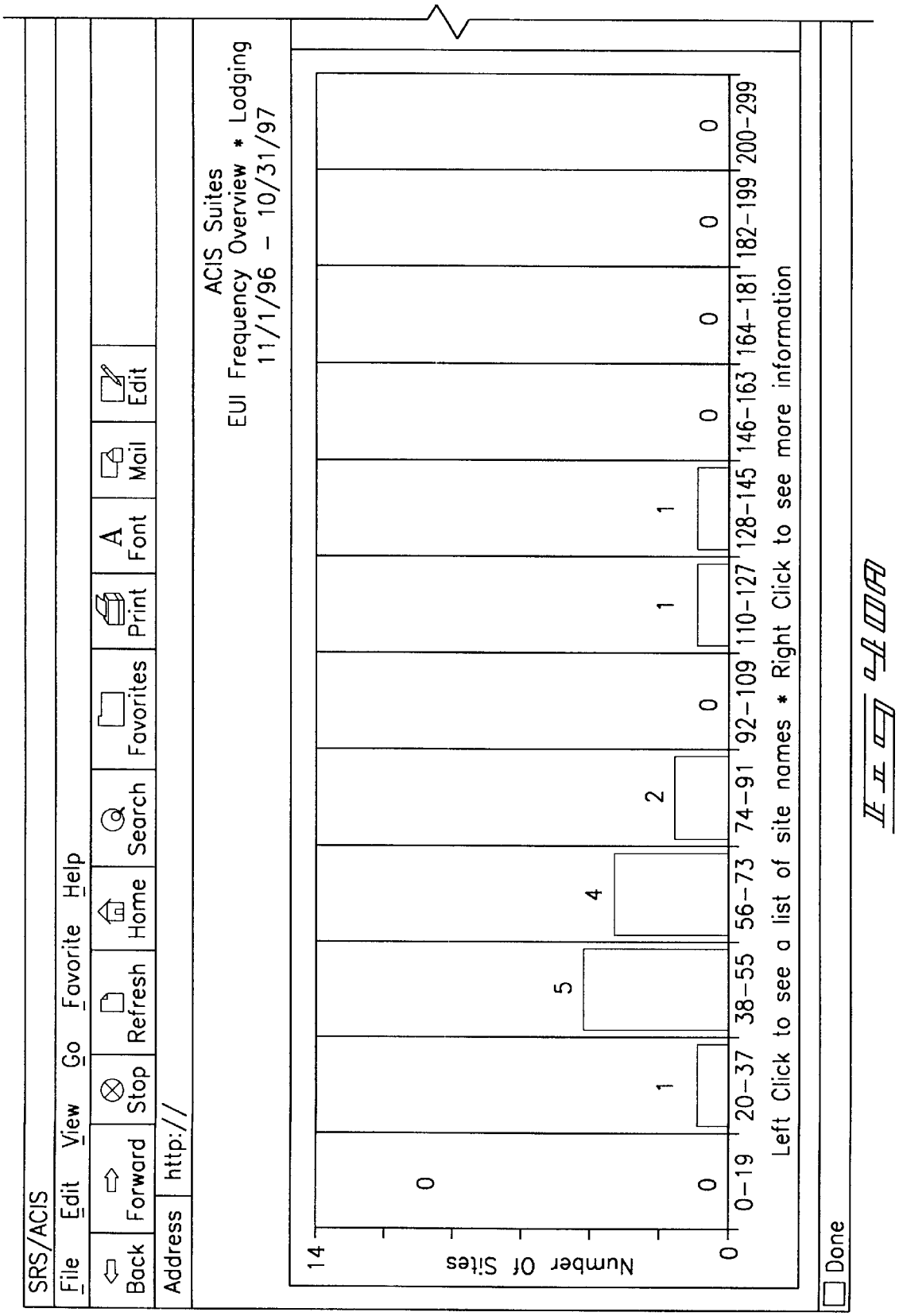

Referring to FIGS. 39 and 40A–40B, a screen 170 is provided and constitutes a EUI Frequency overview report. The EUI Frequency overview is a report which uses a frequency distribution graph of site energy use indices (EUIs). Through this report, a site can be designated to be included in the report by selecting geographic area and/or climate zone and activity type from the report option. The EUI frequency overview graph assigns sites to the appropriate EUI ranges and shows how many sites fall within a given range. Provided is a so-called drill down option to compare individual site EUIs to similar building types in a similar climate zone based on the 1992 United States Department of Energy Commercial Building database used to develop the DOE publication DOE/EIA-0318(92). Only sites that have been assigned specific climate zones from within the site setup will show up in their respective regions.

For example, reference to FIG. 40A shows that an EUI frequency overview report for lodging facilities is set forth. Sites which fall in between particular ranges can be specifically viewed by clicking on the relevant graph portion. In particular, FIG. 40B shows that five sites fall within EUI ranges of between 38–55. These sites include the Austin Chili Suites, Cincinnati Stadium Suites, Memphis Country Suites, Raleigh Match Place Suites, and Sacramento Vineyard Suites. The above comprises but one predefined grouping variable which can be utilized to group sites. Other grouping variables can be used as well.

Figures 41, 42A, 42B:
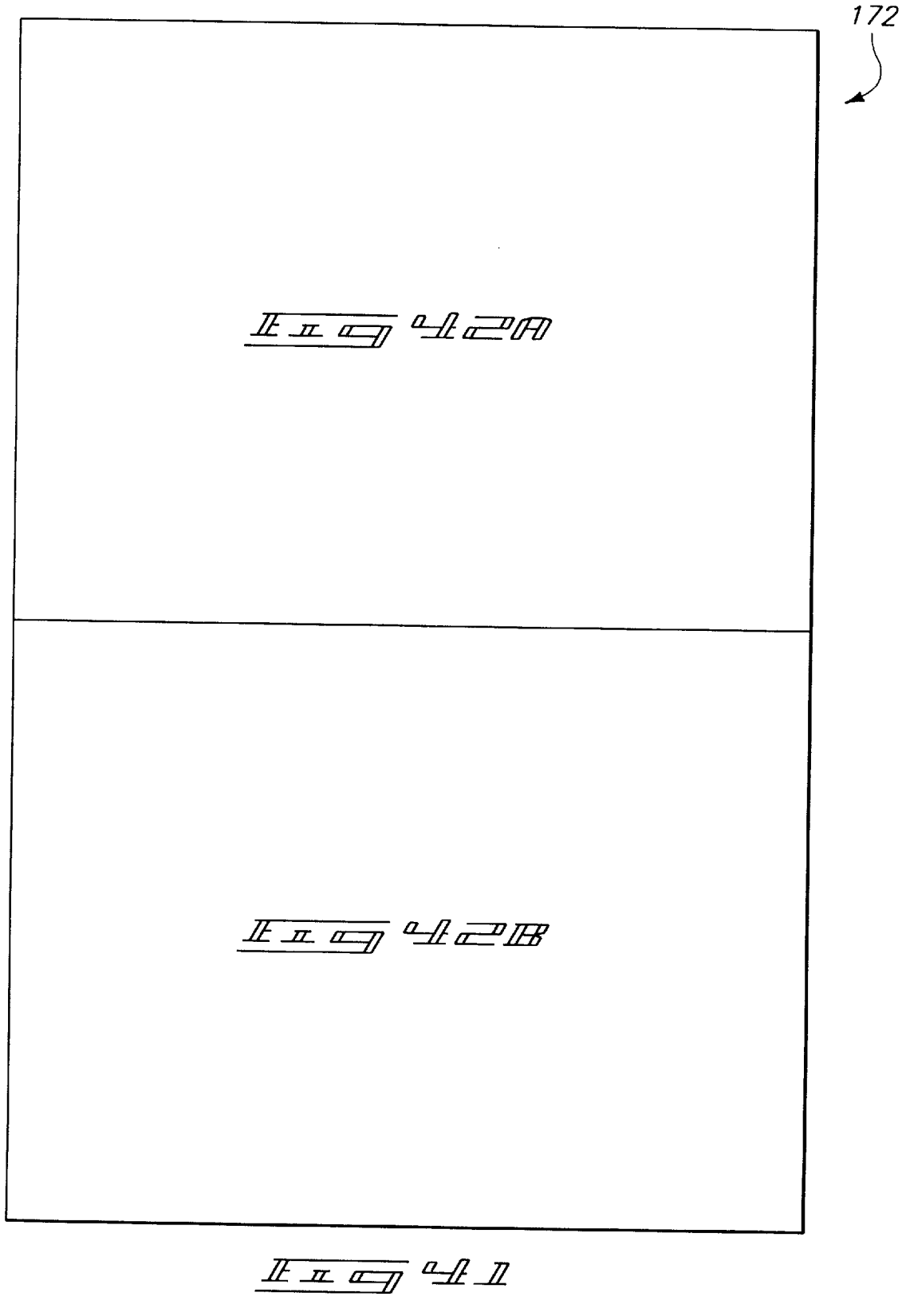
FIGS. 41, 42A–42B are views of one report screen in connection with one aspect of the present invention.

Referring to FIGS. 41 and 42A–42B, a screen 172 is provided and constitutes an energy performance site detail report. Prior to FIGS. 42A and 42B, the Energy Performance Site Detail report ranks locations by their energy index number according to their assigned climate zones. There are a total of five different climate zones in the United States, as mentioned above. Customer sites are preferably assigned a climate zone as part of the database set-up process. FIGS. 42A and 42B show five climate zones, e.g., zone 1–5, and within each zone a national average and a zone company average. Sites within a zone can be benchmarked against a national zone average for a particular building type. Individual sites within a zone can also be compared against the zone company average. In addition, the customer can view the ranking for each location within a zone. The report is broken into four quadrants which show, typically, the low-to-high index number for a particular zone, for a particular building activity. In the illustrated example, the EUI numbers are for the lodging industry. EUI numbers for other industries such as the food service industry would have different EUI rankings. The ranking of energy index numbers by climate zones allows customers to identify their high use facilities adjusting for weather conditions.

24-Month Trend Report

Figures 43, 44A, 44B:
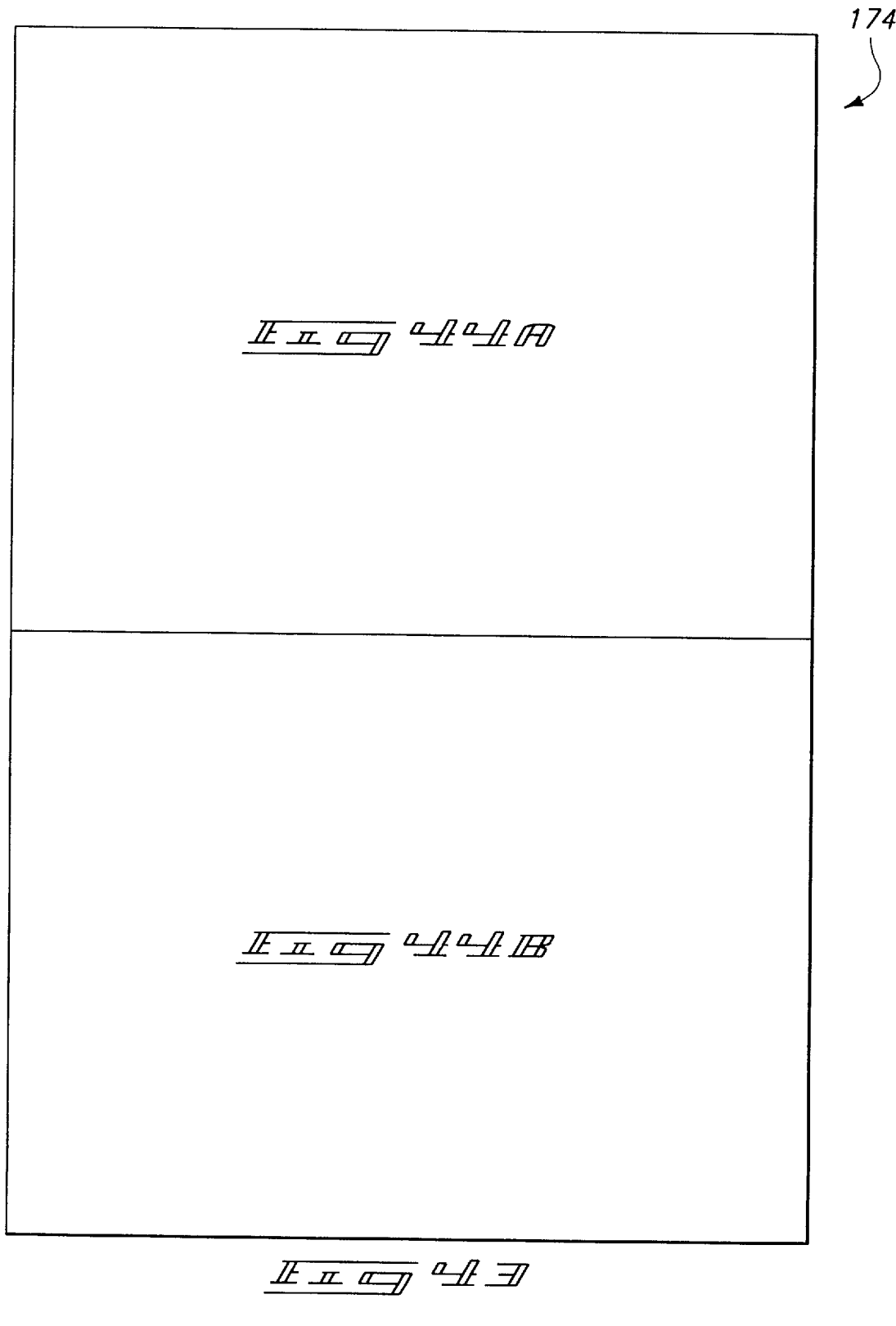
FIGS. 43, 44A–44B are views of one report screen in connection with one aspect of the present invention.

Referring to FIGS. 43 and 44A–44B, a screen 174 is provided and constitutes a report which allows a 24-month comparison of resource costs and/or resource consumption for a specific site. In the illustrated example, less than a 24-month timeline is shown because of spacing constraints. The 24-month comparison (or illustrated portion thereof) is demonstrated in the context of electric cost and consumption. Reference to FIG. 44A shows a comparison of the electric cost for the Indianapolis Brickyard Suites site. Such report is useful for the purpose of identifying particular months in which resource costs are high. FIG. 44B shows a comparison of electric consumption of the Indianapolis Brickyard Suite in kilowatt hours. Other timeline trend reports can be used.

Production Unit Report

Figures 45, 46A, 46B:
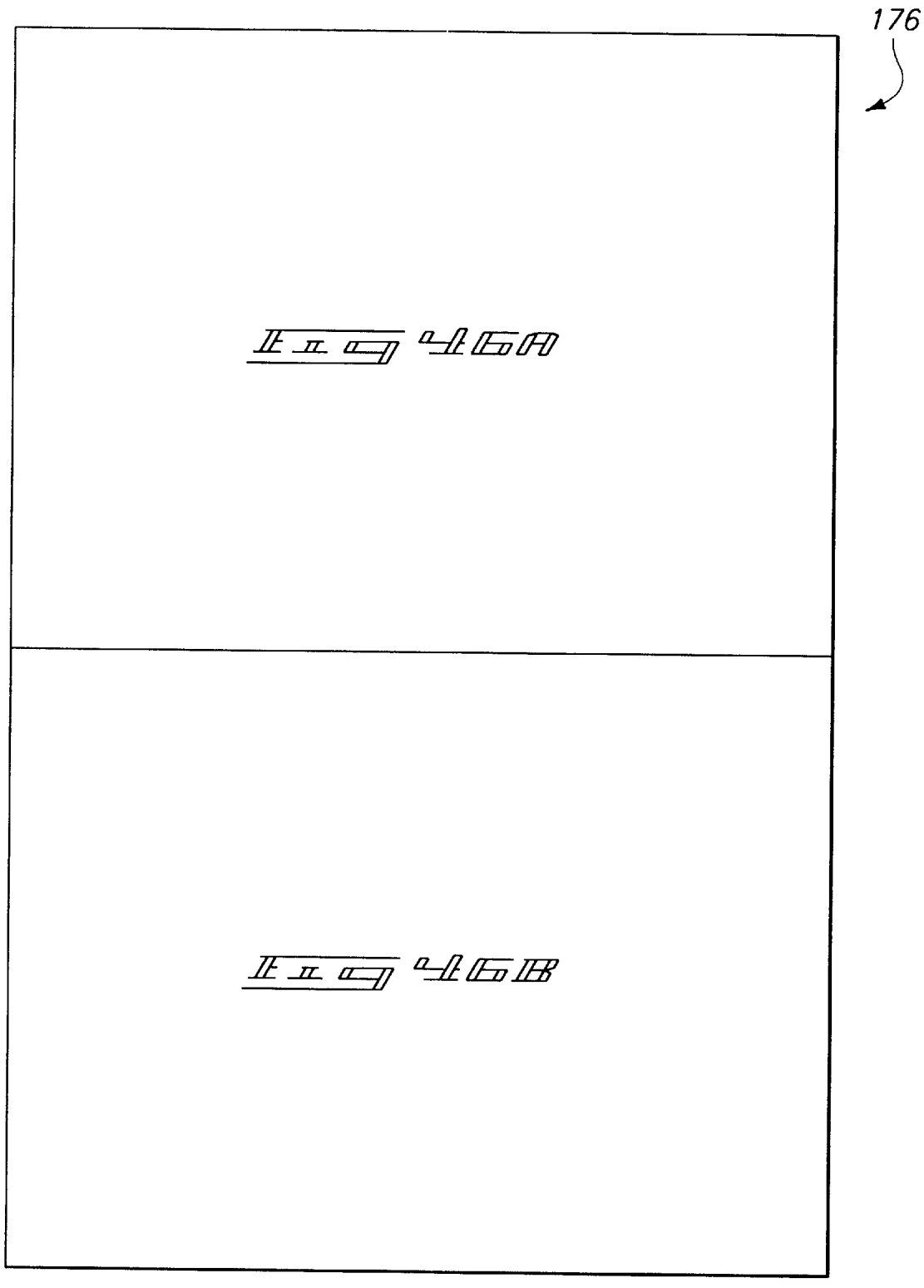
FIGS. 45, 46A–46B are views of one report screen in connection with one aspect of the present invention.

Referring to FIGS. 45 and 46A–46B, a screen 176 is provided and constitutes a Production Unit Report. The Production Unit Report allows energy managers to track all resource costs against fixed production units. This report ranks year-to-date fixed daily production unit costs for each facility or site. The report can be, and preferably is color coded to show sites with 10% reduction or better, 5–9% reduction, 1–4% reduction, and zero or less reduction. Production unit tracking is desirable when there is a direct correlation between production and resource costs. Only sites that have been assigned fixed production units from within the above-described site setup feature will show up on the production report. Specifically, and with reference to FIG. 46A, each site is shown with a ranking of year-to-date production unit costs. Prior year-to-date production unit costs as well as the variance between current and prior year-to-date production unit costs are shown. FIG. 46B shows a legend which describes the percentage of reduction of production unit costs.

Load Profiling or Real Time Meter Reading

Referring to FIG. 47, a block diagram illustrating a utility-resource-consumption-based tracking system is set forth generally at 178. In accordance with a preferred implementation, a plurality of customers 180, 182 and 184 have a plurality of respective sites 180a, 180b, 180N, 182a, 182b, 182N, and 184a, 184b, 184N. Each site comprises a facility site which is a consumer of a utility resource for which it is desired to track and account. Each site will typically have a metering device which measures the amount or quantity of a particular resource being consumed by that site. Accordingly, each metering device measures utility resource usage information for its particular site. Exemplary quantities include kilowatts, kilovars or therms to name a few. Typical metering devices commonly convert measured values into pulses. For example, an electric meter for measuring electrical power consumption may be fitted with a device to produce a contact closure or pulse for every kilowatt of electricity used. Data logging devices, such as devices $D_1$–$D_9$, can be coupled with or integrated with each facility metering device and record the pulses or contacts and store them in a memory location. An exemplary data logging device is a GE Type DR87 or Schlumberger DS101. An exemplary metering device having an integrated recorder is a Vectron, manufactured by Schlumberger. Pulses can be collected in intervals of 5, 15, 30 or 60 minutes. Other intervals can be used. Accordingly, data which is associated with utility usage information measured by the metering device(s) is stored. A host computer 20, such as the one described above, is provided and is preferably linkable, via electronic link, with each data logging device. Data which is stored in the data logging devices is preferably retrieved into the host computer where it is subsequently processed for each facility site. The processing of the retrieved data provides usage-based, computer-viewable data associated with each facility site's usage of a particular utility resource. The retrieval process can be effectuated in any number of ways which are suitable for providing the host computer with the data necessary for its processing. For example, software retrieval programs can interrogate the data logging devices. An exemplary retrieval program is the MV90 which is available through a company called Utility Translation Systems, Inc., located in Raleigh, N.C. Data included in the retrieval process can include the time, interval value, channel identifier, and the number of intervals per hour. A comma delimited flat file can be used to transfer data. Alternately, third party computers or processors can comprise part of the host computer's data link with the data logging devices such that the third party computers or processors can collect or retrieve data and then pass it along to the host computer. For example, one computer or processor might collect data from devices $D_1$–$D_4$, while another might collect data from devices $D_5$–$D_9$. Subsequently, the data collected by each such third party computer or processor could be passed to the host computer for subsequent processing.

In but one aspect of the invention, data which is utilized in the implementation of the load profiling aspect of the present invention is collected from third party data logging devices utilizing third party software retrieval programs. An advantage of this aspect is that data from different third party devices can be collected and processed for display to the customer in a standard, unified format. In some instances, collected data can be output to a flat file and subsequently transferred electronically, as by use of the Internet, to the host system for processing as described above and below.

Computer access to the usage-based, computer-viewable data can be provided to each customer through interface device 30 (FIG. 1) substantially as described above. Thus, a customer can access and view such data from a computer location which is remote from the host computer. Any of the above-described report formats can be utilized. For example, a customer can view a graphical report which describes an individual site, a site-to-site comparison, and/or a data range description. Other formats can, of course, be utilized.

Figure 48B:
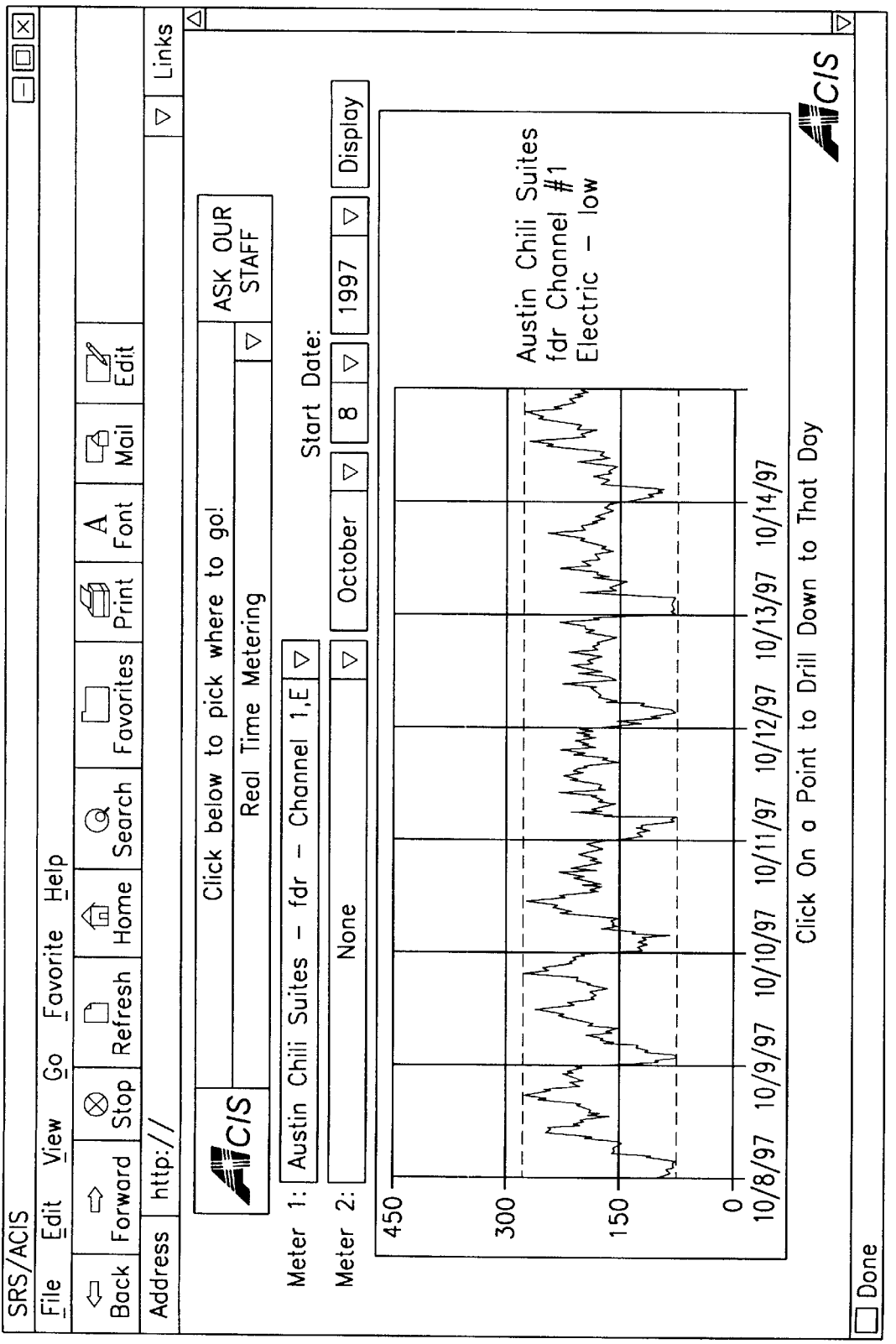
FIG. 48 is a view of another interactive computer screen implemented in connection with the FIG. 47 preferred embodiment of the invention.

Referring to FIG. 48, an exemplary screen 186 is shown and describes a report for Austin Chili Suites which was developed by processing data retrieved from the above-described data logging devices. The illustrated report shows a so-called load profile for each day during the week of Oct. 8, 1997. Individual load profiles for each day give an indication of energy consumption throughout the day.

Referring to FIG. 49, an exemplary screen 188 is shown and describes a report for Austin Chili Suites which shows a load profile for a week starting Nov. 11, 1997. The selected report indicates that "No Aggregation" has been selected. "Aggregation" allows load profiles for a particular time period to be added together. Such is discussed in more detail below. Additionally, this report screen enables a customer to display data for one or more sites, with the latter options being displayed in a site-to-site comparison, if desired. If a customer desires a more detailed view of the data, the customer can click on the graph and display data on a daily basis. An exemplary screen for such individualized data display is shown in FIG. 50 generally at 190. Such shows a daily load profile for Nov. 14, 1997.

The above reports assist the customer in identifying the time, e.g. hours of the day, throughout the relevant time period during which resource consumption takes place, and the amount thereof. Customers can, for example, utilize the above reports to confirm operation of HVAC systems, outdoor lighting controls, after-hour lighting consumption associated with janitorial services, and the like. The sensitivity of the system is advantageous because small load usages can be detected and, if necessary, be formatted into a suitable report for customer viewing in close to, if not real time. Load profile reports, such as the ones enabled by the present invention, are extremely useful for identifying and enabling the reduction of, or, the shifting of peak demand, as well as reducing consumption (i.e. giving an indication that consumption needs to be reduced thereby effectuating remedial customer measures). The timeliness of the provision of the computer-viewable data to the customer greatly assists the customer in making time-saving load profile evaluations for not only one, but for each customer site which is incorporated into the system.

Figures 51, 52A, 52B:
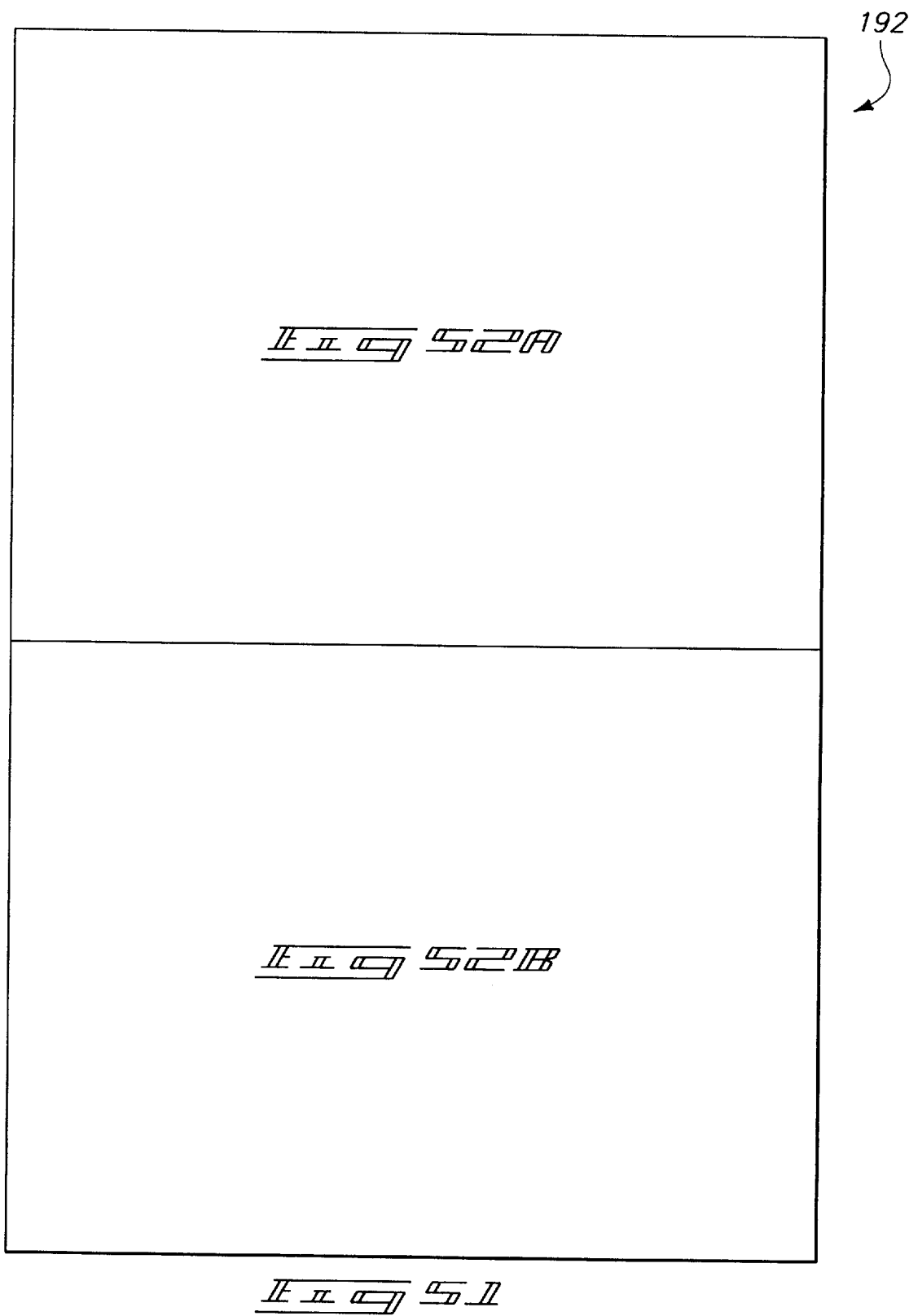
FIGS. 51, 52A–52B are views of one report screen in connection with one aspect of the present invention.
Figure 52B:
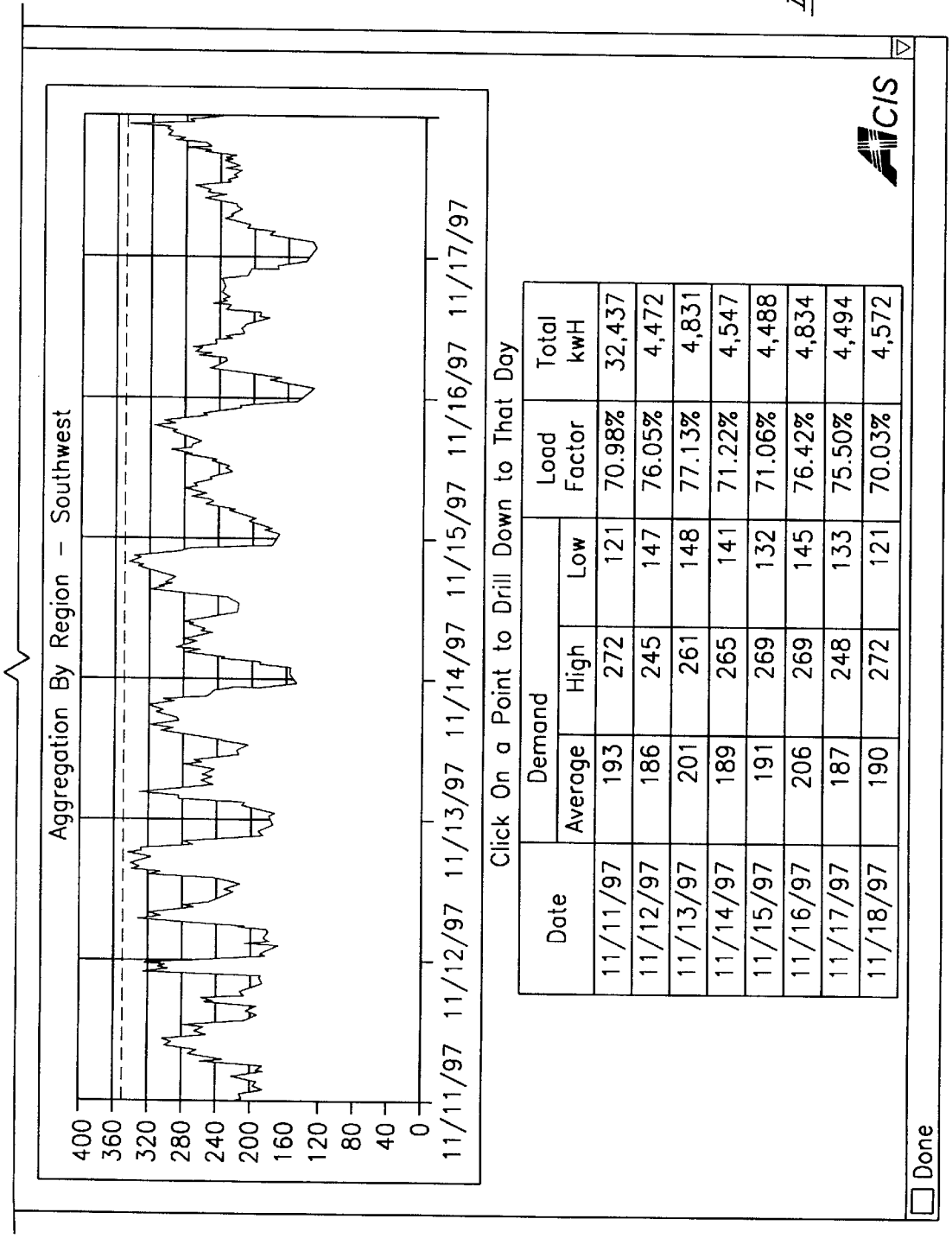
Figure 53:
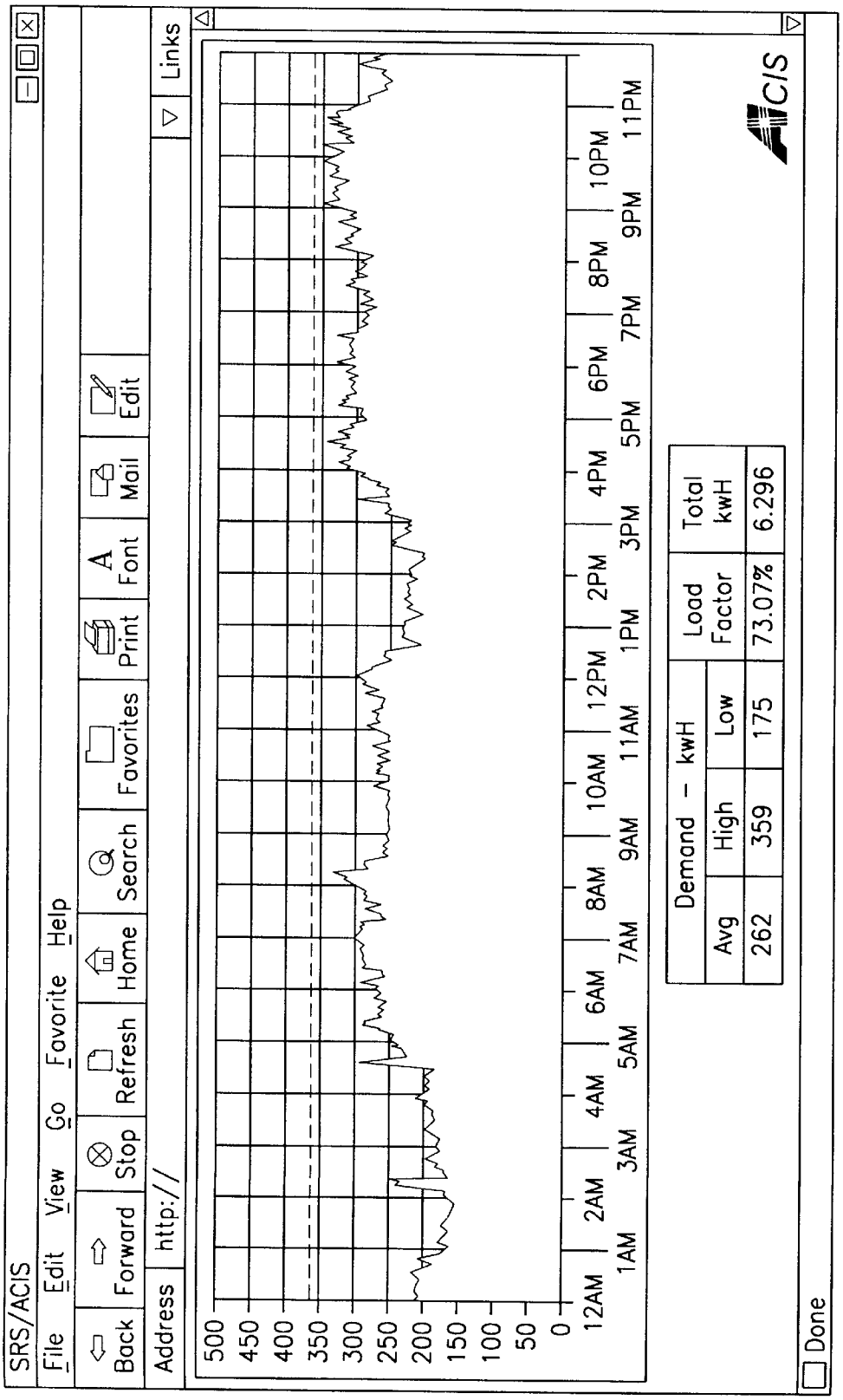
FIG. 53 is a view of another interactive computer screen implemented in connection with the FIG. 47 preferred embodiment of the invention.

Referring to FIGS. 51, 52A–52B an exemplary screen 192 is shown and describes an aggregated load profile which has been aggregated for the subject time interval. This report gives the customer the added flexibility to uniquely tailor the aggregation report to suit the customer's needs. For example, a customer can select, for aggregation, a date or date range, how aggregation is to be made (i.e., "Total Company", "Region", "State", or by "Utility" or Utility Resource Provider) as shown in FIG. 52A. A plurality of different regions, such as the illustrated "Southwest" region can be selected. Regions can also be thought of as climate zones, business operations areas, and the like. In addition, a customer can select to include or exclude one or more sites from aggregation. In addition to the load profile aggregation, a tabular summary (FIG. 52B) can be provided to give the customer hard numbers describing the particular aggregated period. For example, a summary describes an average, peak, and low demand figure for each day within the period. The summary also identifies load factor and the total kilowatt hours for the particular period. Such quantities are particularly useful in assisting the customer in quantifying and identifying the characteristics of their loads, and providing invaluable information to energy suppliers, i.e. utility resource providers, that serve the customers in a deregulated environment. A customer can also, through a drill-down option, click on a particular day and see that day's aggregated profile as shown in screen 194 in FIG. 53.

Report Download

Referring to FIG. 54, a screen 196 is provided and enables a customer at its remote location to download, in an ASCI fixed column flat file, any of the above described reports. By enabling a customer to download such information, an analysis can be effectuated by the customer at its own location and during its own allotted time. Other schemes of providing information contained in any of the reports can, of course, be utilized.

Summary

The above-described systems and methodologies provide a comprehensive decision-making tool which gives customers of resources, and in particular utility resources, the necessary and requisite information to make decisions concerning resource allocation, acquisition, and use. The systems and methodologies make pertinent information available in a quick and convenient manner. The preferred revolutionary utility resource management systems and methods ensure that the relevant decision makers and analytical personnel have information at their disposal which greatly facilitates the ease, timeliness and accuracy with which energy-based decisions can be made.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

We claim:

1. A computerized resource accounting method comprising:

defining a database in a host computer having a processor and an interface device;

storing in said database customer information pertaining to a customer, said customer being a consumer of a resource for which it is desired to account;

receiving into said host computer resource usage information pertaining to consumption of said resource by said customer;

performing an audit of said resource usage information against pre-determined tolerance parameters and determining whether said resource usage information satisfies said tolerance parameters;

processing said resource usage information for said one customer to provide usage-based, computer-viewable data associated with said consumer's consumption of said resource; and providing said customer with computer access to said computer-viewable data through said interface device, wherein said customer can view said computer-viewable data at a customer location which is remote from said host computer.

2. The computerized resource accounting method of claim 1, wherein said processing of said resource usage information comprises providing said computer-viewable data in the form of a graphical report.

3. The computerized resource accounting method of claim 1, wherein said receiving of said resource usage information comprises receiving information pertaining to a plurality of different consumption variables of said resource by said consumer.

4. The computerized resource accounting method of claim 3, wherein one of said consumption variables comprises a cost-related consumption variable.

5. The computerized resource accounting method of claim 3, wherein one of said consumption variables comprises a quantity-related consumption variable.

6. The computerized resource accounting method of claim 3, wherein said consumption variables comprise a cost-related consumption variable and a quantity-related consumption variable.

7. The computerized resource accounting method of claim 1, wherein said processing of said resource usage information comprises providing said computer-viewable data in the form of a plurality of graphical reports which are selectable by said customer for viewing at said remote location.

8. The computerized resource accounting method of claim 7, wherein one of said graphical reports comprises a bar chart.

9. The computerized resource accounting method of claim 7, wherein one of said graphical reports comprises a line graph chart.

10. The computerized resource accounting method of claim 7, wherein one of said graphical reports comprises a scatter graph.

11. The computerized resource accounting method of claim 1, wherein:

said receiving of said resource usage information comprises receiving information pertaining to a plurality of different resources consumed by said customer; and said processing of said resource usage information comprises providing usage-based, computer-viewable data associated with said consumer's consumption of said plurality of different resources.

12. The computerized resource accounting method of claim 11, wherein said receiving of said resource usage information comprises receiving information pertaining to a plurality of different consumption variables for said plurality of different resources consumed by said consumer.

13. The computerized resource accounting method of claim 12, wherein one of said consumption variables comprises a cost-related consumption variable.

14. The computerized resource accounting method of claim 12, wherein one of said consumption variables comprises a quantity-related consumption variable.

15. The computerized resource accounting method of claim 12, wherein said consumption variables comprise a cost-related consumption variable and a quantity-related consumption variable.

16. The computerized resource accounting method of claim 12, wherein said processing of said resource usage information comprises providing said computer-viewable data in the form of a graphical report.

17. The computerized resource accounting method of claim 12, wherein said processing of said resource usage information comprises providing said computer-viewable data in the form of a plurality of graphical reports which are selectable by said customer for viewing at said remote location.

18. The computerized resource accounting method of claim 17, wherein at least one of said graphical reports contains computer-viewable data for each of said different resources.

19. The computerized resource accounting method of claim 17, wherein at least one of said graphical reports contains computer-viewable data for at least two of said different consumption variables.

20. The computerized resource accounting method of claim 19, wherein said one graphical report comprises a matrix report.

21. A computerized utility resource management method comprising:

defining a database in a host computer having a processor and an interface device;

storing in said database customer information pertaining to a customer having a plurality of different sites which are each consumers of a utility resource for which it is desired to account for each site, said storing comprising storing historical billing data for at least one of said customer's sites in said database, and processing said historical billing data to define at least one tolerance parameter for said at least one site;

receiving into said host computer utility resource usage information pertaining to consumption of said utility resource by each site of said customer;

checking said resource usage information for said at least one site against said at least one tolerance parameter for said one site to determine whether said resource usage information satisfies said one tolerance parameter; and responsive to a condition in which said resource usage information does not satisfy said one tolerance parameter, implementing a review of said resource usage information to ascertain whether an error exists;

processing said utility resource usage information for said sites of said customer to provide usage-based, computer-viewable data associated with each site's consumption of said utility resource; and providing said customer with computer access to said computer-viewable data through said interface device, wherein said customer can view said computer-viewable data at a customer location which is remote from said host computer.

22. The computerized utility resource management method of claim 21, wherein said receiving of said utility resource usage information comprises receiving information pertaining to a plurality of different consumption variables of said resource for each site.

23. The computerized utility resource management method of claim 22, wherein one of said consumption variables comprises a cost-related consumption variable.

24. The computerized utility resource management method of claim 22, wherein one of said consumption variables comprises a quantity-related consumption variable.

25. The computerized utility resource management method of claim 22, wherein said consumption variables comprise a cost-related consumption variable and a quantity-related consumption variable.

26. The computerized utility resource management method of claim 21, wherein:
said receiving of said utility resource usage information comprises (a) receiving information pertaining to a plurality of different utility resources consumed by each site, and (b) receiving information pertaining to a plurality of different consumption variables of said plurality of different resources for each site, wherein said consumption variables comprise a cost-related consumption variable and a quantity-related consumption variable; and
said processing of said utility resource usage information comprises providing usage-based, computer-viewable data associated with each site's consumption of said plurality of different utility resources in the form of a plurality of graphical reports which are selectable by said customer for viewing at said remote location.

27. The computerized utility resource management method of claim 26, wherein:
said storing of said customer information comprises storing historical billing data for each of said customer's sites in said database, and processing said historical billing data to define a plurality of tolerance parameters for each site; and
said checking comprises checking said resource usage information for each site against said respective tolerance parameters for said sites to determine whether said resource usage information satisfies said respective tolerance parameters; and
responsive to a condition in which said resource usage information does not satisfy said tolerance parameters for an individual site, implementing a review of said resource usage information for that site to ascertain whether an error exists, prior to processing said resource usage information to provide said computer-viewable data for that site.

28. The computerized utility resource management method of claim 26, wherein one of said graphical reports comprises computer-viewable data for a plurality of said sites.

29. The computerized utility resource management method of claim 26, wherein one of said graphical reports comprises computer-viewable data for two of said sites wherein said one graphical report permits a site-to-site comparison to be made between said two sites.

30. The computerized utility resource management method of claim 26, wherein one of said graphical reports comprises a grouping of sites which are grouped in accordance with a predefined grouping variable.

31. The computerized utility resource management method of claim 30, wherein said predefined grouping variable comprises one of a plurality of climate zones in which individual sites are located.

32. The computerized utility resource management method of claim 21, wherein:
said receiving of said utility resource usage information comprises receiving information pertaining to a plurality of different utility resources consumed by each site; and
said processing of said utility resource usage information comprises providing usage-based, computer-viewable data associated with each site's consumption of said plurality of different utility resources.

33. The computerized utility resource management method of claim 32, wherein:
said storing of said customer information comprises storing historical billing data for each of said customer's sites in said database, and processing said historical billing data to define a plurality of tolerance parameters for each site; and
said checking comprises checking said resource usage information for each site against said respective tolerance parameters for said sites to determine whether said resource usage information satisfies said respective tolerance parameters; and
responsive to a condition in which said resource usage information does not satisfy one of said tolerance parameters for an individual site, implementing a review of said resource usage information for that site to ascertain whether an error exists.

34. The computerized utility resource management method of claim 32, wherein said processing of said utility resource usage information comprises providing said computer-viewable data in the form of a graphical report.

35. The computerized utility resource management method of claim 32, wherein said receiving of said utility resource usage information comprises receiving information pertaining to a plurality of different consumption variables of said plurality of different resources for each site.

36. The computerized utility resource management method of claim 35, wherein one of said consumption variables comprises a cost-related consumption variable.

37. The computerized utility resource management method of claim 35, wherein one of said consumption variables comprises a quantity-related consumption variable.

38. The computerized utility resource management method of claim 35, wherein said consumption variables comprise a cost-related consumption variable and a quantity-related consumption variable.

39. The computerized utility resource management method of claim 32, wherein said processing of said utility resource usage information comprises providing said computer-viewable data in the form of a plurality of graphical reports which are selectable by said customer for viewing at said remote location.

40. The computerized utility resource management method of claim 39, wherein one of said graphical reports comprises computer-viewable data for only one site.

41. The computerized utility resource management method of claim 39, wherein one of said graphical reports comprises computer-viewable data for a plurality of said sites.

42. The computerized utility resource management method of claim 39, wherein one of said graphical reports comprises computer-viewable data for two of said sites wherein said one graphical report permits a site-to-site comparison to be made between said two sites.

43. The computerized utility resource management method of claim 39, wherein one of said graphical reports comprises a date range wherein said computer-viewable data which falls within said date range can be viewed.

44. The computerized utility resource management method of claim 39, wherein one of said graphical reports comprises a grouping of sites which are grouped in accordance with a predefined grouping variable.

45. The computerized utility resource management method of claim 44, wherein said predefined grouping variable comprises one of a plurality of climate zones in which individual sites are located.

46. A comprehensive, comparative, multi-user utility resource management method comprising:

defining a database in a host computer having a processor and an interface device, said host computer being accessible from a multi-user computer network;

storing in said database customer information pertaining to a plurality of customers, individual customers having a plurality of different sites which are each consumers of at least one utility resource for which is it desired to account for each site, wherein said storing of said customer information comprises storing historical billing data for at least one of each of said customers' sites in said database, and processing said historical billing data to define a respective plurality of tolerance parameters for each of said at least one of each of said customers' sites;

receiving into said host computer utility resource usage information pertaining to consumption of said at least one utility resource by each site;

processing said utility resource usage information for said sites of said customers to provide usage-based, computer-viewable data associated with each site's consumption of said at least one utility resource; and checking said resource usage information for each of said at least one of each of said customers' sites against said respective tolerance parameters to determine whether said resource usage information satisfies said respective tolerance parameters; and responsive to a condition in which said resource usage information does not satisfy said tolerance parameters for an individual site, implementing a review of said resource usage information for that site to ascertain whether an error exists, prior to processing said resource usage information to provide said computer-viewable data for that site;

providing said customers with computer access, via said multi-user computer network, to said computer-viewable data through said interface device, wherein said customers can view said computer-viewable data using a computer which is remote from said host computer.

47. The multi-user, utility resource management method of claim 46, wherein said utility resource comprises electrical power.

48. The multi-user, utility resource management method of claim 46, wherein said utility resource comprises natural gas.

49. The multi-user, utility resource management method of claim 46, wherein said utility resource comprises water.

50. The multi-user, utility resource management method of claim 46, wherein said utility resource comprises sewer services.

51. The multi-user, utility resource management method of claim 46, wherein said multi-user computer network comprises the Internet.

52. The multi-user, utility resource management method of claim 46, wherein computer access in password-protected.

53. The multi-user, utility resource management method of claim 46, wherein said receiving of said utility resource usage information comprises receiving information pertaining to a plurality of different consumption variables of said resource for individual sites.

54. The multi-user, utility resource management method of claim 53, wherein one of said consumption variables comprises a cost-related consumption variable.

55. The multi-user, utility resource management method of claim 53, wherein one of said consumption variables comprises a quantity-related consumption variable.

56. The multi-user, utility resource management method of claim 53, wherein said consumption variables comprise a cost-related consumption variable and a quantity-related consumption variable.

57. The multi-user, utility resource management method of claim 46, wherein:

said receiving of said utility resource usage information comprises (a) receiving information pertaining to a plurality of different utility resources consumed by individual sites, and (b) receiving information pertaining to a plurality of different consumption variables of said different utility resources for said individual sites; and said processing of said utility resource usage information comprises providing usage-based, computer-viewable data associated with consumption of said plurality of different utility resources by said individual sites.

58. The multi-user, utility resource management method of claim 57, wherein said utility resources comprise electrical power and water.

59. The multi-user, utility resource management method of claim 57, wherein said consumption variables comprise a cost-related consumption variable and a quantity-related consumption variable.

60. The multi-user, utility resource management method of claim 59, wherein said processing of said utility resource usage information comprises providing said computer-viewable data in the form of a plurality of graphical reports which are selectable by a customer for viewing at said remote location.

61. The multi-user, utility resource management method of claim 60, wherein one of said selectable graphical reports comprises computer-viewable data for a plurality of said sites of an individual customer.

62. The multi-user, utility resource management method of claim 60, wherein one of said selectable graphical reports comprises computer-viewable data for two sites of an individual customer wherein said one selectable graphical report permits a site-to-site comparison to be made between said two sites.

63. The multi-user, utility resource management method of claim 60, wherein said utility resources comprise electrical power and water.

64. The multi-user, utility resource management method of claim 46, wherein:

said receiving of said utility resource usage information comprises receiving information pertaining to a plurality of different utility resources consumed by individual sites; and said processing of said utility resource usage information comprises providing usage-based, computer-viewable data associated with consumption of said plurality of different utility resources by said individual sites.

65. The multi-user, utility resource management method of claim 64, wherein said utility resources comprise electrical power.

66. The multi-user, utility resource management method of claim 64, wherein said utility resources comprise natural gas.

67. The multi-user, utility resource management method of claim 64, wherein said utility resources comprise water.

68. The multi-user, utility resource management method of claim 64, wherein said utility resources sewer services.

69. The multi-user, utility resource management method of claim 64, wherein said receiving of said utility resource usage information comprises receiving information pertaining to a plurality of different consumption variables of said resources for said individual sites.

70. The multi-user, utility resource management method of claim 69, wherein said processing of said utility resource usage information comprises providing said computer-viewable data in the form of a graphical report.

71. The multi-user, utility resource management method of claim 69, wherein said consumption variables comprise a cost-related consumption variable and a quantity-related consumption variable.

72. The multi-user, utility resource management method of claim 69, wherein said processing of said utility resource usage information comprises providing said computer-viewable data in the form of a plurality of graphical reports which are selectable by a customer for viewing at said remote location.

73. The multi-user, utility resource management method of claim 72, wherein one of said selectable graphical reports comprises computer-viewable data for a plurality of said sites of an individual customer.

74. The multi-user, utility resource management method of claim 72, wherein one of said selectable graphical reports comprises computer-viewable data for two sites of an individual customer wherein said one selectable graphical report permits a site-to-site comparison to be made between said two sites.

75. A computerized utility resource management method comprising:

defining a database in a host computer having a processor and an interface device;

storing in said database customer information pertaining to a customer having a plurality of different sites which are each consumers of a utility resource for which it is desired to account for each site, said storing comprising storing historical billing data for each of said customer's sites in said database, and processing said historical billing data to define a plurality of tolerance parameters for each site;

receiving into said host computer utility resource usage information pertaining to consumption of a plurality of different utility resources consumed by each site of said customer;

checking said resource usage information for each site against said respective tolerance parameters for said sites to determine whether said resource usage information satisfies said respective tolerance parameters; and responsive to a condition in which said resource usage information does not satisfy one of said tolerance parameters for an individual site, implementing a review of said resource usage information for that site to ascertain whether an error exists;

processing said utility resource usage information for said sites of said customer to provide usage-based, computer-viewable data associated with each site's consumption of said plurality of different utility resources; and providing said customer with computer access to said computer-viewable data through said interface device, wherein said customer can view said computer-viewable data at a customer location which is remote from said host computer.

76. The computerized utility resource management method of claim 75, wherein said processing of said utility resource usage information comprises providing said computer-viewable data in the form of a graphical report.

77. The computerized utility resource management method of claim 75, wherein said receiving of said utility resource usage information comprises receiving information pertaining to a plurality of different consumption variables of said resource for each site.

78. The computerized utility resource management method of claim 77, wherein one of said consumption variables comprises a cost-related consumption variable.

79. The computerized utility resource management method of claim 77, wherein one of said consumption variables comprises a quantity-related consumption variable.

80. The computerized utility resource management method of claim 77, wherein said consumption variables comprise a cost-related consumption variable and a quantity-related consumption variable.

81. The computerized utility resource management method of claim 75, wherein said processing of said utility resource usage information comprises providing said computer-viewable data in the form of a plurality of graphical reports which are selectable by said customer for viewing at said remote location.

82. The computerized utility resource management method of claim 81, wherein one of said graphical reports comprises computer-viewable data for only one site.

83. The computerized utility resource management method of claim 81, wherein one of said graphical reports comprises computer-viewable data for a plurality of said sites.

84. The computerized utility resource management method of claim 81, wherein one of said graphical reports comprises computer-viewable data for two of said sites wherein said one graphical report permits a site-to-site comparison to be made between said two sites.

85. The computerized utility resource management method of claim 81, wherein one of said graphical reports comprises a date range wherein said computer-viewable data which falls within said date range can be viewed.

86. The computerized utility resource management method of claim 81, wherein one of said graphical reports comprises a grouping of sites which are grouped in accordance with a predefined grouping variable.

87. The computerized utility resource management method of claim 86, wherein said predefined grouping variable comprises one of a plurality of climate zones in which individual sites are located.

88. A computerized utility resource management method comprising:

defining a database in a host computer having a processor and an interface device;

storing in said database customer information pertaining to a customer having a plurality of different sites which are each consumers of a plurality of different utility resources for which it is desired to account for each site, said storing comprising storing historical billing data for each of said customer's sites in said database, and processing said historical billing data to define a plurality of tolerance parameters for each site;

receiving into said host computer utility resource usage information pertaining to consumption of said plurality of different utility resources by each site of said customer, and receiving information pertaining to a plurality of different consumption variables of said plurality of different resources for each site, wherein said consumption variables comprise a cost-related consumption variable and a quantity-related consumption variable;

processing said utility resource usage information for said sites of said customer to provide usage-based, computer-viewable data associated with each site's consumption of said plurality of different utility resources in the form of a plurality of graphical reports which are selectable by said customer for viewing at said remote location;

checking said resource usage information for each site against said respective tolerance parameters for said sites to determine whether said resource usage information satisfies said respective tolerance parameters; and responsive to a condition in which said resource usage information does not satisfy said tolerance parameters for an individual site, implementing a review of said resource usage information for that site to ascertain whether an error exists, prior to processing said resource usage information to provide said computer-viewable data for that site; and providing said customer with computer access to said computer-viewable data through said interface device, wherein said customer can view said computer-viewable data at a customer location which is remote from said host computer.

89. The computerized utility resource management method of claim 88, wherein one of said graphical reports comprises computer-viewable data for two of said sites wherein said one graphical report permits a site-to-site comparison to be made between said two sites.

90. The computerized utility resource management method of claim 88, wherein one of said graphical reports comprises a date range wherein said computer-viewable data which falls within said date range can be viewed.

91. The computerized utility resource management method of claim 88, wherein one of said graphical reports comprises a grouping of sites which are grouped in accordance with a predefined grouping variable.

92. The computerized utility resource management method of claim 91, wherein said predefined grouping variable comprises one of a plurality of climate zones in which individual sites are located.

93. A comprehensive, comparative, multi-user utility resource management method comprising:

defining a database in a host computer having a processor and an interface device, said host computer being accessible from a multi-user computer network;

storing in said database customer information pertaining to a plurality of customers, individual customers having a plurality of different sites which are each consumers of a plurality of different utility resources for which is it desired to account for each site, said storing comprising storing historical billing data for at least one of each of said customers' sites in said database, and processing said historical billing data to define a respective plurality of tolerance parameters for each of said at least one of each of said customers' sites;

receiving into said host computer utility resource usage information pertaining to consumption of said plurality of different utility resources by each site, said receiving comprising receiving information pertaining to a plurality of different consumption variables of said different utility resources for each site;

processing said utility resource usage information for said sites of said customers to provide usage-based, computer-viewable data associated with each site's consumption of said plurality of different utility resources;

checking said resource usage information for each of said at least one of each of said customers' sites against said respective tolerance parameters to determine whether said resource usage information satisfies said respective tolerance parameters; and responsive to a condition in which said resource usage information does not satisfy said tolerance parameters for an individual site, implementing a review of said resource usage information for that site to ascertain whether an error exists, prior to processing said resource usage in-formation to provide said computer-viewable data for that site;

providing said customers with computer access, via said multi-user computer network, to said computer-viewable data through said interface device, wherein said customers can view said computer-viewable data using a computer which is remote from said host computer.

94. The multi-user, utility resource management method of claim 93, wherein one of said utility resources comprises electrical power.

95. The multi-user, utility resource management method of claim 93, wherein one of said utility resources comprises natural gas.

96. The multi-user, utility resource management method of claim 93, wherein one of said utility resources comprises water.

97. The multi-user, utility resource management method of claim 93, wherein one of said utility resources comprises sewer services.

98. The multi-user, utility resource management method of claim 93, wherein said multi-user computer network comprises the Internet.

99. The multi-user, utility resource management method of claim 93, wherein computer access in password-protected.

100. The multi-user, utility resource management method of claim 93, wherein one of said consumption variables comprises a cost-related consumption variable.

101. The multi-user, utility resource management method of claim 93, wherein one of said consumption variables comprises a quantity-related consumption variable.

102. The multi-user, utility resource management method of claim 93, wherein said consumption variables comprise a cost-related consumption variable and a quantity-related consumption variable.

103. The multi-user, utility resource management method of claim 93, wherein said processing of said utility resource usage information comprises providing said computer-viewable data in the form of a graphical report.

104. The multi-user, utility resource management method of claim 93, wherein said processing of said utility resource usage information comprises providing said computer-viewable data in the form of a plurality of graphical reports which are selectable by a customer for viewing at said remote location.

105. The multi-user, utility resource management method of claim 104, wherein one of said selectable graphical reports comprises computer-viewable data for a plurality of said sites of an individual customer.

106. The multi-user, utility resource management method of claim 104, wherein one of said selectable graphical reports comprises computer-viewable data for two sites of an individual customer wherein said one selectable graphical report permits a site-to-site comparison to be made between said two sites.

\* \* \* \* \*